(12) United States Patent
Park et al.

(10) Patent No.: US 10,802,538 B1
(45) Date of Patent: Oct. 13, 2020

(54) FOLDABLE ELECTRONIC DEVICE INCLUDING DISPLAY PROTECTION STRUCTURE

(71) Applicant: Samsung Electronics Co., Ltd., Gyeonggi-do (KR)

(72) Inventors: Jungwon Park, Gyeonggi-do (KR); Jongmin Kang, Gyeonggi-do (KR); Daeyoung Kim, Gyeonggi-do (KR); Sunghun Kim, Gyeonggi-do (KR); Chijoon Kim, Gyeonggi-do (KR); Hyosang An, Gyeonggi-do (KR); Seungjun Lee, Gyeonggi-do (KR); Hyunggeun Lee, Gyeonggi-do (KR); Seungwhee Choi, Gyeonggi-do (KR); Junyoung Choi, Gyeonggi-do (KR); Dooryong Kim, Gyeonggi-do (KR); Yonghee Jang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 16/838,555

(22) Filed: Apr. 2, 2020

(30) Foreign Application Priority Data

May 31, 2019 (KR) .................. 10-2019-0064849
Jul. 19, 2019 (KR) .................. 10-2019-0087535

(51) Int. Cl.
*G06F 1/16* (2006.01)
*H04M 1/02* (2006.01)

(52) U.S. Cl.
CPC .......... *G06F 1/1618* (2013.01); *G06F 1/1681* (2013.01); *H04M 1/0216* (2013.01)

(58) Field of Classification Search
CPC ... G06F 1/1618; G06F 1/1681; H04M 1/0216
See application file for complete search history.

(56) References Cited

U.S. PATENT DOCUMENTS

| 4,018,998 A | 4/1977 | Wegner |
| 8,804,349 B2 * | 8/2014 | Lee .................. G06F 1/1641 |
| | | 361/749 |

(Continued)

FOREIGN PATENT DOCUMENTS

| KR | 10-2016-0024151 | 3/2016 |
| KR | 10-2017-0026023 | 3/2017 |
| KR | 10-2017-0091244 | 8/2017 |

OTHER PUBLICATIONS

PCT/ISA/210—International Search Report issued on PCT/KR2020/004514, Aug. 7, 2020, pp. 4.

(Continued)

*Primary Examiner* — Abhishek M Rathod
(74) *Attorney, Agent, or Firm* — The Farrell Law Firm, P.C.

(57) ABSTRACT

An electronic device is provided, which includes a hinge structure corresponding to a folding region of electronic device; a first housing structure connected to the hinge structure, and including a first surface, a second surface facing away from the first surface, and a first side member surrounding a first space between the first surface and the second surface; a second housing structure connected to the hinge structure, and including a third surface, a fourth surface facing away from the third surface, and a second side member surrounding a second space between the third surface and the fourth surface, wherein the first housing structure and the second housing structure fold and unfold about the hinge structure, wherein the first surface and the third surface face a same direction in an unfolded state, and wherein the second surface and the fourth surface face opposite directions in a folded state; a display that traverses at least a portion of the first surface and at least a portion of the third surface through the folding region; a first protection cover disposed in the first housing structure on at least some (Continued)

of a periphery of the display; a second protection cover disposed in the second housing structure on at least some of the periphery of the display; and a protection structure that protects the periphery of the display in the folding region.

20 Claims, 45 Drawing Sheets

(56) References Cited

U.S. PATENT DOCUMENTS

| | | | | |
|---|---|---|---|---|
| 9,173,287 | B1* | 10/2015 | Kim | H05K 1/028 |
| 9,204,565 | B1* | 12/2015 | Lee | E05D 7/00 |
| 9,229,481 | B2* | 1/2016 | Jinbo | G06F 1/1652 |
| 9,603,271 | B2* | 3/2017 | Lee | H05K 5/0017 |
| 9,755,688 | B1 | 9/2017 | McKenzie | |
| 9,818,961 | B2* | 11/2017 | Hiroki | H01L 51/0097 |
| 10,368,452 | B2* | 7/2019 | Yun | G06F 1/1681 |
| 10,466,747 | B2* | 11/2019 | Yun | G06F 1/1641 |
| 10,551,880 | B1* | 2/2020 | Ai | H04M 1/0216 |
| 2002/0044425 | A1* | 4/2002 | Ijas | H04M 1/0214 |
| | | | | 361/724 |
| 2007/0097014 | A1* | 5/2007 | Solomon | G06F 1/1616 |
| | | | | 345/1.1 |
| 2012/0264489 | A1* | 10/2012 | Choi | H04M 1/0268 |
| | | | | 455/566 |
| 2014/0028597 | A1* | 1/2014 | Cho | G06F 1/1652 |
| | | | | 345/173 |
| 2015/0141091 | A1 | 5/2015 | Oh et al. | |
| 2015/0366089 | A1* | 12/2015 | Park | G06F 1/1652 |
| | | | | 361/679.01 |
| 2015/0378397 | A1* | 12/2015 | Park | G06F 1/1652 |
| | | | | 361/679.27 |
| 2016/0070306 | A1* | 3/2016 | Shin | G06F 1/1616 |
| | | | | 361/679.27 |
| 2017/0061836 | A1 | 3/2017 | Kim et al. | |
| 2017/0115701 | A1* | 4/2017 | Bae | G06F 1/1652 |
| 2017/0222179 | A1 | 8/2017 | Park | |
| 2017/0374749 | A1 | 12/2017 | Lee et al. | |
| 2018/0110139 | A1* | 4/2018 | Seo | E05D 1/04 |
| 2018/0213663 | A1* | 7/2018 | Lin | E05D 11/0054 |
| 2018/0292860 | A1* | 10/2018 | Siddiqui | G06F 1/1618 |
| 2018/0324964 | A1* | 11/2018 | Yoo | E05D 3/122 |
| 2018/0352924 | A1 | 12/2018 | Lim | |
| 2019/0036068 | A1* | 1/2019 | Kim | G06F 1/1601 |
| 2019/0166703 | A1* | 5/2019 | Kim | G06F 1/1652 |

OTHER PUBLICATIONS

PCT/ISA/237—Written Opinion issued on PCT/KR2020/004514, Jul. 8, 2020, pp. 4.

* cited by examiner

FOLDABLE ELECTRONIC DEVICE INCLUDING DISPLAY PROTECTION STRUCTURE

CROSS-REFERENCE TO RELATED APPLICATION(S)

This application is based on and claims priority under 35 U.S.C. § 119 to Korean Patent Application Nos. 10-2019-0064849 and 10-2019-0087535, which were filed in the Korean Intellectual Property Office on May 31, 2019, and Jul. 19, 2019, respectively, the entire disclosure of each of which is incorporated herein by reference.

BACKGROUND

1. Field

The disclosure relates generally to a foldable electronic device including a display protection structure.

2. Description of Related Art

Electronic devices are becoming slimmer and are being upgraded so as to increase rigidity, enhance design aspects, and differentiate functional elements thereof. Electronic devices, which often have a uniform rectangular shape, are gradually evolving into electronic devices having various shapes. For example, electronic devices may have an alterable structure that is highly portable and supports a large screen display when being used. In accordance with this trend, foldable electronic devices in which at least two housings may be folded or unfolded relative to one another are continuously being developed, and various improvements are being made to the folding structure.

A foldable electronic device may include a hinge structure, a first housing structure, and a second housing structure, where the first housing structure and the second housing structure are connected via the hinge structure. The foldable electronic device may be folded and unfolded by the first housing structure to rotating in a range of 0 to 360 degrees relative to the second housing structure through the hinge structure. The foldable electronic device may include a flexible display disposed across the first housing structure and the second housing structure in an open state with 180 degrees.

Unlike a conventional bar type electronic device, the foldable electronic device does not include a rigid structure (e.g., a front window) for protecting the display because the display must be folded with the housing structures. Therefore, in the foldable electronic device, the display is fixed to the housing structures with a protective layer (e.g., a polyimide (PI) film) disposed on an upper surface thereof, and its periphery may be hidden through a separate protection cover.

The foldable electronic device may be provided with a disconnection space, at a portion corresponding to the hinge structure, where the protection covers disposed in the housing structures are disconnected to provide a degree of freedom for the hinge structure according to the folding operation. As the periphery of the display is exposed through the disconnection space, a foreign substance may flow into the disconnection space.

In addition, the user may lift the periphery of the display with a fingernail or a sharp tool, causing the display to malfunction.

Further, in the disconnection space, squashing may occur due to the gap between the display and the hinge structure, which may also cause the display to malfunction.

SUMMARY

The disclosure has been made to address at least the disadvantages described above and to provide at least the advantages described below.

Accordingly, an aspect of the disclosure is to provide a foldable electronic device including a display protection structure.

In accordance with an aspect of the disclosure, an electronic device is provided. The electronic device includes a hinge structure corresponding to a folding region of the electronic device; a first housing structure connected to the hinge structure, and including a first surface, a second surface facing away from the first surface, and a first side member surrounding a first space between the first surface and the second surface; a second housing structure connected to the hinge structure, and including a third surface, a fourth surface facing away from the third surface, and a second side member surrounding a second space between the third surface and the fourth surface, wherein the first housing structure and the second housing structure fold and unfold about the hinge structure, wherein the first surface and the third surface face a same direction in an unfolded state, and wherein the second surface and the fourth surface face opposite directions in a folded state; a display that traverses at least a portion of the first surface and at least a portion of the third surface through the folding region; a first protection cover disposed in the first housing structure on at least some of a periphery of the display; a second protection cover disposed in the second housing structure on at least some of the periphery of the display; and a protection structure that protects the periphery of the display in the folding region.

BRIEF DESCRIPTION OF THE DRAWINGS

The above and other aspects, features and advantages of certain embodiments of the disclosure will be more apparent from the following detailed description, taken in conjunction with the accompanying drawings, in which the same or similar reference symbols may be used to refer to the same or like parts, and in which.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

Figure 1:
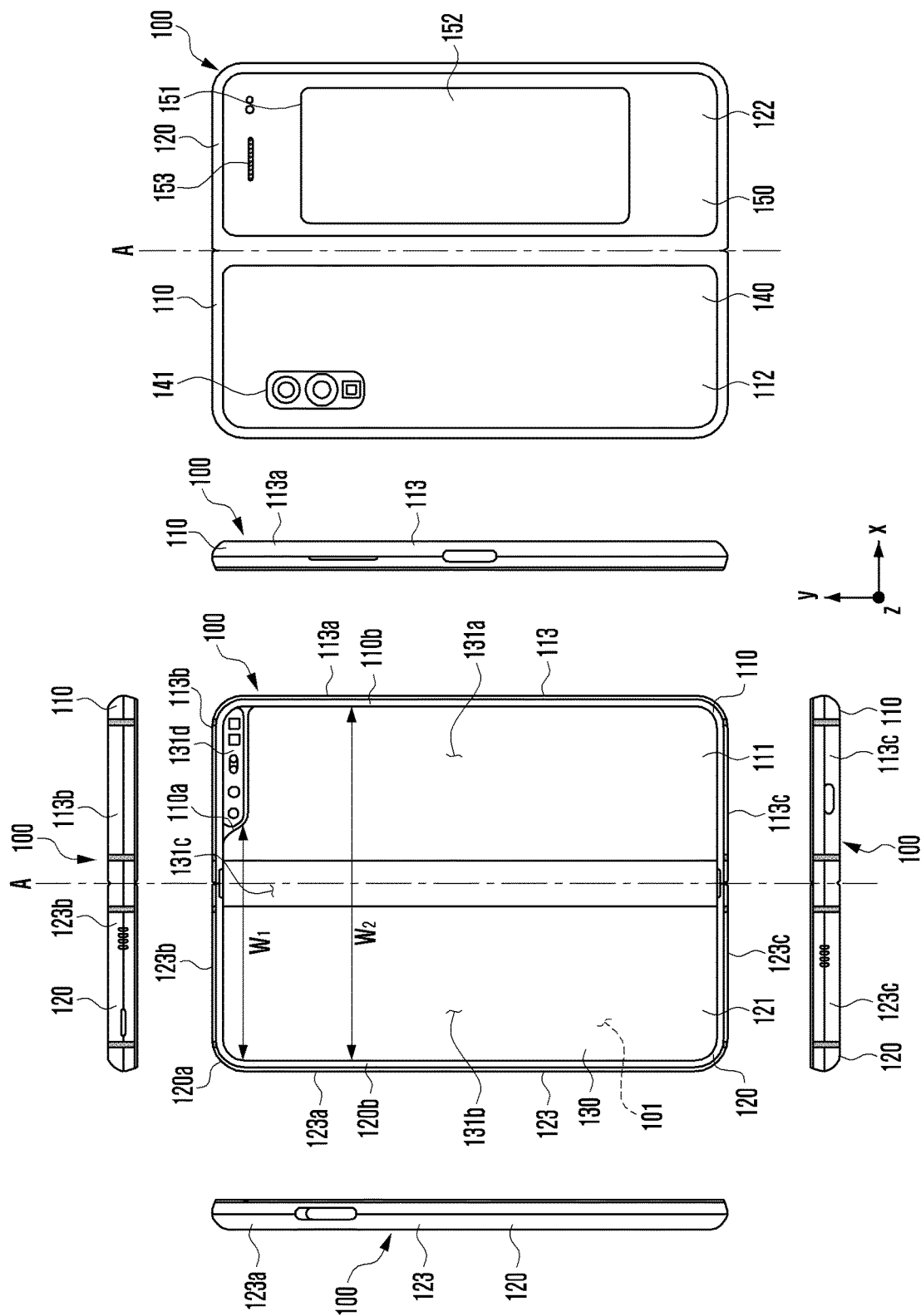
FIG. 1 illustrates an electronic device in an unfolded state according to an embodiment.

FIG. 1 illustrates an unfolded state of an electronic device according to an embodiment.

Referring to FIG. 1, an electronic device 100 may include a pair of housing structures 110 and 120 rotatably coupled via a hinge structure (e.g., hinge structure 164 in FIG. 3) to be folded relative to each other, a hinge cover 165 covering the foldable portion of the pair of housing structures 110 and 120, and a display 130 (e.g., flexible display or foldable display) disposed in the space formed by the pair of housing structures 110 and 120. In the description, the surface on which the display 130 is disposed may be referred to as the front surface of the electronic device 100, and the opposite side of the front surface may be referred to as the rear surface of the electronic device 100. The surface surrounding the space between the front surface and the rear surface may be referred to as the side surface of the electronic device 100.

In one embodiment, the pair of housing structures 110 and 120 may include a first housing structure 110 including a sensor region 131d, a second housing structure 120, a first rear cover 140, and a second rear cover 150. The pair of housing structures 110 and 120 of the electronic device 100 are not limited to the shape or combination illustrated in FIGS. 1 and 2, but may be implemented in various shapes or combinations. For example, in another embodiment, the first housing structure 110 and the first rear cover 140 may be formed as a single body, and the second housing structure 120 and the second rear cover 150 may be formed as a single body.

In one embodiment, the first housing structure 110 and the second housing structure 120 may be disposed at both sides with respect to the folding axis (A) and may be substantially symmetrical with respect to the folding axis (A). In one embodiment, the angle or distance between the first housing structure 110 and the second housing structure 120 may vary depending upon whether the electronic device 100 is in the flat state or closed state, the folded state, or the intermediate state. In one embodiment, the first housing structure 110 includes the sensor region 131d where various sensors are disposed, but may have a symmetrical shape with the second housing structure 120 in other regions. In another embodiment, the sensor region 131d may be disposed in a specific region of the second housing structure 120 or may be replaced.

In one embodiment, during the flat state of the electronic device 100, the first housing structure 110 may be connected to the hinge structure (e.g., hinge structure 164 in FIG. 3), and may include a first surface 111 facing the front surface of the electronic device 100, a second surface 112 facing away from the first surface 111, and a first side member 113 enclosing at least a portion of the space between the first surface 111 and the second surface 112. In one embodiment, the first side member 113 may include a first side surface 113a disposed in parallel with the folding axis (A), a second side surface 113b extending from one end of the first side surface 113a in a direction perpendicular to the folding axis, and a third side surface 113c extending from the other end of the first side surface 113a in a direction perpendicular to the folding axis.

In one embodiment, during the flat state of the electronic device 100, the second housing structure 120 may be connected to the hinge structure (e.g., hinge structure 164 in FIG. 3), and may include a third surface 121 facing the front surface of the electronic device 100, a fourth surface 122 facing away from the third surface 121, and a second side member 123 enclosing at least a portion of the space between the third surface 121 and the fourth surface 122. In one embodiment, the second side member 123 may include a fourth side surface 123a disposed in parallel with the folding axis (A), a fifth side surface 123b extending from one end of the fourth side surface 123a in a direction perpendicular to the folding axis, and a sixth side surface 123c extending from the other end of the fourth side surface 123a in a direction perpendicular to the folding axis. In one embodiment, the third surface 121 may face the first surface 111 in the folded state.

In one embodiment, the electronic device 100 may include a recess 101 formed to accommodate the display 130 through a structural combination of the shapes of the first housing structure 110 and the second housing structure 120. The recess 101 may have substantially the same size as the display 130. In one embodiment, the recess 101 may have two or more different widths in a direction perpendicular to the folding axis (A) due to the sensor region 131d. For example, the recess 101 may have a first width (W1) between a first portion 120a of the second housing structure 120 parallel to the folding axis (A) and a first portion 110a of the first housing structure 110 formed at the edge of the sensor region 131d, and have a second width (W2) between a second portion 120b of the second housing structure 120 and a second portion 110b of the first housing structure 110 that does not correspond to the sensor region 113d and is parallel to the folding axis (A). Here, the second width (W2) may be wider than the first width (W1). In other words, the recess 101 may be formed to have the first width (W1) ranging from the first portion 110a of the first housing structure 110 to the first portion 120a of the second housing structure 120 (asymmetric shape), and the second width (W2) ranging from the second portion 110b of the first housing structure 110 to the second portion 120b of the second housing structure 120 (symmetric shape). In one embodiment, the first portion 110a and the second portion 110b of the first housing structure 110 may be located at different distances from the folding axis (A). The width of the recess 101 is not limited to the example shown above. In various embodiments, the recess 101 may have two or more different widths owing to the shape of the sensor region 113d or the asymmetry of the first housing structure 110 or the second housing structure 120.

In one embodiment, at least a portion of the first housing structure 110 and the second housing structure 120 may be made of a metal or non-metal material having a rigidity value selected to support the display 130.

In one embodiment, the sensor region 131d may be formed to have a preset area near to one corner of the first housing structure 110. However, the arrangement, shape, or size of the sensor region 131d is not limited to the illustrated example. For example, in a certain embodiment, the sensor region 131d may be formed at another corner of the first housing structure 110 or in any region between the upper corner and the lower corner.

In another embodiment, the sensor region 131d may be disposed at a portion of the second housing structure 120. In another embodiment, the sensor region 131d may be formed to extend between the first housing structure 110 and the second housing structure 120. In one embodiment, to perform various functions, the electronic device 100 may include components exposed to the front surface of the electronic device 100 through the sensor region 113d or through one or more openings provided in the sensor region 131d. The components may include, for example, at least one of a front camera, a receiver, a proximity sensor, an illuminance sensor, an iris recognition sensor, an ultrasonic sensor, or an indicator.

In one embodiment, the first rear cover 140 may be disposed on the second surface 112 of the first housing structure 110 and may have a substantially rectangular periphery. In one embodiment, at least a portion of the periphery may be wrapped by the first housing structure 110. Similarly, the second rear cover 150 may be disposed on the fourth surface 122 of the second housing structure 120, and at least a portion of the periphery thereof may be wrapped by the second housing structure 120.

In the illustrated embodiment, the first rear cover 140 and the second rear cover 150 may have a substantially symmetrical shape with respect to the folding axis (A). In another embodiment, the first rear cover 140 and the second rear cover 150 may have various different shapes. In another embodiment, the first rear cover 140 may be formed as a single body with the first housing structure 110, and the second rear cover 150 may be formed as a single body with the second housing structure 120.

In one embodiment, the first rear cover 140, the second rear cover 150, the first housing structure 110, and the second housing structure 120 may be combined with each other so as to provide a space where various components (e.g., printed circuit board, antenna module, sensor module, and battery) of the electronic device 100 can be arranged. In one embodiment, one or more components may be disposed on or visually exposed via the rear surface of the electronic device 100. For example, one or more components or sensors may be visually exposed through the first rear region 141 of the first rear cover 140. The sensors may include a proximity sensor, a rear camera, and/or a flash. In another embodiment, at least a portion of the sub-display 152 may be visually exposed through the second rear region 151 of the second rear cover 150.

The display 130 may be disposed on the space formed by the pair of housing structures 110 and 120. For example, the display 130 may be seated in the recess (e.g., recess 101 in FIG. 1) formed by the pair of housing structures 110 and 120, and may be disposed to substantially occupy most of the front surface of the electronic device 100. Hence, the front surface of the electronic device 100 may include the display 130, a portion (e.g., edge region) of the first housing structure 110 close to the display 130, and a portion (e.g. edge region) of the second housing structure 120 close to the display 130. In one embodiment, the rear surface of the electronic device 100 may include the first rear cover 140, a portion (e.g., edge region) of the first housing structure 110 close to the first rear cover 140, the second rear cover 150, and a portion (e.g. edge region) of the second housing structure 120 close to the second rear cover 150.

In one embodiment, the display 130 may refer to a display whose at least a portion may be deformed into a flat or curved surface. In one embodiment, the display 130 may include a folding region 131c, a first region 131a disposed on one side (e.g., right side of the folding region 131c) with respect to the folding region 131c, and a second region 131b disposed on the other side (e.g., left side of the folding region 131c). For example, the first region 131a may be disposed on the first surface 111 of the first housing structure 110, and the second region 131b may be disposed on the third surface 121 of the second housing structure 120. This demarcation of the display 130 is only an example, and the display 130 may be subdivided into plural regions (e.g., four or more regions) according to the structure or functionality. For example, in the embodiment of FIG. 1, the area of the display 130 may be subdivided with respect to the folding region 131c or the folding axis (A) extending parallel to the y-axis. However, in another embodiment, the area of the display 130 may be subdivided with respect to a different folding region (e.g., folding region parallel to the x-axis) or a different folding axis (e.g., folding axis parallel to the x-axis). The aforementioned subdivision of the display is only a physical demarcation based on the pair of housing structures 110 and 120 and the hinge structure (e.g., hinge structure 164 in FIG. 3), and the display 130 may substantially present one full screen through the pair of housing structures 110 and 120 and the hinge structure (e.g., hinge structure 164 in FIG. 3). In one embodiment, the first region 131a and the second region 131b may have a symmetrical shape with respect to the folding region 131c. Although the first region 131a may include a notch region (e.g., notch region 133 in FIG. 3) cut according to the presence of the sensor region 131d, it may have a symmetrical shape with the second region 131b in other portions. In other words, the first region 131a and the second region 131b may include portions with symmetrical shapes and portions with asymmetrical shapes.

Figure 2:
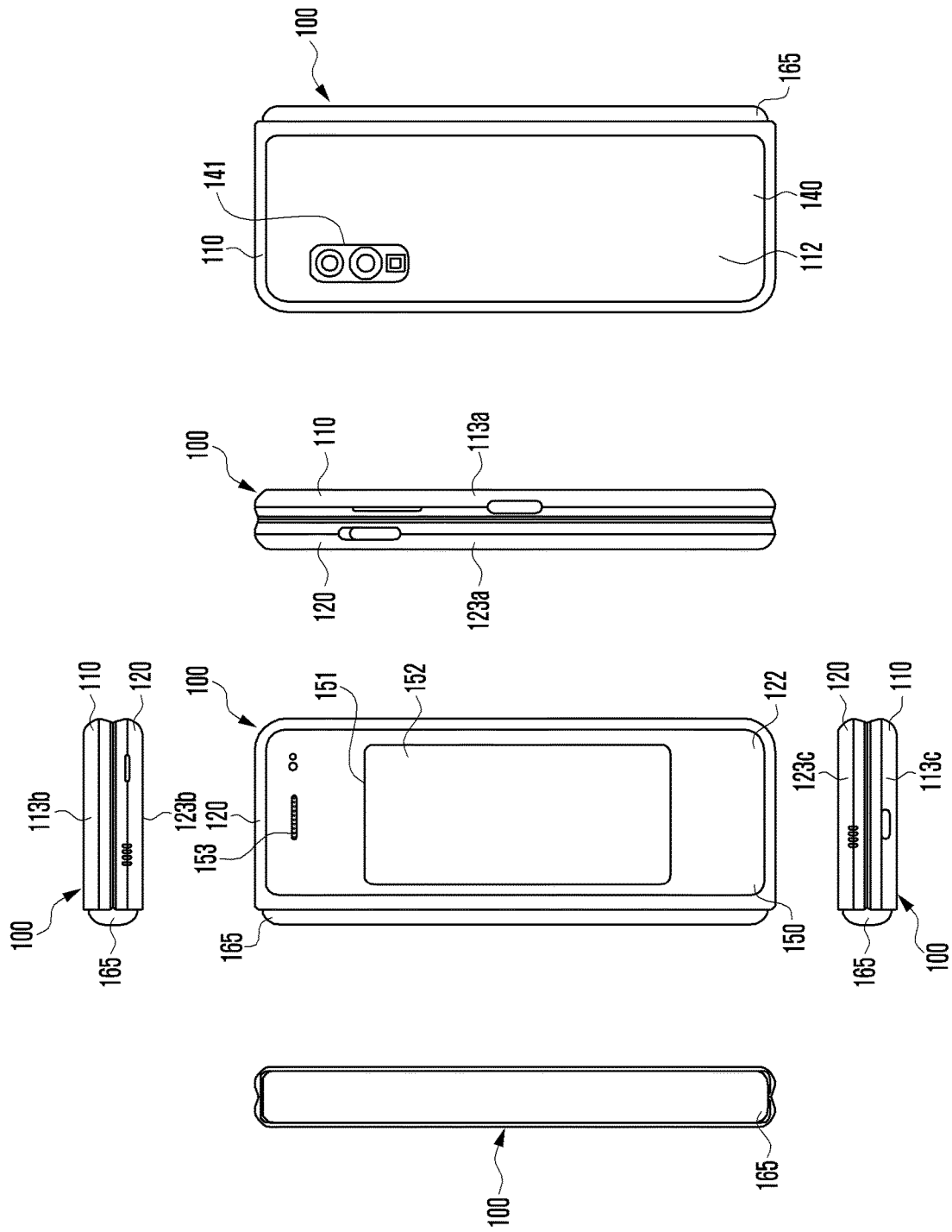
FIG. 2 illustrates an electronic device in a folded state according to an embodiment.

FIG. 2 illustrates a folded state of an electronic device according to an embodiment.

Figure 3:
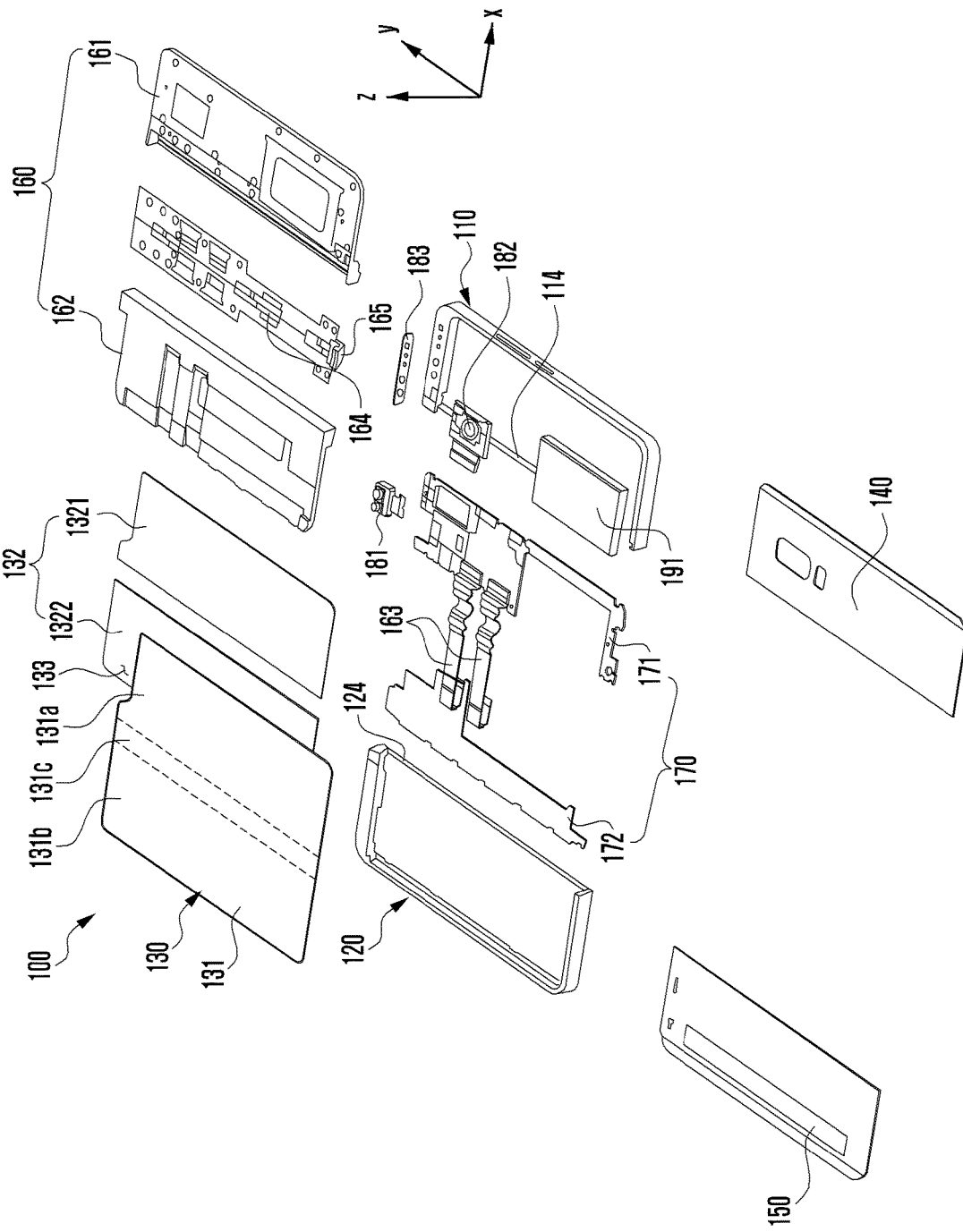
FIG. 3 illustrates an exploded perspective view of an electronic device according to an embodiment.

Referring to FIG. 2, the hinge cover 165 may be disposed between the first housing structure 110 and the second housing structure 120 so as to cover the internal components (e.g., hinge structure 164 in FIG. 3). In one embodiment, the hinge cover 165 may be covered by portions of the first housing structure 110 and the second housing structure 120 or be exposed to the outside according to the operating state (e.g., flat state or folded state) of the electronic device 100.

For example, when the electronic device 100 is in the flat state as illustrated in FIG. 1, the hinge cover 165 may be covered by the first housing structure 110 and the second housing structure 120 so as not to be exposed. When the electronic device 100 is in the folded state (e.g., completely folded state) as illustrated in FIG. 2, the hinge cover 165 may be exposed to the outside between the first housing structure 110 and the second housing structure 120. When the electronic device 100 is in the intermediate state where the first housing structure 110 and the second housing structure 120 make a certain angle, the hinge cover 165 may be partially exposed to the outside between the first housing structure 110 and the second housing structure 120. In this case, the exposed portion may be less than that for the fully folded state. In one embodiment, the hinge cover 165 may include a curved surface.

Next, a description is given of configurations of the first housing structure 110 and the second housing structure 120 and regions of the display 130 according to the operating state (e.g. flat state or folded state) of the electronic device 100.

In one embodiment, when the electronic device 100 is in the flat state (e.g., state of FIG. 1), the first housing structure 110 and the second housing structure 120 may make an angle of 180 degrees, and the first region 131a and the second region 131b of the display may be disposed to face in the same direction. In addition, the folding region 131c may be coplanar with the first region 131a and the second region 131b.

In one embodiment, when the electronic device 100 is in the folded state (e.g., state of FIG. 2), the first housing structure 110 and the second housing structure 120 may be disposed to face each other. The first region 131a and the second region 131b of the display 130 may face each other, making a narrow angle (e.g., between 0 degrees and 10 degrees). At least a portion of the folding region 131c may form a curved surface with a preset curvature.

In one embodiment, when the electronic device 100 is in the intermediate state, the first housing structure 110 and the second housing structure 120 may be disposed to make a certain angle. The first region 131a and the second region 131b of the display 130 may form an angle greater than that for the folded state and less than that for the flat state. At least a portion of the folding region 131c may form a curved surface with a preset curvature. This curvature may be less than that for the folded state.

FIG. 3 illustrates an exploded perspective view of an electronic device according to an embodiment.

Referring to FIG. 3, in one embodiment, the electronic device 100 may include a display 130, a support member assembly 160, at least one printed circuit board 170, a first housing structure 110, a second housing structure 120, a first rear cover 140, and a second rear cover 150. In the description, the display 130 may be referred to as a display unit, display module, or display assembly.

The display 130 may include a display panel 131 (e.g., flexible display panel), and at least one plate 132 or layer on which the display panel 131 is seated. In one embodiment, the plate 132 may be disposed between the display panel 131 and the support member assembly 160. The display panel 131 may be disposed in at least a portion of one surface of the plate 132. The plate 132 may include a first plate 1321 and a second plate 1322 divided based on the hinge structure 164. The plate 132 may include at least one member that cannot be folded together when the first housing structure 110 and the second housing structure 120 rotate in a folded and/or unfolded state based on the hinge structure 164. The plate 132 may include at least one subsidiary material layer (e.g., graphite member) and/or a conductive plate (e.g., SUS sheet or Cu sheet) disposed at a rear surface of the display panel 131. In one embodiment, the plate 132 may be formed in a shape corresponding to the display panel 131. For example, a partial area of the first plate 1321 may be formed in a shape corresponding to the notch area 133 of the display panel 131. In another embodiment, the conductive plate may be integrally formed through a bendable connecting area.

The support member assembly 160 may include a first support member 161, a second support member 162, a hinge structure 164 disposed between the first support member 161 and the second support member 162, a hinge cover 165 to cover the hinge structure 164 when viewed from the outside, and a wiring member 163 (e.g., flexible printed circuit board (FPCB)) that crosses the first support member 161 and the second support member 162.

In one embodiment, the support member assembly 160 may be disposed between the plate 132 and at least one printed circuit board 170. For example, the first support member 161 may be disposed between the first region 131a of the display 130 and the first printed circuit board 171. The second support member 162 may be disposed between the second region 131b of the display 130 and the second printed circuit board 172.

In one embodiment, at least a portion of the wiring member 163 and the hinge structure 164 may be disposed within the support member assembly 160. The wiring member 163 may be disposed in a direction crossing the first support member 161 and the second support member 162 (e.g., x-axis direction). The wiring member 163 may be disposed in a direction (e.g., x-axis direction) perpendicular to the folding axis (e.g., y-axis or folding axis (A) in FIG. 2) of the folding region 131c.

The at least one printed circuit board 170 may include, as described above, the first printed circuit board 171 disposed on the side of the first support member 161, and the second printed circuit board 172 disposed on the side of the second support member 162. The first printed circuit board 171 and the second printed circuit board 172 may be disposed inside the space formed by the support member assembly 160, the first housing structure 110, the second housing structure 120, the first rear cover 140, and the second rear cover 150. Various components for implementing functions of the electronic device 100 may be mounted on the first printed circuit board 171 and the second printed circuit board 172.

In an embodiment, the first housing structure 110 may include a first printed circuit board 171, a battery 191, at least one sensor module 181, or at least one camera module 182 disposed in a space formed through the first support member 161. The first housing structure 110 may include a window glass 183 disposed to protect at least one sensor module 181 and at least one camera module 182 at a position corresponding to the notch area 133 of the display 130. In an embodiment, the second housing structure 120 may include a second printed circuit board 172 disposed in a space formed through the second support member 162. According to one embodiment, the first housing structure 110 and the first support member 161 may be integrally formed. According to one embodiment, the second housing structure 120 and the second support member 162 may also be integrally formed.

In one embodiment, the first housing structure 110 may include a first rotary support surface 114, and the second housing structure 120 may include a second rotary support surface 124 corresponding to the first rotary support surface 114. The first rotary support surface 114 and the second rotary support surface 124 may include a curved surface corresponding to the curved surface included in the hinge cover 165.

In one embodiment, when the electronic device 100 is in the flat state (e.g., state of FIG. 1), the first rotary support surface 114 and the second rotary support surface 124 may cover the hinge cover 165 so that the hinge cover 165 may be not or minimally exposed to the rear surface of the electronic device 100. When the electronic device 100 is in the folded state (e.g., state of FIG. 2), the first rotary support surface 114 and the second rotary support surface 124 may rotate along the curved surface included in the hinge cover 165 so that the hinge cover 165 may be maximally exposed to the rear surface of the electronic device 100.

Certain embodiments of the disclosure may provide a housing, a method of producing the same, and an electronic device including the same.

Certain embodiments of the disclosure may provide a housing in which a uniform processing line may be formed in the housing that includes corners having different radii of curvature, a method of producing the housing, and an electronic device including the same.

Certain embodiments of the disclosure may provide a housing, a method of producing the housing, and an electronic device including the same in which the electronic device has enhanced aesthetic appearance due to a uniform processing line in the housing that includes corners having different radii of curvature.

Certain embodiments of the disclosure may provide a housing, a method of producing the housing, and an electronic device including the same configured for sound transmission. The sound transmission may be improved because an adhesion area between an acoustic module assembly and the housing may be extended regardless of the size and/or shape of a sound transmission opening formed in the outer surface of the housing.

Figure 4A:
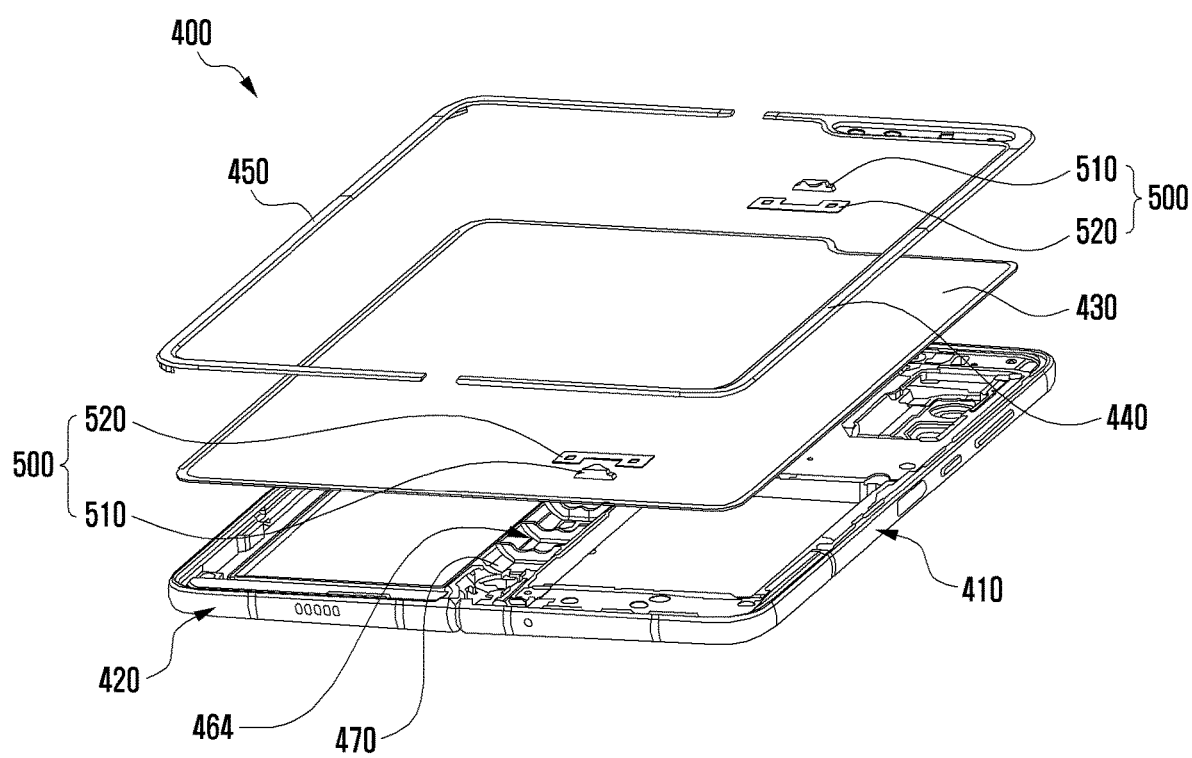
FIG. 4A illustrates an electronic device including a protection structure according to an embodiment.
Figure 4B:
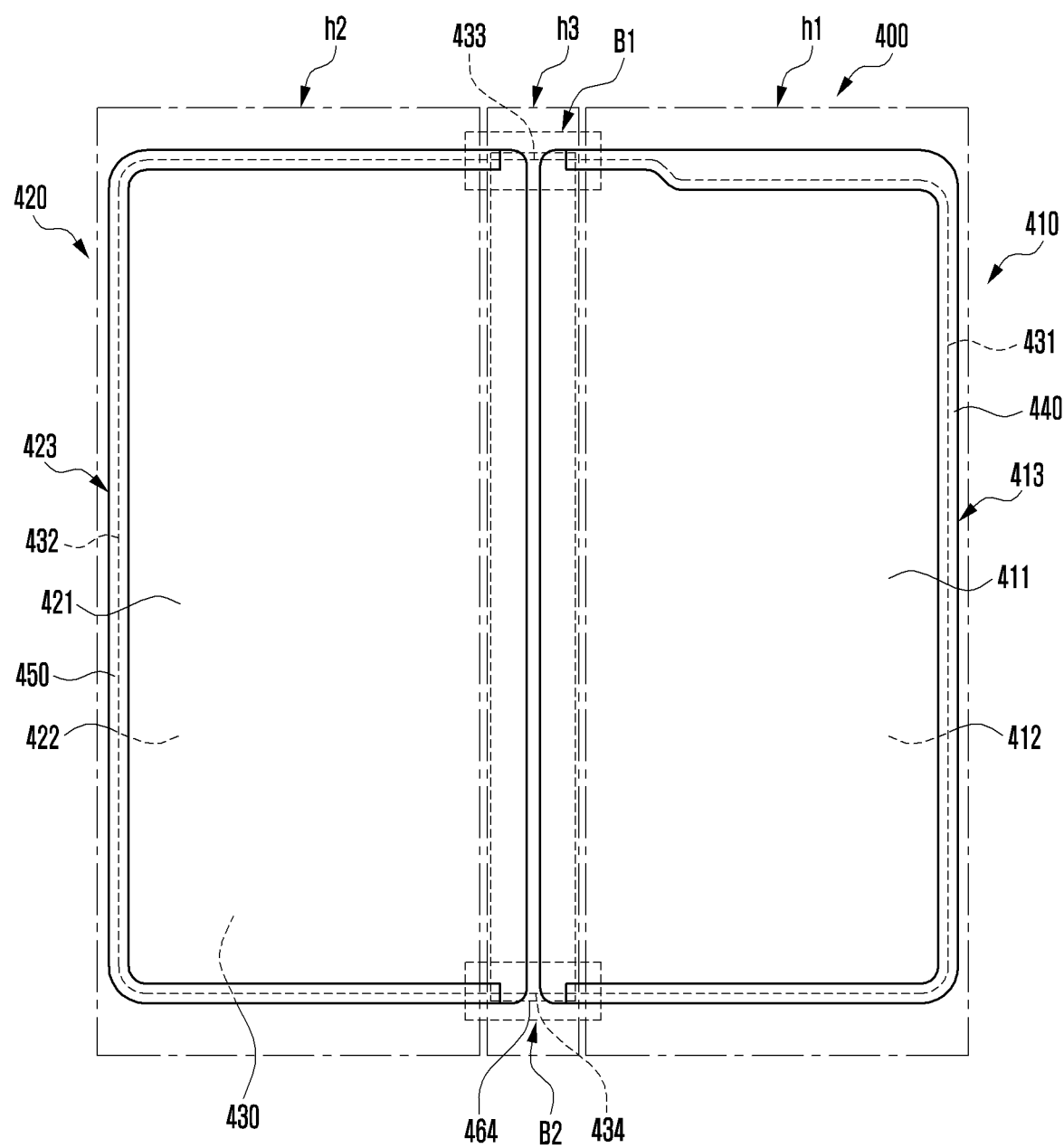
FIG. 4B illustrates regions or zones configured in an electronic device according to an embodiment.

FIG. 4A illustrates an exploded perspective view of an electronic device including a protection structure according to an embodiment. FIG. 4B illustrates regions or zones configured in an electronic device according to an embodiment.

Referring to FIGS. 4A and 4B, the electronic device 400 includes a first housing structure 410, which includes a first surface 411, a second surface 412 facing opposite the first surface 411, a first side member 413 surrounding a first space between the first surface 411 and the second surface 412. The electronic device 400 includes a second housing structure 420, which includes a third surface 421 facing the same direction as the first surface 411, a fourth surface 422 facing the same direction as the second surface 412, a second side member 423 surrounding a second space between the third surface 421 and the fourth surface 422. The first housing structure 410 and the second housing structure 420 may be rotatably installed relative to each other through a hinge structure 464. For example, the hinge structure 464 may allow the first housing structure 410 and the second housing structure 420 to fold or unfold relative to each other by use of at least one hinge module included in the hinge housing 470. When the electronic device 400 is folded, the first surface 411 and the third surface 421 face each other. When the electronic device 400 is unfolded, the first surface 411 and the third surface 421 may face the same direction.

The electronic device 400 includes a display 430 (e.g., a flexible display) that at least partially crosses the first surface 411 and the third surface 421. The display 430 may be arranged to be supported by at least some portions of the first housing structure 410, the hinge structure 464, and the second housing structure 420.

The electronic device 400 includes a first region h1 facing the first housing structure 410, a second region h2 facing the second housing structure 420, and a folding region h3 facing the hinge structure 464. In the electronic device 400, the first housing structure 410 corresponding to the first region h1 is folded or unfolded relative to the second housing structure 420 corresponding to the second region h2 through the hinge structure 464 corresponding to the folding region h3.

The electronic device 400 may include at least one protection cover 440 or 450 disposed on the display 430. The at least one protection cover 440 and 450 may be used as a decorative member. The at least one protection cover 440 or 450 may include a first protection cover 440 disposed in the first region h1 and a second protection cover 450 disposed in the second region h2. The first protection cover 440 may be disposed on the display 430 in the first region h1. For example, the display 430 may be arranged such that the first periphery 431 corresponding to the first region h1 is not exposed to the outside between the first protection cover 440 and the first housing structure 410.

The second protection cover 450 may be disposed on the display 430 in the second region h2. For example, the display 430 may be arranged such that the second periphery 432 corresponding to the second region h2 is not exposed to the outside between the second protection cover 450 and the second housing structure 420. The protection covers 440 and 450 may be made of a polymer material or a metal material, and may be arranged respectively at the housing structures 410 and 420 through at least one coupling option such as bonding, taping, fusion, or structural bonding.

Alternatively, for the folding operation of the first housing structure 410 and the second housing structure 420 with respect to the hinge structure 464, the pair of protection covers 440 and 450 may be omitted from the folding region h3 corresponding to the hinge structure 464.

The electronic device 400 may include protection structures 500 to protect the third periphery 433 and the fourth periphery 434 of the display 430 exposed to the outside in the folding region h3. The third periphery 433 and the fourth periphery 434 of the display 430 may be at least partially blocked by the protection structures 500 so as to be invisible from the outside.

The protection structures 500 may be arranged respectively to protect the third periphery 433 exposed to a first blocking zone B1 being one end of the hinge structure 464 in the folding region h3 and the fourth periphery 434 exposed to a second blocking zone B2 being the other end of the hinge structure 464. The protection structure 500 includes a protective cap 510 disposed in the hinge housing 470 of the electronic device 400, and a blocking member 520 at least partially supported by the protective cap 510 and arranged to at least partially conceal the third periphery 433 of the display 430 from the outside. The protection structures 500 disposed in the blocking zones B1 and B2 may have substantially the same configuration. Therefore, the protection structure 500 disposed in the first blocking zone B1 will be shown and described in detail below, while a description on the protection structure 500 disposed in the second blocking zone B2 will be omitted.

Figure 5A:
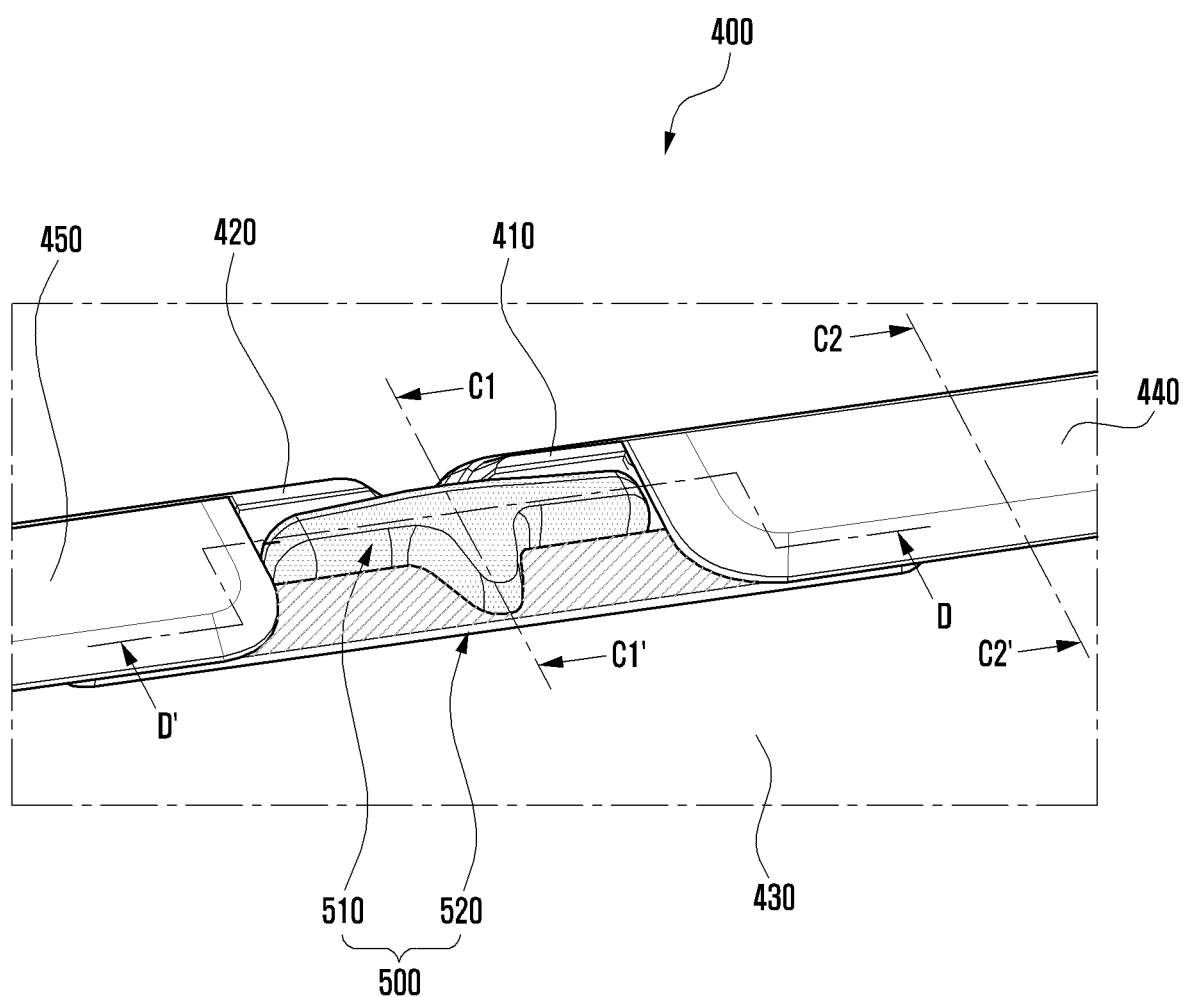
FIGS. 5A and 5B illustrate a first blocking zone B1 including a protection structure in the electronic device of FIG. 4B according to an embodiment.
Figure 5B:
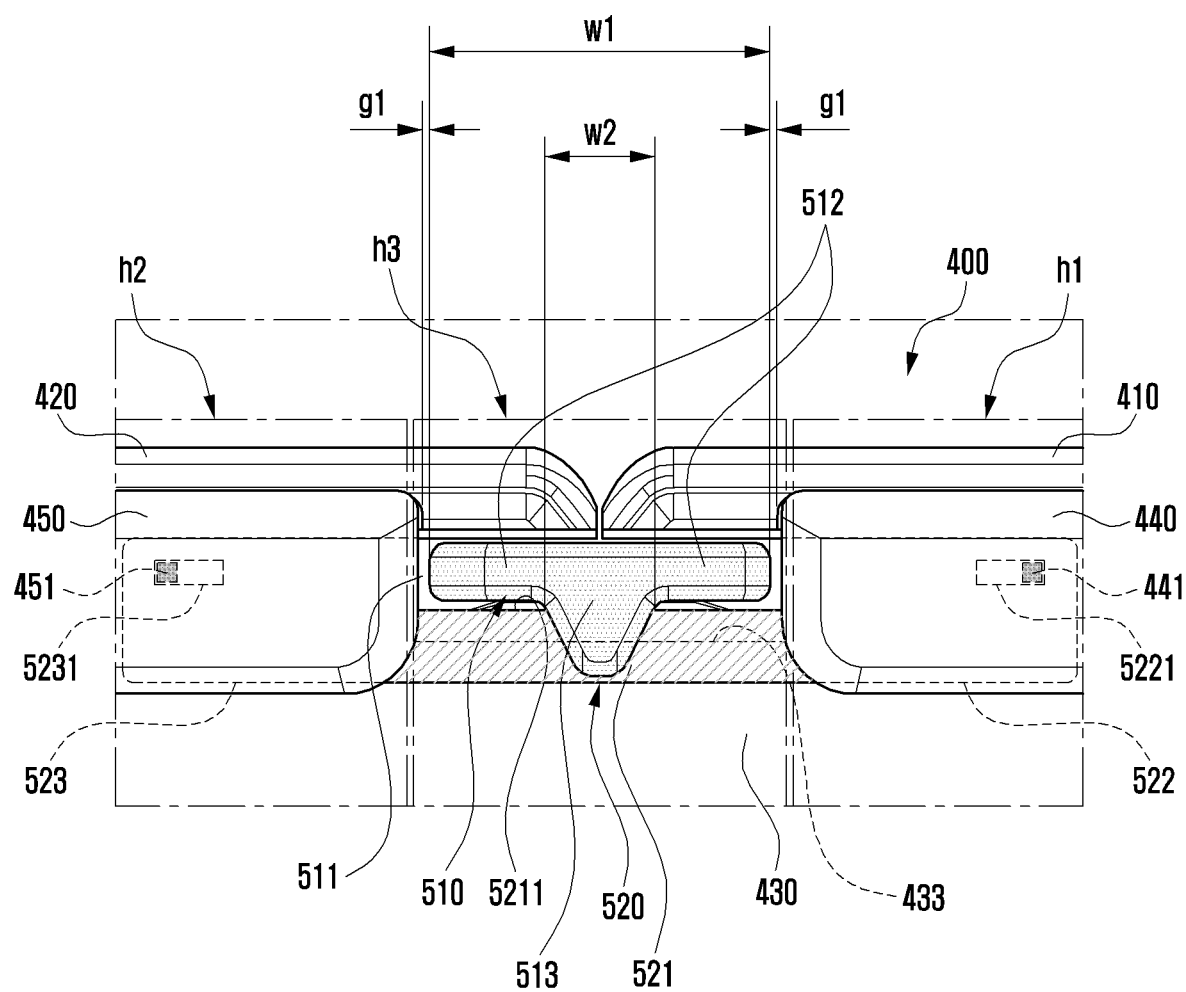

FIGS. 5A and 5B illustrate a first blocking zone B including the protection structure 500 in the electronic device of FIG. 4B according to an embodiment.

Referring to FIGS. 5A and 5B, the electronic device 400 includes the first region h1 facing the first housing structure 410, the second region h2 facing the second housing structure 420, and the folding region h3 facing the hinge structure. The electronic device 400 includes, as the protection structure 500, the protective cap 510 and the blocking member 520 formed to be at least partially supported by the protective cap 510 in the first blocking zone B1 of the folding region h3. The blocking member 520 includes a film member made of a polymer material such as polyurethane (PU) or thermoplastic polyurethane (TPU).

Alternatively, the blocking member 520 may include a thin metal plate. The blocking member 520 may be supported by at least a portion of the protective cap 510, cover the third periphery 433 on the display 430, and may connect the first protection cover 440 and the second protection cover 450. Specifically, the blocking member 520 may connect the first protection cover 440 and the second protection cover 450 and may block the third periphery 433 of the display 430 exposed to the folding region h3 from being visible from the outside, thereby preventing the display from being damaged by arbitrary manipulation of the periphery 433. In addition, at least a portion of the protective cap 510 fills the space between the hinge housing and the display 430, thereby preventing deformation of the display 430 due to the pressing.

The protective cap 510 includes, in the folding region h3, a base 511 fixed to the hinge housing 470, a protrusion 512 extending upward from the base 511 and having a first width w1, and a support part 513 extending from the protrusion 512 toward the display, supporting at least a portion of the blocking member 520 and having a second width w2 smaller than the first width w1. The support part 513 may be formed so that its width gradually decreases as it is closer to the display, or the width may be fixed. Alternatively, the support part 513 may be formed so that its width gradually increases as it is closer to the display. The base 511 may include a stepped portion formed lower than the protrusion 512 at the left and right ends. For the quality of the exterior of the electronic device 400 and preventing the inflow of foreign substances, the first width w1 of the protrusion 512 may be determined for reducing the gap g1 with the protection covers 440 and 450. The second width w2 of the support part 513 may be determined based on a radius of curvature formed when the display 430 is folded. The protective cap 510 may be made of polycarbonate (PC), rubber, urethane, silicone, and/or metal. Alternatively, the protective cap 510 may be formed through insert injection molding that injects a metal material into a polymer material.

The blocking member 520 includes, in a region corresponding to the folding region h3, a bendable part 521 disposed to at least partially cover the third periphery 433 of the display 430, a first extension part 522 extending between the first housing structure 410 and the first protection cover 440 from the bendable part 521, and a second extension part 523 extending between the second housing structure 420 and the second protection cover 450 from the bendable part 521. The bendable part 521 includes a seating portion 5211 for accommodating the protrusion 512 of the protective cap 510. The protrusion 512 of the protective cap 510 is seated on the seating portion 5211 of the blocking member 520 and some portions of the extension parts 522 and 523 extending toward the left and right of the seating portion 5211 are supported by the stepped portion of the base 511.

Figure 6A:
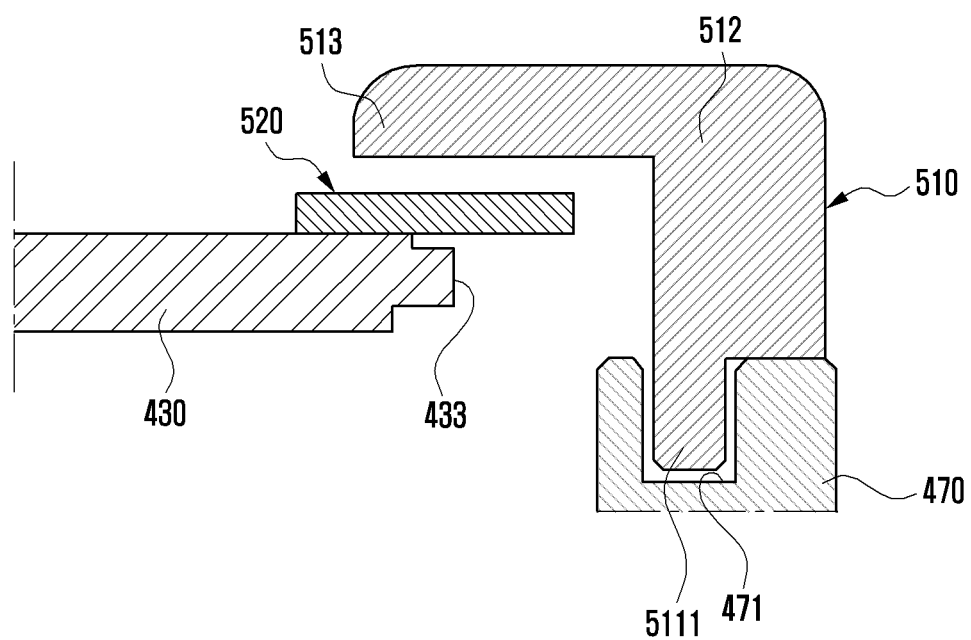
FIG. 6A illustrates a partial cross-sectional view of the electronic device in FIG. 5A taken along the line C1-C1' according to an embodiment.

FIG. 6A illustrates a partial cross-sectional view of the electronic device 400 in FIG. 5A taken along the line C1-C1' according to an embodiment.

Referring to FIG. 6A, the support part 513 of the protective cap 510 may be disposed at a position at least partially overlapping with the third periphery 433 of the display 430 when the display 430 is viewed from above. The blocking member 520 may be disposed on the display 430 so that at least a portion of the blocking member 520 covers the third periphery 433 of the display 430. At least a portion of the blocking member 520 may be disposed between the support part 513 of the protective cap 510 and the display 430, so that the blocking member 520 can be firmly supported.

Figure 6B:
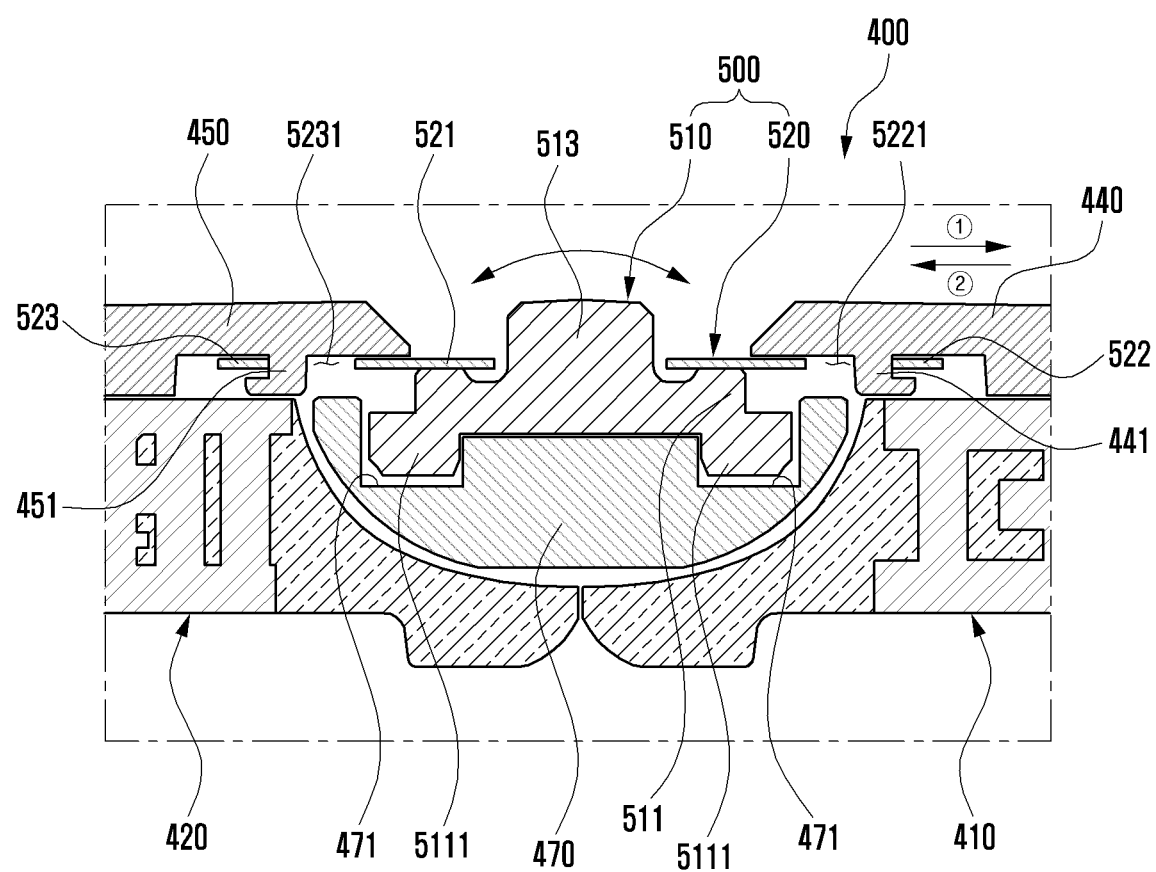
FIG. 6B illustrates a partial cross-sectional view of the electronic device in FIG. 5A taken along the line D-D' according to an embodiment.

FIG. 6B illustrates a partial cross-sectional view of the electronic device in FIG. 5A taken along the line D-D' according to an embodiment.

Referring to FIGS. 5B and 6B, the electronic device 400 may further include a guide structure for alleviating the concentration of stress applied to the bendable part 521 of the blocking member 520 due to the folding operation of the first housing structure 410 and the second housing structure 420 and providing smooth flexural characteristics without excessive stress on the display 430. The blocking member 520 includes a first guide hole 5221 formed at the first extension part 522 to receive a first guide protrusion 441 protruding from the inner surface of the first protection cover 440 toward the first housing structure 410, and a second guide hole 5231 formed at the second extension part 523 to receive a second guide protrusion 451 protruding from the inner surface of the second protection cover 450 toward the second housing structure 420. When the first housing structure 410 and the second housing structure 420 are in a folding operation, the first extension part 522 and the second extension part 523 of the blocking member 520 can be moved in the left and right directions (e.g., ① direction or ② direction in FIG. 6B) under the guidance of the first guide protrusion 441 and the second guide protrusion 451 penetrating the first guide hole 5221 and the second guide hole 5231, respectively, alleviating the concentration of stress applied to the bendable part 521. For example, to prevent separation of the first extension part 522 and the second extension part 523 while folding or unfolding the electronic device 400, the first guide protrusion 441 and the second guide protrusion 451 may protrude up to the first housing structure 410 and the second housing structure 420.

Alternatively, the first guide protrusion 441 and the second guide protrusion 451 may be structurally coupled to the first housing structure 410 and the second housing structure 420, respectively, or the first guide protrusion 441 and the second guide protrusion 451 may have a shape (e.g., hook shape) for preventing separation of the first extension part 522 and the second extension part 523 while folding or unfolding the electronic device 400.

The protective cap 510 includes at least one seating protrusion 5111 protruding downward from the base 511. When the protective cap 510 is disposed in the hinge housing 470, the protective cap 510 may be fixed by seating the at least one seating protrusion 5111 in a seating groove 471 formed at the hinge housing 470. The seating protrusion 5111 of the protective cap 510 may be fixed to the seating groove 471 of the hinge housing 470 through at least one process including bonding, taping, or fusion.

Figure 6C:
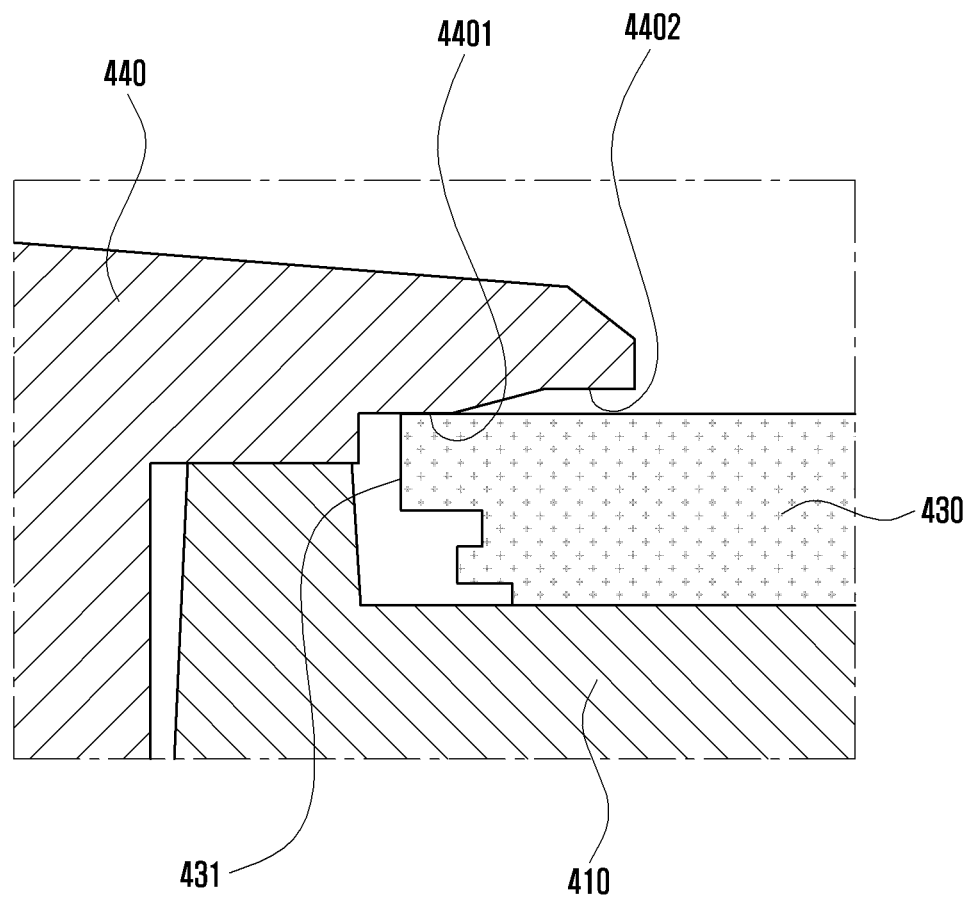
FIG. 6C illustrates a partial cross-sectional view of the electronic device in FIG. 5A taken along the line C2-C2' according to an embodiment.

FIG. 6C illustrates a partial cross-sectional view of the electronic device in FIG. 5A taken along the line C2-C2' according to an embodiment. Specifically, FIG. 6C illustrates an arrangement of the display 430 between the first protection cover 440 and the first housing structure 410 in the first region h1. In the second region h2, the arrangement of the display 430 between the second protection cover 450 and the second housing structure 420 is substantially the same as in the first region h1, and a description thereof may be omitted.

Referring to FIG. 6C, the first protection cover 440 may be disposed in the first housing structure 410 to at least partially overlap the display 430 (e.g., the first periphery 431) when the display 430 is viewed from above. The first protection cover 440 includes a first portion 4401 being in contact with at least a portion of the display 430 to prevent the display 430 from sagging, and a second portion 4402 extending from the first portion 4401 and spaced apart from the display 430 by a preset distance in the vertical direction. The first portion 4401 of the first protection cover 440 may supports the display 430 near the first periphery 431. The second portion 4402 extending from the first portion 4401 of the first protection cover 440 may be spaced apart from the display 430, thereby preventing damage to the outer surface of the display 430.

Figure 6D:
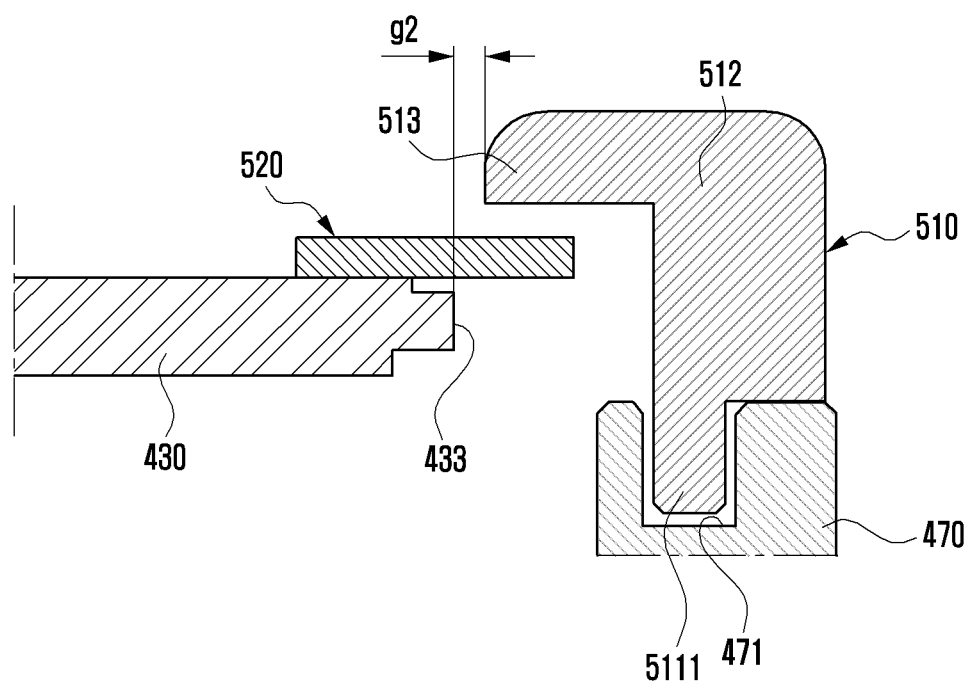
FIG. 6D illustrates a partial cross-sectional view of an electronic device according to an embodiment.

FIG. 6D illustrates a partial cross-sectional view of an electronic device according to an embodiment.

Referring to FIG. 6D, the support part 513 of the protective cap 510 may be disposed to not overlap the third periphery 433 of the display 430 when the display 430 is viewed from above. When the support part 513 and the display 430 overlap, damage may be caused to a portion of the display 430 overlapping the protective cap 510 while the display 430 is folded. Also, the support part 513 of the protective cap 510 not overlapping the third periphery 433 of the display 430 prevents the height of the protrusion 512 from increasing. Hence, the protective cap 510 may be arranged in the folding region h3 such that the support part 513 maintains a preset gap g2 with the third periphery 433 of the display 430 when the display 430 is viewed from above.

Figure 7:
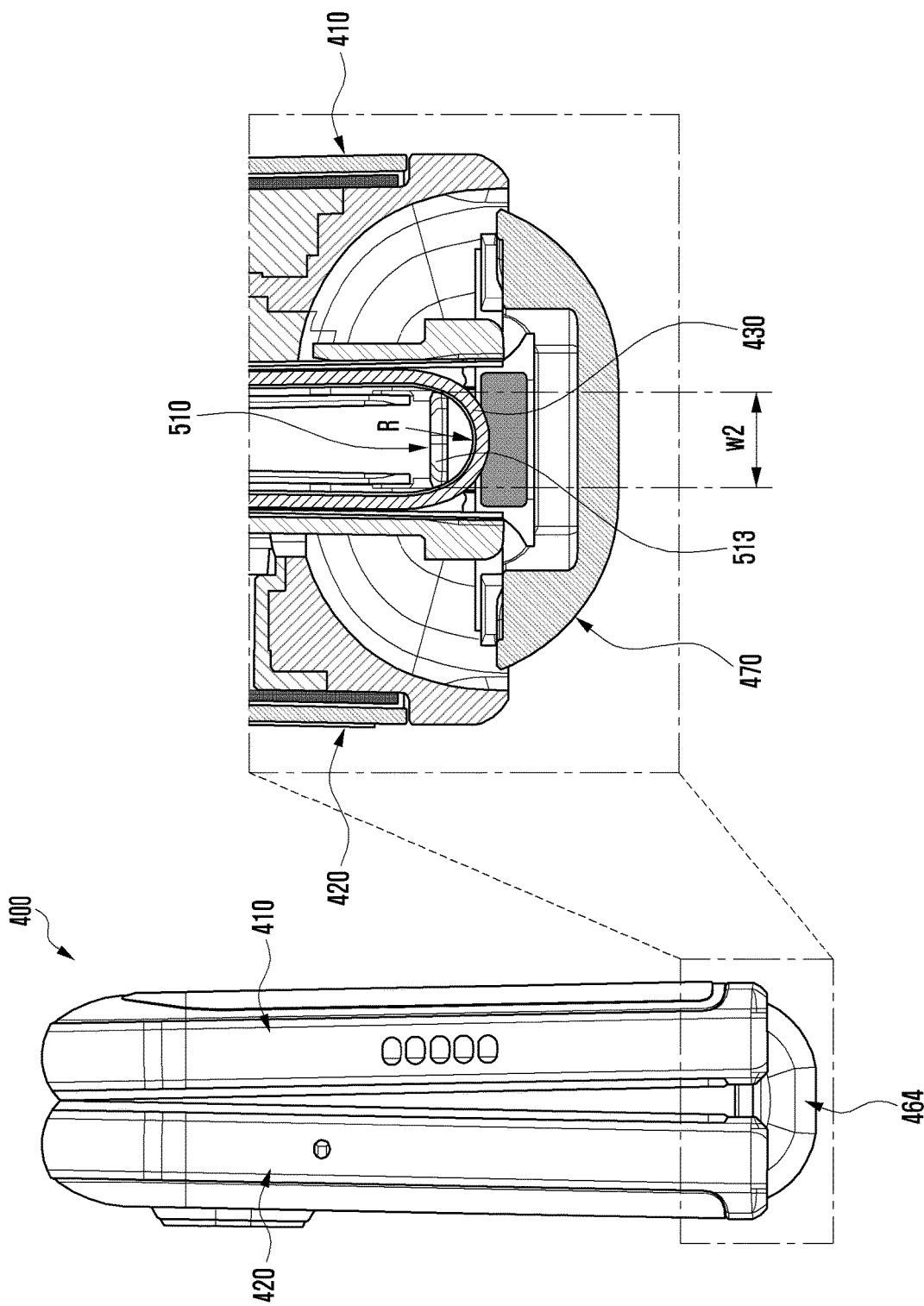
FIG. 7 illustrates a size of a protective cap determined based on a radius of curvature of a display when an electronic device is folded according to an embodiment.

FIG. 7 illustrates a size of a protective cap determined based on a radius of curvature of a display when an electronic device is folded according to an embodiment.

Referring to FIG. 7, when the electronic device 400 is folded, the display 430 corresponding to the folding region h3 formed by the first housing structure 410 and the second housing structure 420 may be folded to have a specific radius of curvature R due to the in-folding characteristic. The blocking member 520 may also be folded to have substantially the same radius of curvature R together with the display 430 while surrounding the support part 513 protruding from the protrusion 512 of the protective cap 510. As a result, the size of the support part 513 extending from the protrusion 512 of the protective cap 510 may be determined based on the radius of curvature R formed by the display 430 when the electronic device 400 is folded. For example, as the radius of curvature is smaller, the size of the support part 513 (e.g., second width w2) may be reduced.

Figure 8:
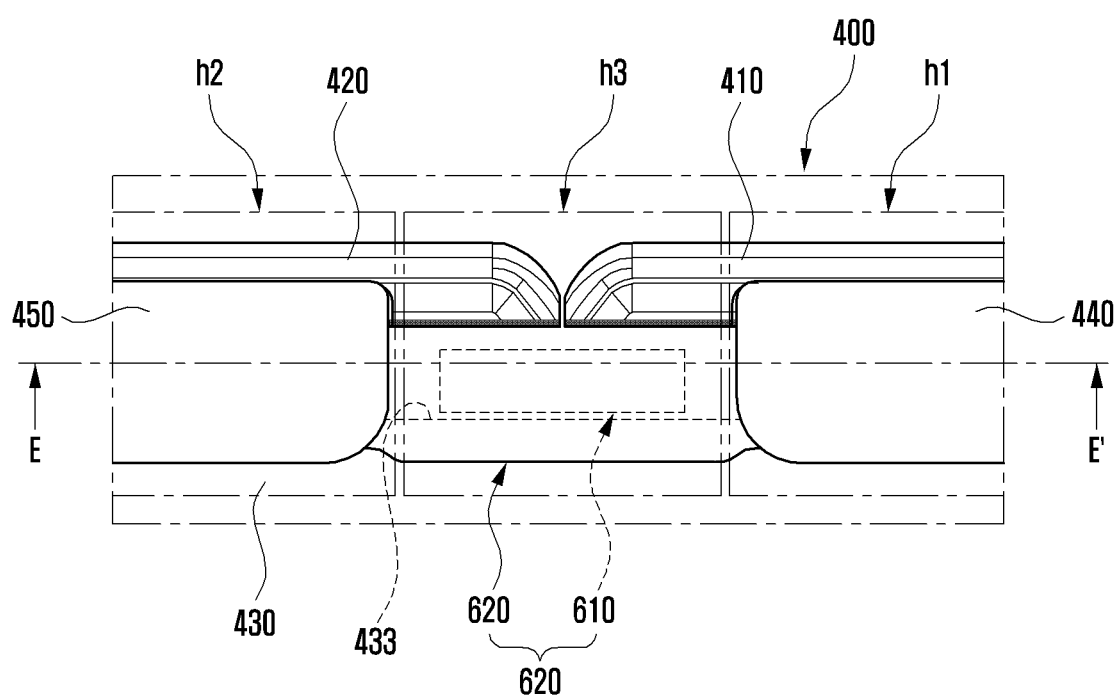
FIG. 8 illustrates a partial view of an electronic device including a blocking member according to an embodiment.
Figure 9:
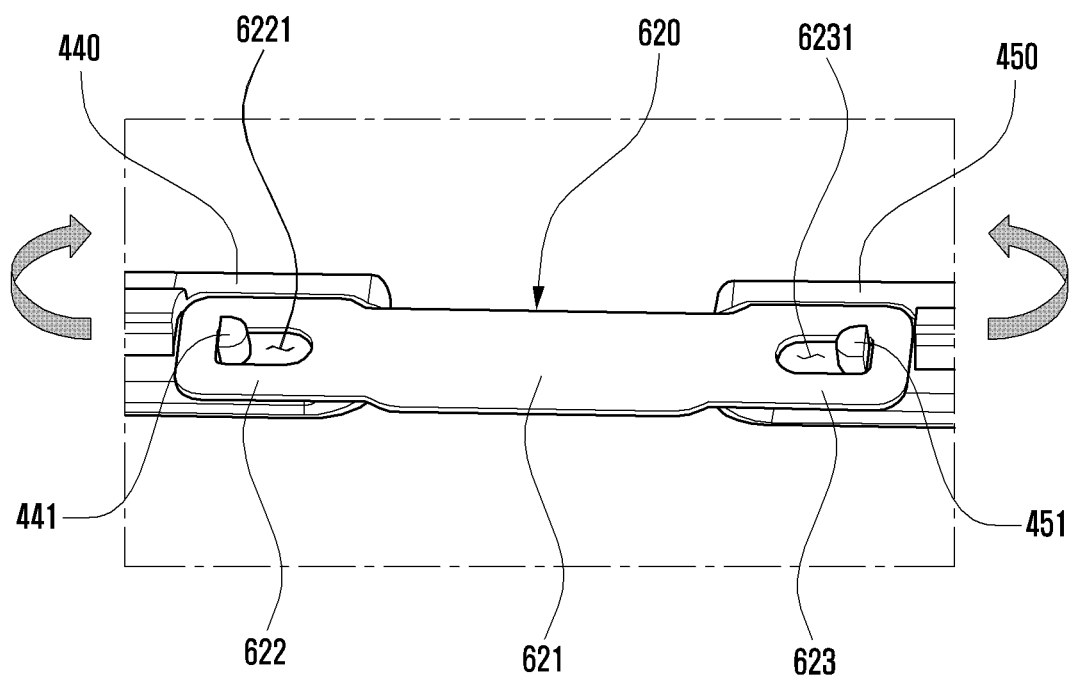
FIG. 9 illustrates a partial perspective view illustrating a blocking member arranged on protection covers according to an embodiment.
Figure 10:
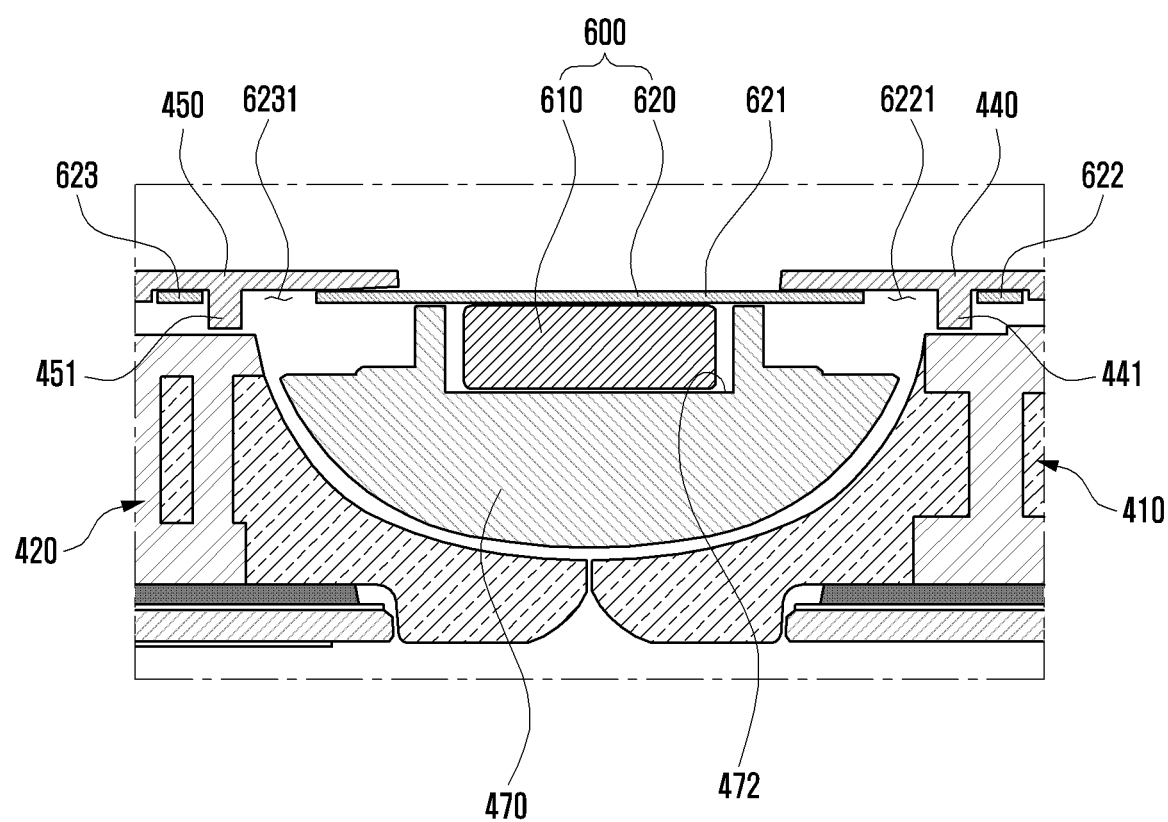
FIG. 10 illustrates a partial cross-sectional view of the electronic device in FIG. 8 taken along the line E-E' according to an embodiment.

FIG. 8 illustrates a partial view of an electronic device including a blocking member according to an embodiment. FIG. 9 illustrates a partial perspective view illustrating the blocking member of FIG. 8 arranged on protection covers according to an embodiment. FIG. 10 illustrates a partial cross-sectional view of the electronic device in FIG. 8 taken along the line E-E' according to an embodiment.

Referring to FIGS. 8 to 10, the electronic device 400 includes, as a protection structure 600 in the folding region h3, a blocking member 620 that covers the third periphery 433 of the display 430 and is supported at both ends by the first protection cover 440 and the second protection cover 450 without a protective cap exposed outside. The blocking member 620 includes, in a region corresponding to the folding region (h3), a bendable part 621 formed to at least partially cover the third periphery 433 of the display 430, a first extension part 622 extending between the first housing structure 410 and the first protection cover 440 from the bendable part 621, and a second extension part 623 extending between the second housing structure 420 and the second protection cover 450 from the bendable part 621.

The blocking member 620 includes a first guide hole 6221 formed in the first extension part 622 to accommodate the first guide protrusion 441 protruding from the inner surface of the first protection cover 440 toward the first housing structure 410, and a second guide hole 6321 formed in the second extension part 623 to accommodate the second guide protrusion 451 protruding from the inner surface of the second protection cover 450 toward the second housing structure 420. When the first housing structure 410 and the second housing structure 420 are folded, the first extension part 622 and the second extension part 623 of the blocking member 620 can be moved in the left and right directions under the guidance of the first guide protrusion 441 and the second guide protrusion 451 penetrating the first guide hole 6221 and the second guide hole 6231, respectively, thereby alleviating the concentration of stress applied to the bendable part 621 and preventing damage to the display 430 due to an excessive bending force of the bendable part 621. The electronic device 400 may include a support member 610 seated in the seating groove 472 formed in the hinge housing 470 and disposed to have a thickness for supporting the rear surface of the blocking member 620. The support member 610 may be disposed, in the hinge housing 470, at a location overlapping the blocking member 620 so as to not be visible from the outside when the display 430 is viewed from above. The support member 610 may be made of a polymer material having elasticity such as rubber, urethane, or silicone.

The blocking member 620 may be a thin film member made of a metal member such as stainless steel (SUS) or aluminum (Al). The blocking member 620 may be a thin film member including a polymer member such as polyethylene terephthalate (PET), PU, or TPU.

Figure 11:
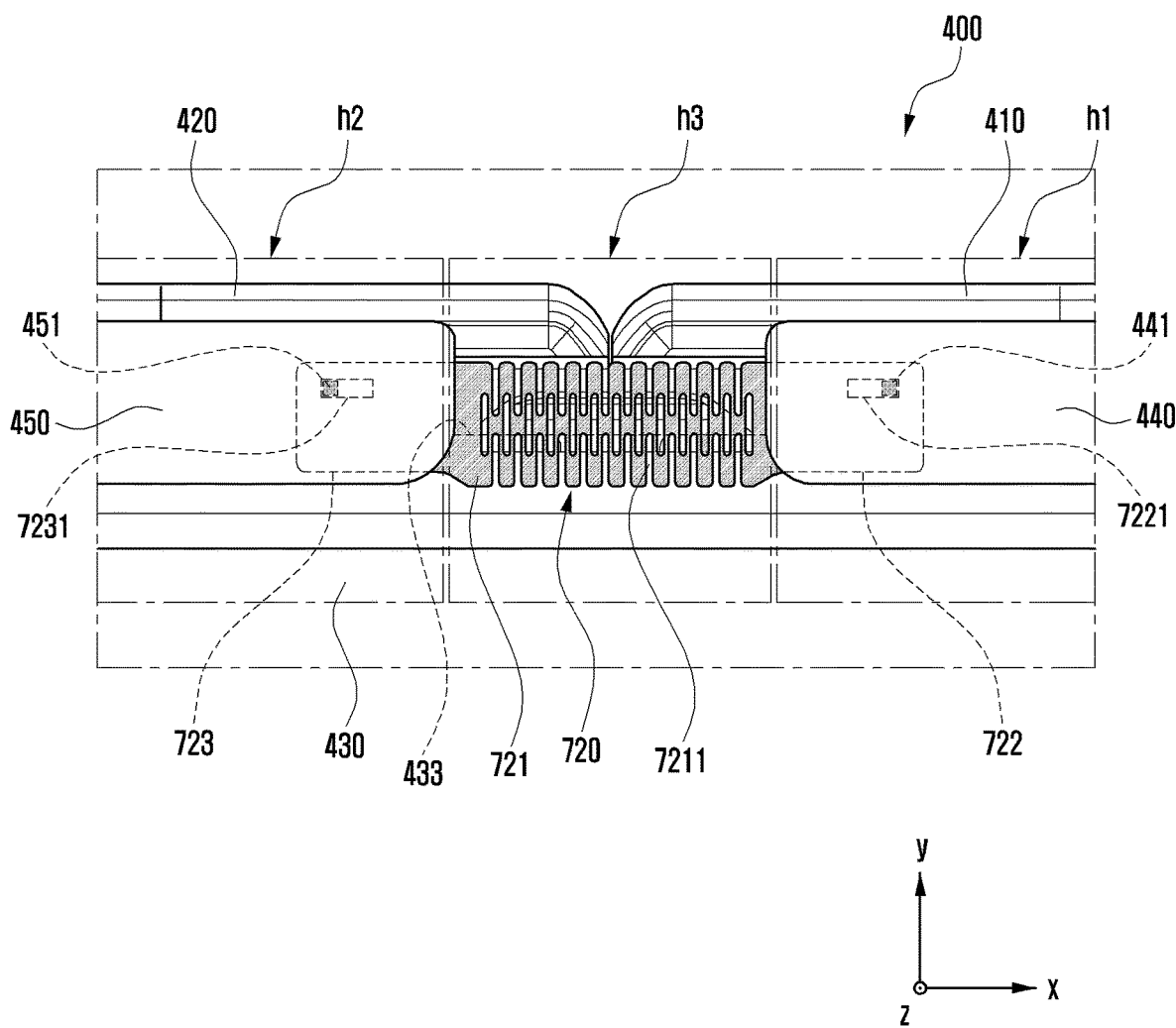
FIGS. 11 and 12 illustrate a partial view of an electronic device including a blocking member according to an embodiment.
Figure 12:
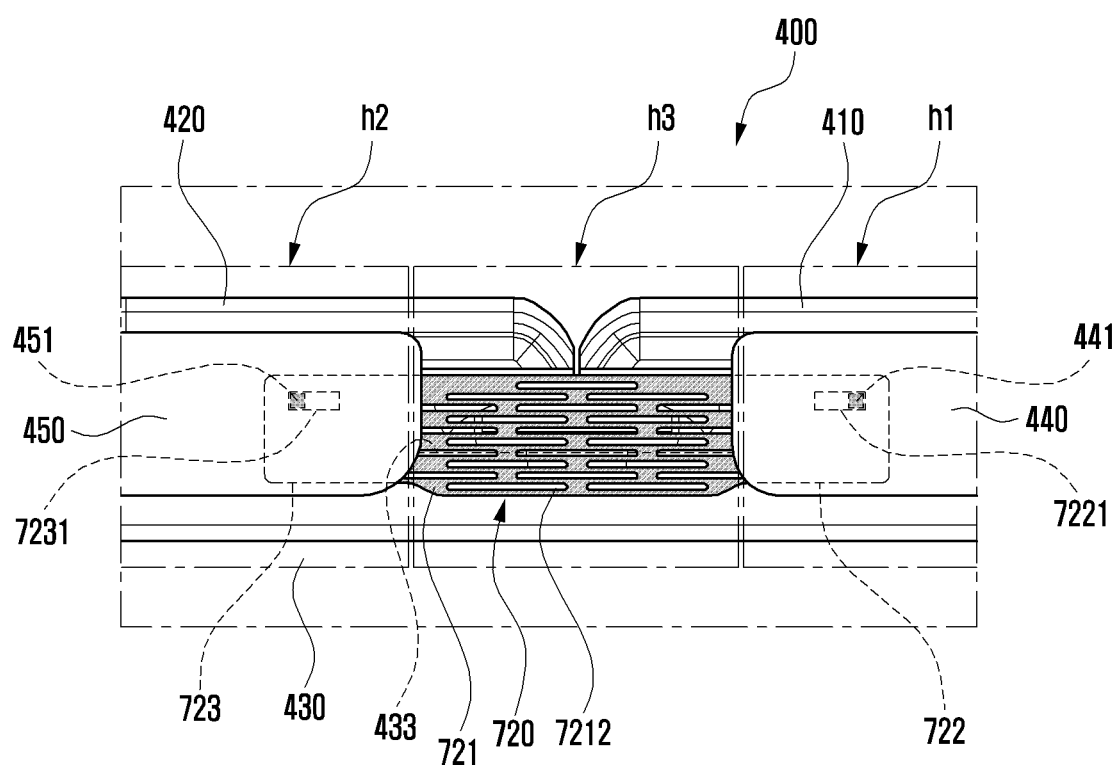

FIGS. 11 and 12 illustrate a partial view of an electronic device including a blocking member according to an embodiment.

Referring to FIGS. 11 and 12, the electronic device 400 includes, in the folding region (h3), a blocking member 720 that covers the third periphery 433 of the display 430 and is fixed at both ends to the first protection cover 440 and the second protection cover 450 without a protective cap exposed outside. The blocking member 720 includes, in a region corresponding to the folding region (h3), a bendable part 721 formed to at least partially cover the third periphery 433 of the display 430, a first extension part 722 extending between the first housing structure 410 and the first protection cover 440 from the bendable part 721, and a second extension part 723 extending between the second housing structure 420 and the second protection cover 450 from the bendable part 721.

Similarly to the above description, the blocking member 720 may include a first guide hole 7221 formed at the first extension part 722 to accommodate the first guide protrusion 441 protruding from the inner surface of the first protection part 440 toward the first housing structure 410, and a second guide hole 7221 formed at the second extension part 723 to accommodate the second guide protrusion 451 protruding from the inner surface of the second protection cover 450 toward the second housing structure 420.

The blocking member 720 may include a plurality of openings 7211 formed at regular or irregular intervals in the bendable part 721. The plurality of openings 7211 may be arranged to have a length along the length direction (e.g., y-axis direction) of the folding region h3. Alternatively, as illustrated in FIG. 12, the plurality of openings 7212 may be arranged to have a length in the width direction (e.g., x-axis direction) of the folding region h3. The flexural characteristics of the bendable part 721 may be determined according to at least one of the shape of openings, the interval between openings, the density of openings, or the size of openings.

For example, the bendable part 721 may have improved bendability when the openings 7211 are densely arranged. Alternatively, when some of the openings 7211 are omitted, the bendable part (721) may include a rigidity reinforcement portion with reduced bendability but with reinforced rigidity. The bendable part 721 may also be configured such that the central portion has improved flexibility compared to portions close to the first protection cover 440 and the second protection cover 450. Although not illustrated, a support member, which is disposed between the hinge housing and the bendable part 721 of the blocking member 720 and supports the bendable part 721 to compensate for the space between the hinge housing 470 and the display 430, may be further included.

The blocking member 720 may include a filling member filled in the plurality of openings 7121 or 7212 or a shielding member to shield the plurality of openings 7121 or 7212. By using the filling member or the shielding member, the blocking member 720 may supplement the rigidity while maintaining a certain degree of flexibility and may increase the design aesthetics. As another example, the filling member or the shielding member may prevent the inflow of foreign substances through the plurality of openings 7121 or 7212 from the outside. The filling member may be made of an elastic material such as rubber, urethane, or silicone. The shielding member may include a film member made of a polymer material.

Figure 13:
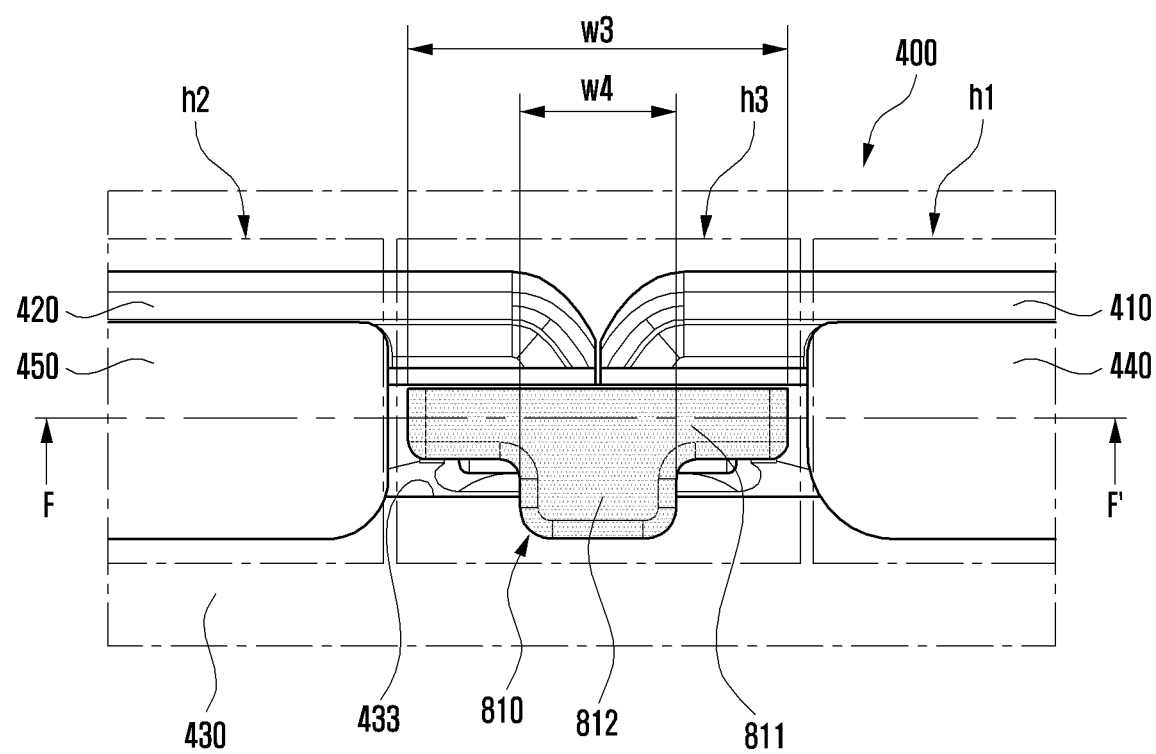
FIG. 13 illustrates a partial view of an electronic device including a protective cap according to an embodiment.
Figure 14A:
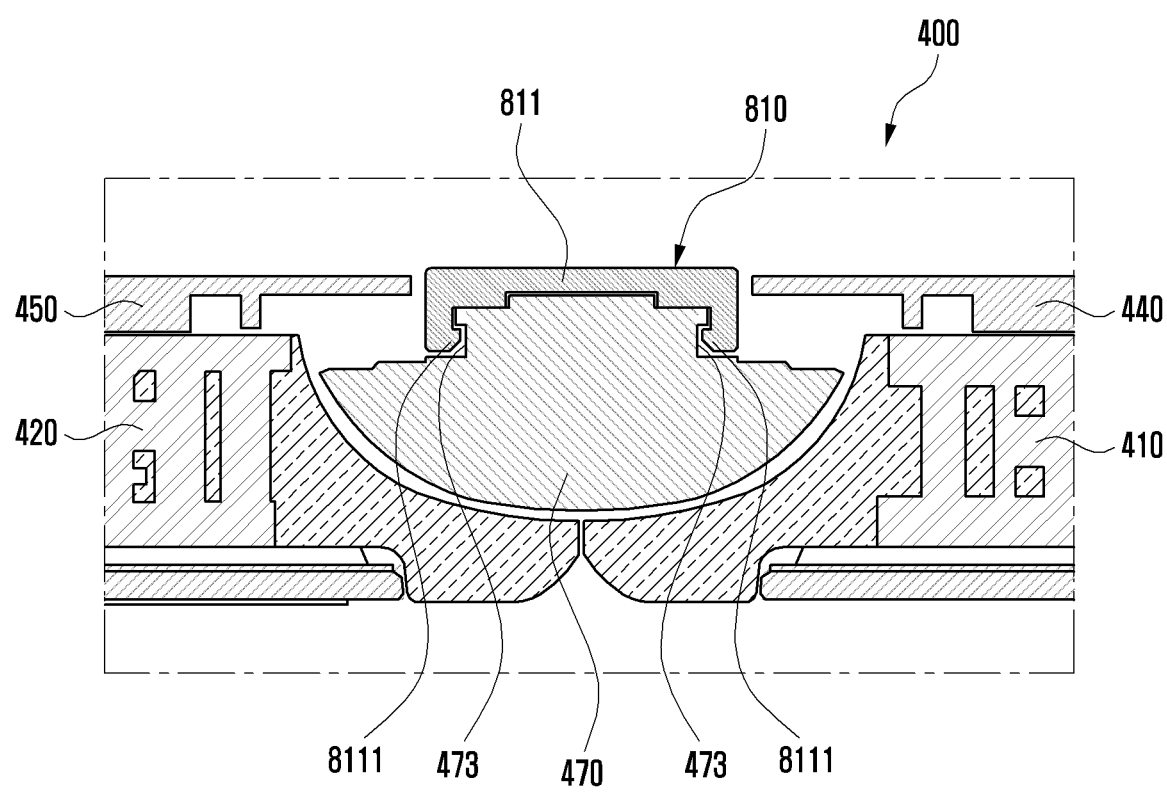
FIGS. 14A and 14B illustrate a partial cross-sectional view of the electronic device in FIG. 13 taken along the line F-F' according to an embodiment.
Figure 14B:
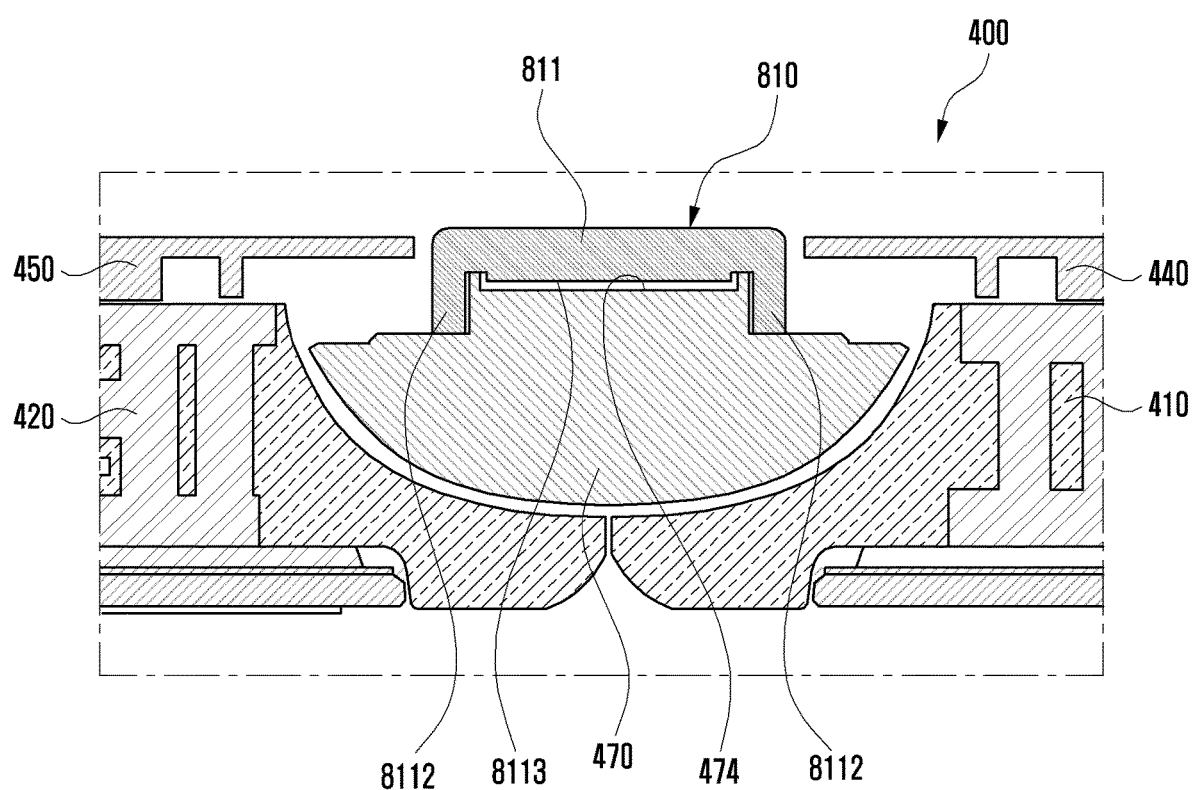
Figure 15:
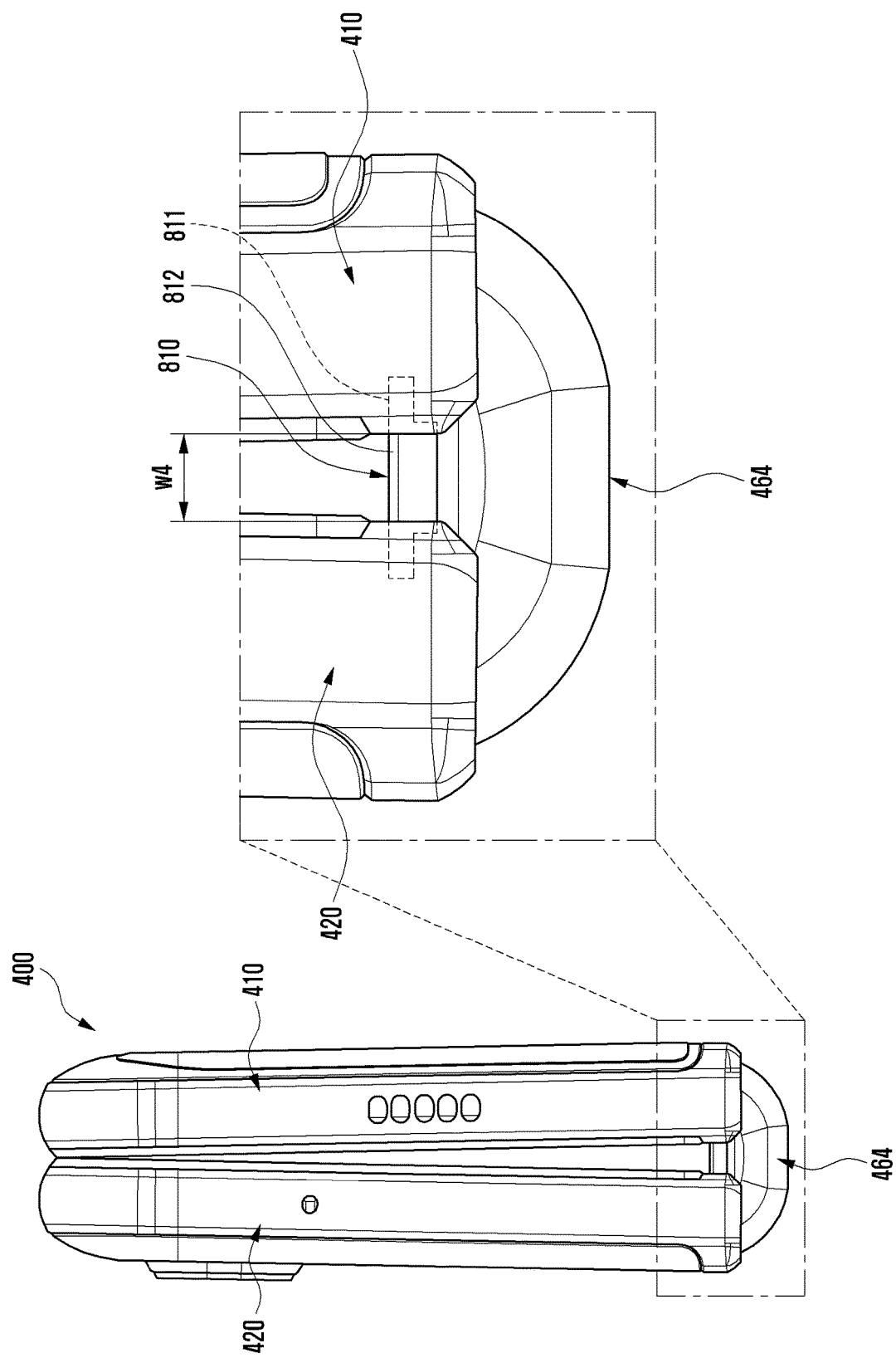
FIG. 15 illustrates a size of a protective cap determined based on a radius of curvature of a display when an electronic device is folded according to an embodiment.

FIG. 13 illustrates a partial view of an electronic device including a protective cap according to an embodiment. FIGS. 14A and 14B illustrate a partial cross-sectional view of the electronic device in FIG. 13 taken along the line F-F' according to an embodiment. FIG. 15 illustrates a size of a protective cap determined based on a radius of curvature of a display when an electronic device is folded according to an embodiment.

Referring to FIG. 13, the electronic device 400 includes, in the folding region h3, a protective cap 810 disposed to at least partially cover the third periphery 433 of the display 430 without a separate blocking member. The protective cap 810 includes, in the folding region h3, a fixing part 811 disposed in the hinge housing 470, and a support part 812 extending from the fixing part 811 toward the display 430. In the folded state, the fixing part 811 may be formed to have a first width w3 that substantially occupies most of the width of the folding region h3, except for the minimum gap for avoiding interference between the first protection cover 440 and the second protection cover 450. Alternatively, the support part 812 may be formed to have a second width w4 smaller than the first width w3. The support part 812 may be disposed to overlap at least a portion of the third periphery 433 of the display 430 when the display 430 is viewed from above. The protective cap 810 may be made of an elastic material such as rubber, urethane, or silicone.

Referring to FIG. 14A, the fixing part 811 includes at least one locking protrusion 8111 which at least partially extends downward in a hook shape. When the protective cap 810 is installed in the hinge housing 470, the assembly may be completed by engaging the at least one locking protrusion 8111 to at least one locking groove 473 formed in the hinge housing 470. For example, the protective cap 810 made of an elastic material may be easily coupled to the hinge housing 470 through a coupling structure between the locking protrusion 8111 and the locking groove 473. Such a coupling structure may improve the assembly of the electronic device 400 and facilitate separation of the protective cap 810 for maintenance. Alternatively, the coupling structure between the protective cap 810 and the hinge housing 470 may be applied to the coupling between the protective cap and the hinge housing described before.

Referring to FIG. 14B, the protective cap 810 may be fixed by seating the protrusion 474 formed in the hinge housing 470 at the seating portion 8131 formed by ribs 8112 at least partially protruding from the back of the fixing part 811 and using an attachment process such as bonding, taping or fusion.

Referring to FIG. 15, when the electronic device 400 is folded, the display 430 corresponding to the folding region h3 formed by the first housing structure 410 and the second housing structure 420 may be folded to have a specific radius of curvature R due to the in-folding characteristic. The second width w4 of the support part 812 of the protective cap 810 may be determined based on the radius of curvature R formed by the display 430 when the electronic device 400 is folded. For example, as the radius of curvature is smaller, the size of the support part 513 (e.g., second width w4) may be reduced.

Figure 16:
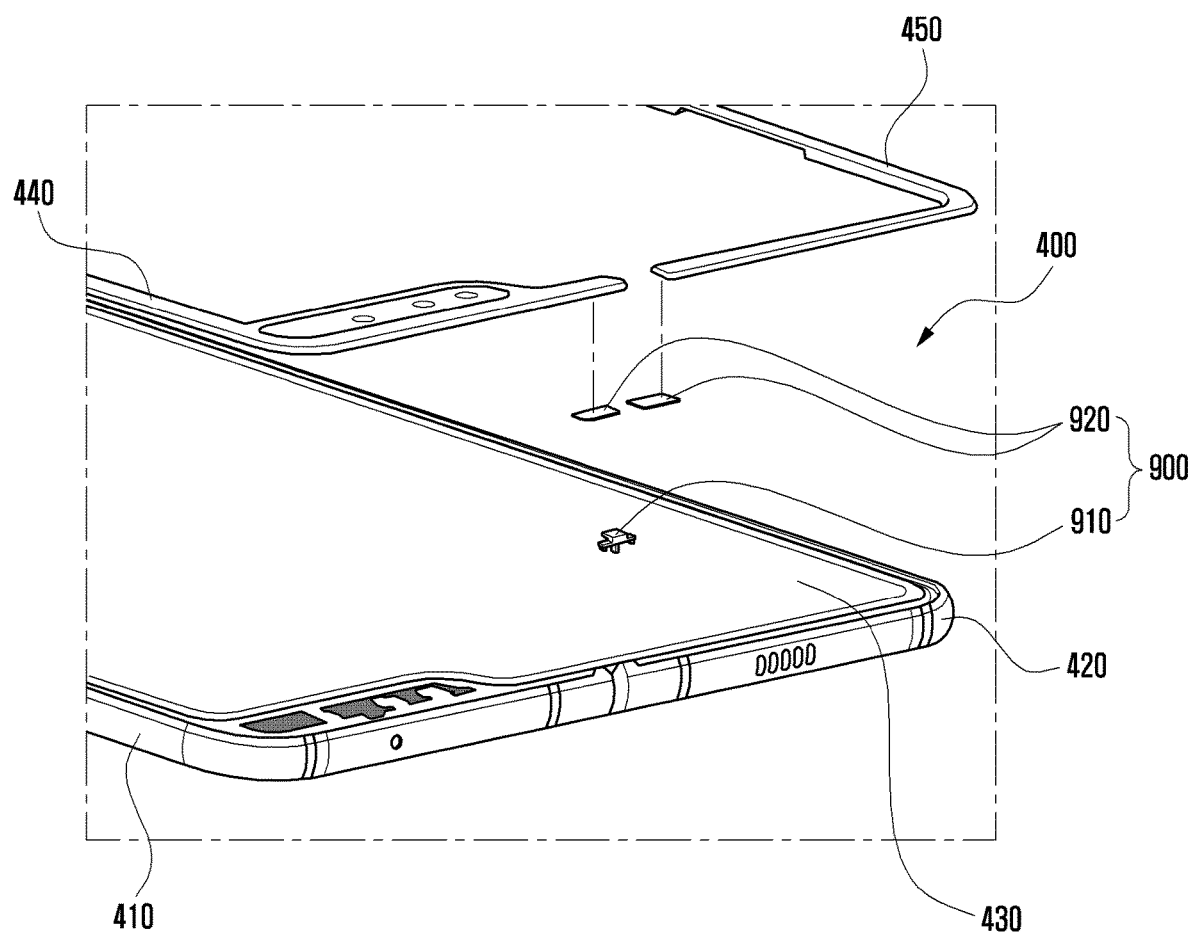
FIGS. 16 and 17 illustrate a partial view of an electronic device including a protection structure according to an embodiment.
Figure 17:
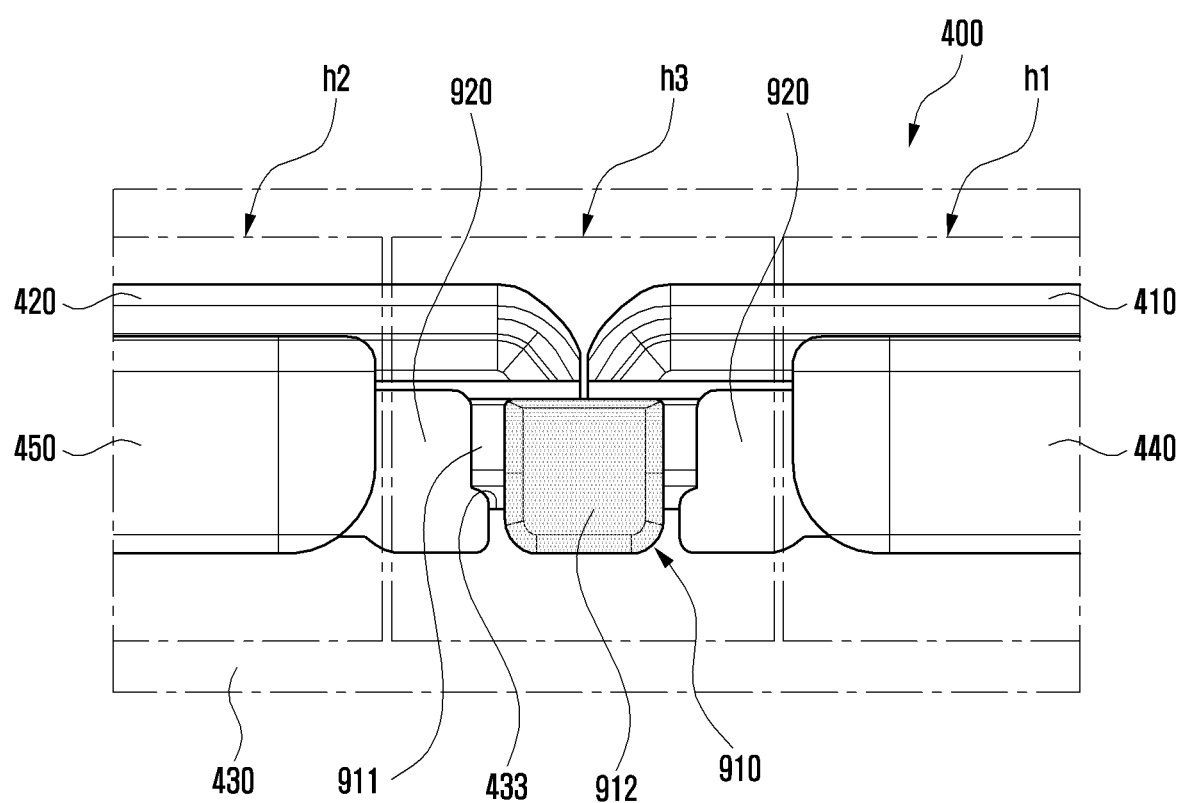

FIGS. 16 and 17 illustrate a partial view of an electronic device including a protection structure according to an embodiment.

Referring to FIGS. 16 and 17, the electronic device 400 includes, in the folding region h3, a protective cap 910 that is disposed in the hinge housing 470 and at least partially covers a portion of the third periphery 433 of the display 430. The electronic device 400 may include a pair of blocking members 920 that disposed between the first protection cover 440 and the second protection cover 450 and extend to at least some portions of the folding region h3 to cover at least a portion of the third periphery 433 of the display 430. The protective cap 910 may include a base 911 fixed to the hinge housing 470, and a support part 912 extending from the base 911 to a position at least partially overlapping with the display 430 when the display 430 is viewed from above. The pair of blocking members 920 may be attached to the first protection cover 440 and the second protection cover 450 through bonding, taping, or fusion so as to at least partially protrude into the folding region h3. The blocking member 920 may include a polymer film member such as PET.

Figure 18:
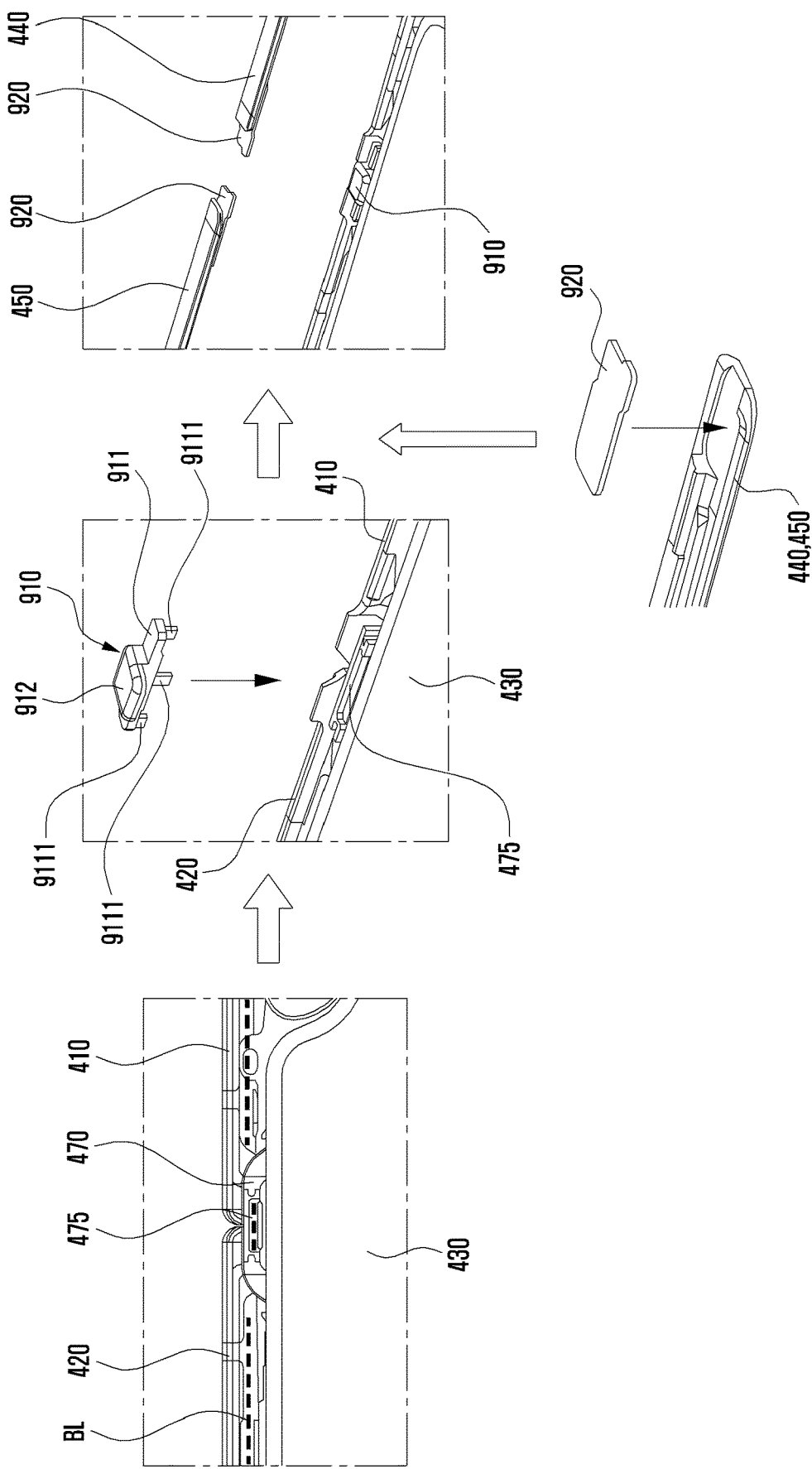
FIG. 18 illustrates an assembly process of the protection structure in FIG. 16 according to an embodiment.

FIG. 18 illustrates an assembly process of the protection structure of FIG. 16 according to an embodiment.

Referring to FIG. 18, the assembly of the electronic device 400 may be improved because the blocking member 920 is assembled to the first housing structure 410 and the second housing structure 420 while being attached to the first protection cover 440 and the second protection cover 450. The first housing structure 410 and the second housing structure 420 connected to the hinge housing 470 through the hinge structure may be prepared. Thereafter, the display 430 may be disposed through the first housing structure 410 and the second housing structure 420. An adhesive member may be applied through the illustrated adhesive line BL in the housing structures 410 and 420 and the hinge housing 470 where the display 430 is disposed. The adhesive member may be replaced by taping or fusion. The pair of blocking members 920 may be attached to the first protection cover 440 and the second protection cover 450 through bonding, taping, or fusion so as to at least partially protrude into the folding region h3.

The assembly of the protective cap 910 can be completed by seating the seating protrusion 9111 projecting from the base 911 of the protective cap 910 at the seating groove 475 of the hinge housing 470 to which the adhesive member is applied. The support part 912 of the protective cap 910 may cover, in the folding region h3, at least a portion of the third periphery 433 of the display 430. Thereafter, the assembly can be completed when the first protection cover 440 and the second protection cover 450 to which the blocking member 920 is fixed are disposed in the first housing structure 410 and the second housing structure 420, respectively, in which the display 430 is disposed. The pair of blocking members 920 may cover, in the folding region h3, at least a portion of the third periphery 433 of the display 430. The pair of blocking members 920 may be disposed to extend near the support part 912 of the protective cap 910, and the placement line of the pair of blocking members 920 and the placement line of the support part 912 may coincide on the display 430.

Figure 19:
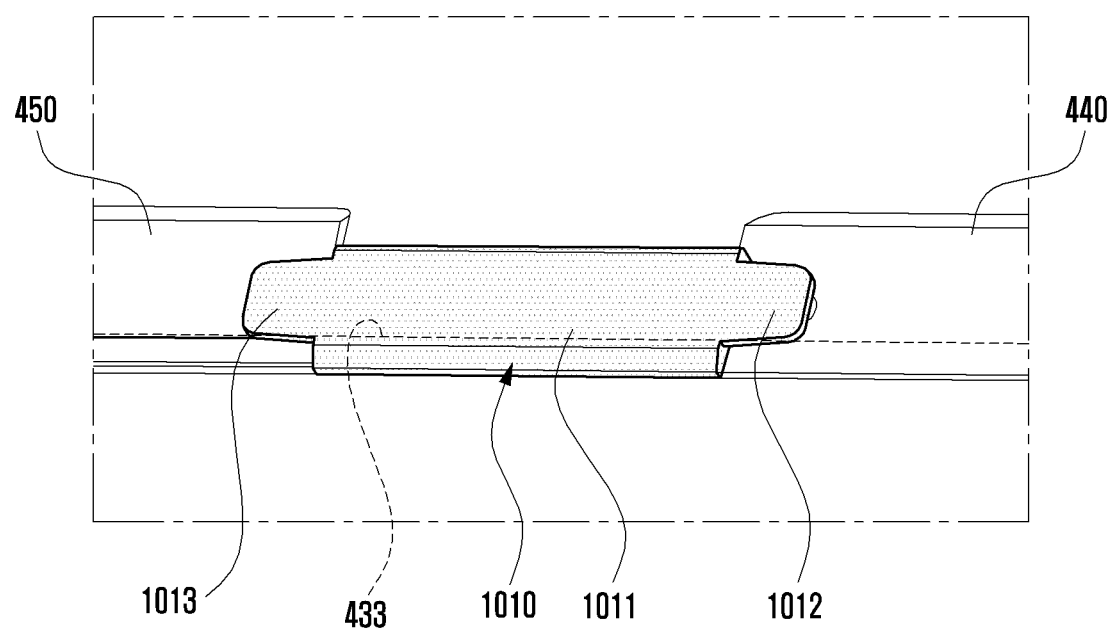
FIGS. 19 and 20 illustrate partial front and rear perspective views of a blocking member disposed on protection covers according to an embodiment.
Figure 20:
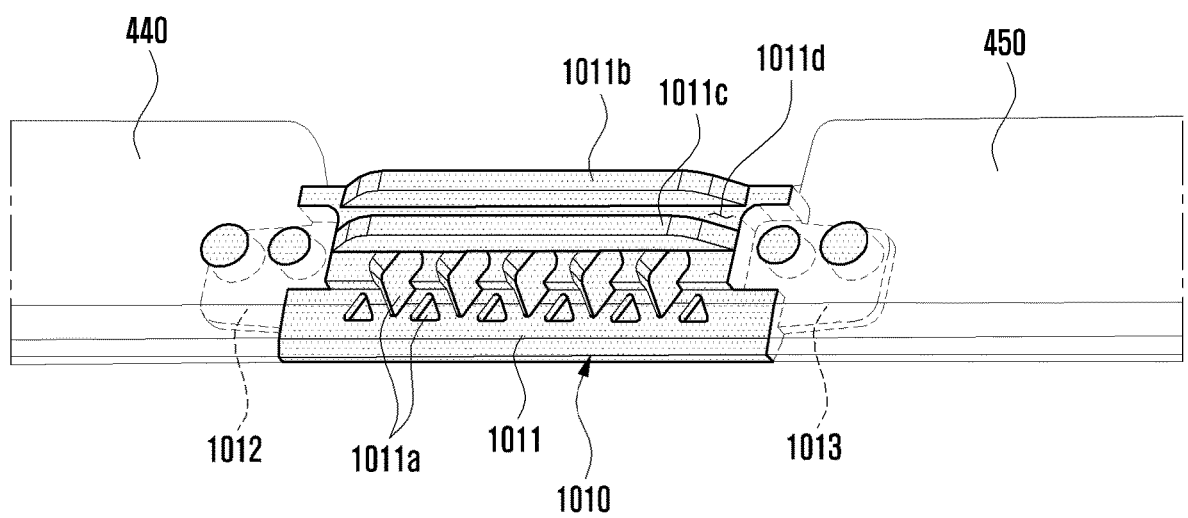

FIGS. 19 and 20 illustrate partial front and rear perspective views of a blocking member disposed on protection covers according to an embodiment.

Referring to FIGS. 19 and 20, the blocking member 1010 may be physically connected to the first protection cover 440 and the second protection cover 450. The blocking member 1010 includes a bendable part 1011 disposed in a region corresponding to the folding region h3 of the display 430, a first fixing part 1012 extending from one end of the bendable part 1011 and fixed to the first protection cover 440, and a second fixing part 1013 extending from the other end of the bendable part 1011 and fixed to the second protection cover 450. The blocking member 1010 may be made of a rubber, silicone, or urethane material having an elastic restoring force. The blocking member 1010 may be fixed to the first protection cover 440 and the second protection cover 450 through insert injection. Alternatively, the blocking member 1010 may be fixed to the first protection cover 440 and the second protection cover 450 through bonding, taping, or fusion. The blocking member 1010 may be aligned with the first protection cover 440 and the second protection cover 450 on the display 430, thereby seamlessly covering the periphery 433 of the display 430.

The blocking member 1010 may include a plurality of grooves 1011a formed on the rear surface of the bendable part 1011. The flexural characteristics of the bendable part 1011 may be determined by the plurality of grooves 1011a. For example, the flexural characteristics of the bendable part 1011 may be determined based on the shape, size, depth, density, or spacing of the grooves 1011a.

The blocking member 1010 may include an assembly structure that is disposed on the rear surface of the bendable part 1011 and is assembled with the hinge housing 470. The blocking member 1010 may include a pair of support ribs 1011b and 1011c that protrude with a given interval therebetween to form a guide groove 1011d. The pair of support ribs 1011b and 1011c may be formed in a direction from the first protection cover 440 toward the second protection cover 450, for example, in the length direction of the bendable part 1011.

As the protection structure is integrally formed with the first protection cover 440 and the second protection cover 450, it may cover the periphery 433 of the display 430 exposed to the folding region h3 by installing the protection covers 440 and 450 in the first housing structure 410 and the second housing structure 420. Consequently, the assembly of the electronic device can be improved.

Figure 21A:
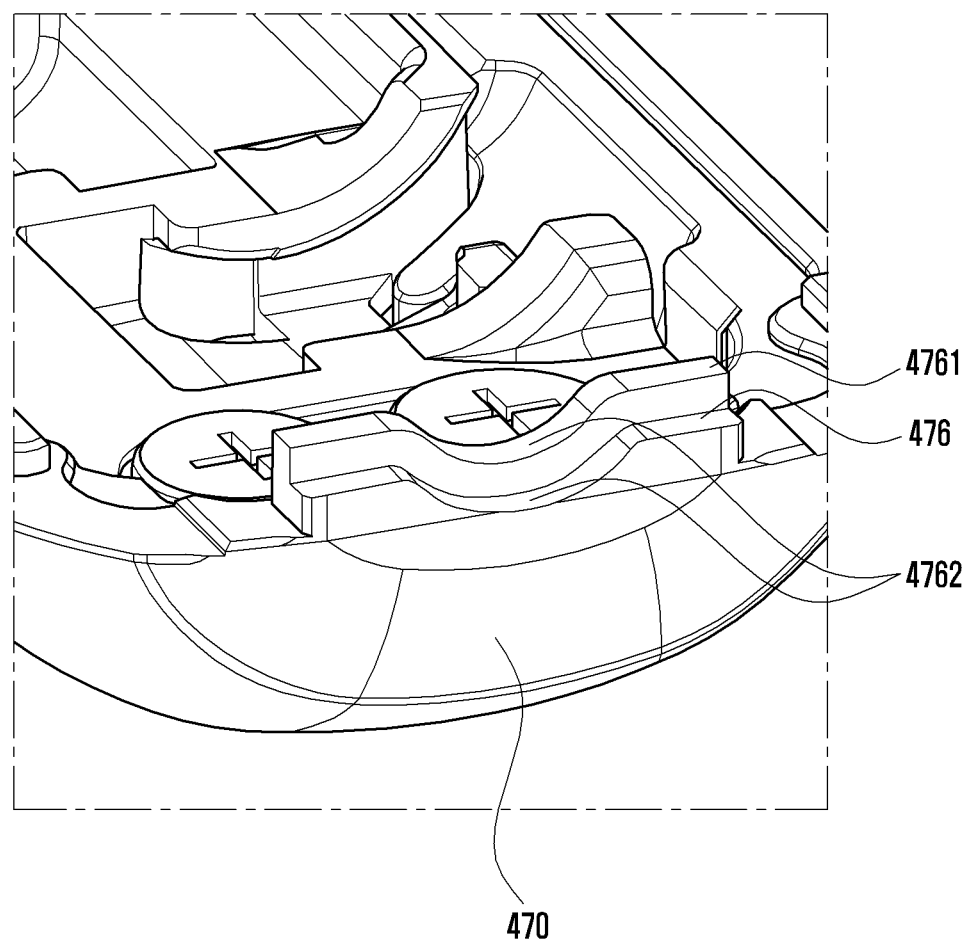
FIG. 21A illustrates a partial perspective view of a hinge housing according to an embodiment.
Figure 21B:
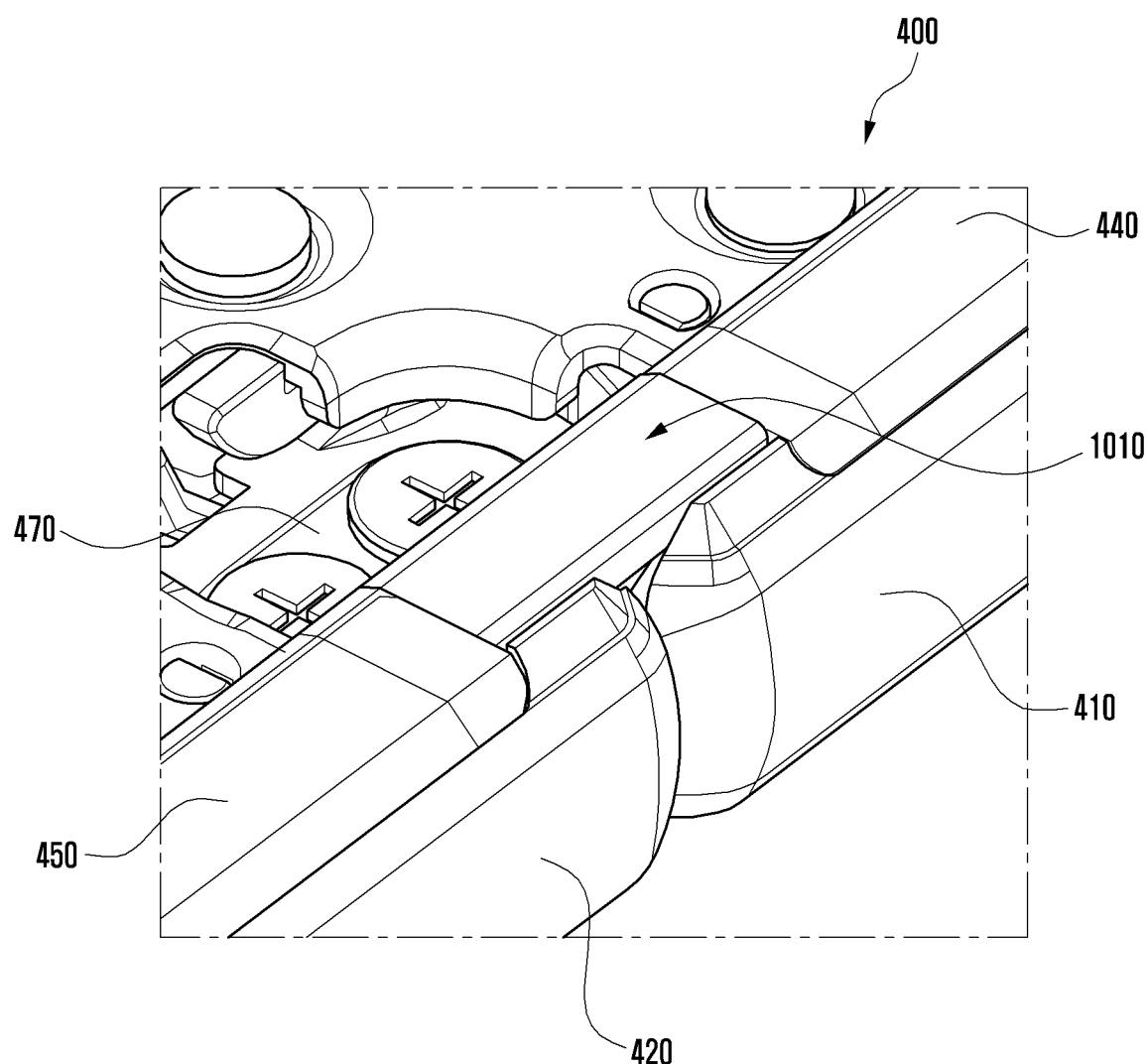
FIG. 21B illustrates a partial perspective view of a blocking member disposed in a hinge housing of an electronic device according to an embodiment.
Figure 21C:
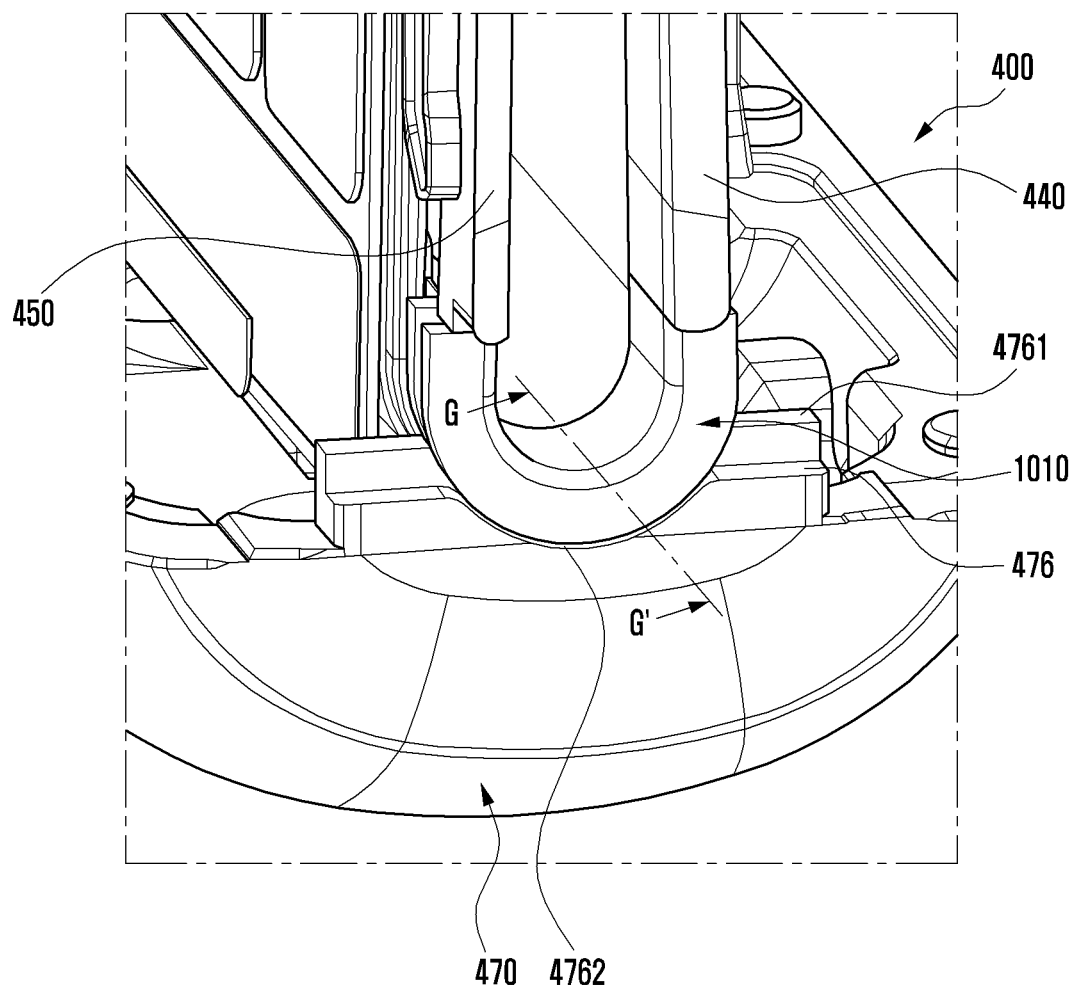
FIG. 21C illustrates a blocking member folded along a hinge housing according to an embodiment.
Figure 22:
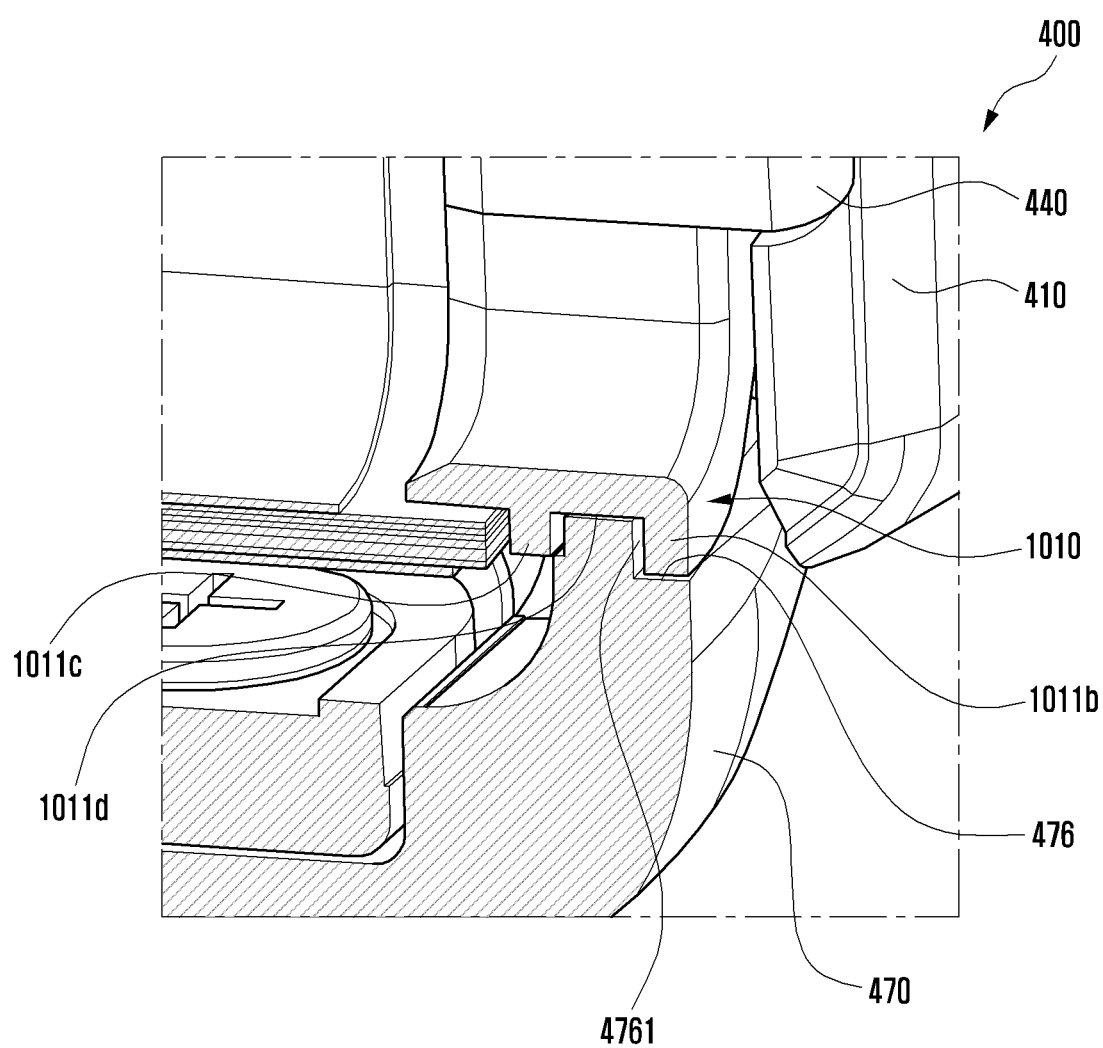
FIG. 22 illustrates a cross-sectional view taken along the line G-G' in FIG. 21C according to an embodiment.

FIG. 21A illustrates a partial perspective view of a hinge housing according to an embodiment. FIG. 21B illustrates a partial perspective view of a blocking member disposed in a hinge housing of an electronic device according to an embodiment. FIG. 21C illustrates a blocking member folded along a hinge housing according to an embodiment. FIG. 22 illustrates a cross-sectional view taken along the line G-G' in FIG. 21C according to an embodiment.

Referring to FIGS. 21A to 22, the hinge housing 470 includes, in the folding region h3, a member fixing part 476 that accommodates the pair of support ribs 1011b and 1011c of the blocking member 1010. The hinge housing 470 includes a guide rib 4761 protruding from the member fixing part 476. When the blocking member 1010 is installed in the hinge housing 470, the guide rib 4761 of the hinge housing 470 is inserted into the guide groove 1011d formed by the pair of support ribs 1011b and 1011c, completing the assembly. The first protection cover 440, the blocking member 1010, and the second protection cover 450 may be integrally formed and be arranged so that the lines covering the periphery of the display 430 may all be matched.

The member fixing part 476 and the guide rib 4761 of the hinge housing 470 include a curved groove 4762 recessed inwardly with respect to the central portion. The curved groove 4762 may be used as an accommodation space for accommodating the downwardly expanded portion of the elastic bendable part 1011 of the elastic blocking member 1010 that is also folded when the electronic device 400 is folded.

Figure 23:
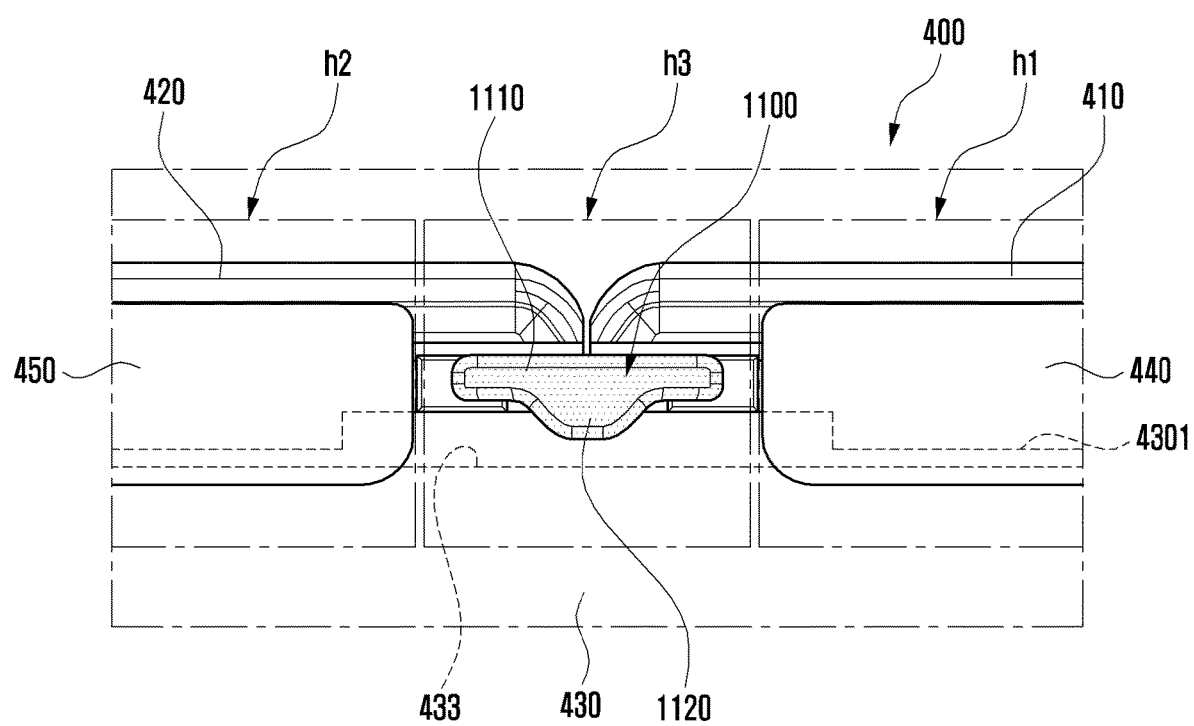
FIG. 23 illustrates a partial view of an electronic device including a protective cap and a blocking structure according to an embodiment.

FIG. 23 illustrates a partial view of an electronic device including a protective cap and a blocking structure according to an embodiment.

Referring to FIG. 23, the electronic device 400 includes, in the folding region h3, a protective cap 1100 disposed in the hinge housing. The protective cap 1100 includes a fixing part 1110 fixed to the hinge housing 470, and a support part 1120 extending from the fixing part 1110 toward the third periphery 433 of the display 430.

The display 430 may further include a protective film 4301 disposed to protect the outer surface through the substantially entire area. The protective film 4301 may include a PI film. The protective film 4301 may be formed to extend to a portion of the support part 1120 in the folding region h3. In the folding region h3, the third periphery 433 of the display may be protected by the protective film 4301, and the periphery of the protective film 4301 may be protected by the support part 1120 of the protective cap 1100.

Alternatively, the shape of the display 430 may be changed in the folding region h3 in order to extend to a position supported by the support part 1120 of the protective cap 1100. The expanded area of the display 430 may extend up to the folding region h3, at least a portion of the first region h1 extending from the folding region h3, and at least a portion of the second region h2.

Figure 24:
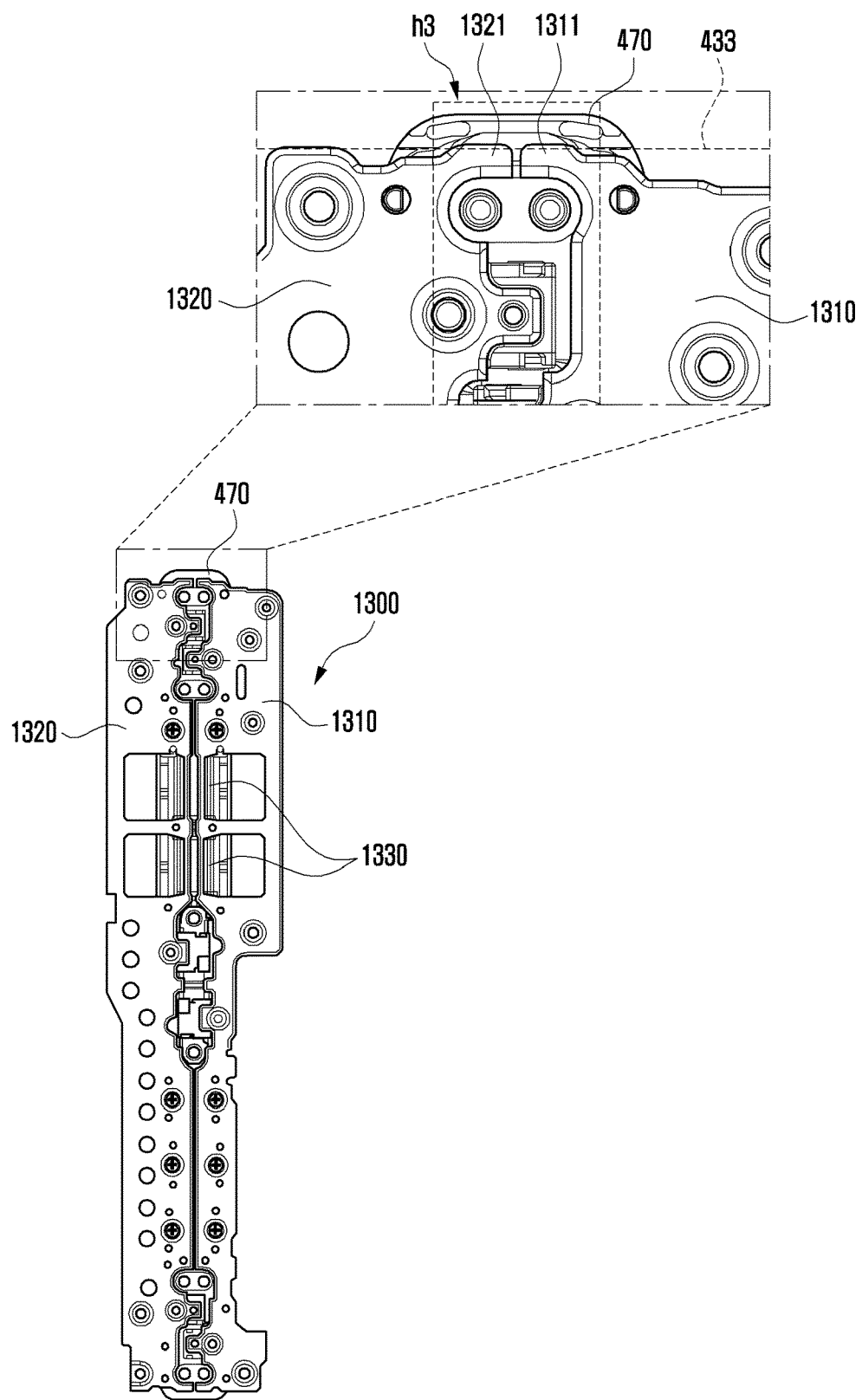
FIG. 24 illustrates a hinge plate according to an embodiment.

FIG. 24 illustrates a hinge plate according to an embodiment.

Referring to FIG. 24, the electronic device includes, in the folding region h3, a hinge plate 1300 disposed in the hinge housing 470. The hinge plate 1300 includes a first hinge plate 1310 and a second hinge plate 1320 rotatably connected to each other through at least one hinge module 1330. The first hinge plate 1310 may be connected to the first housing structure. The second hinge plate 1320 may be connected to the second housing structure. Consequently, the display 430 may be disposed through the support of the first housing structure 410, the pair of hinge plates 1300, and the second housing structure 420.

The first hinge plate 1310 and the second hinge plate 1320 include, to support the third periphery 433 of the display 430 in the folding region h3, a first extension piece 1311 and a second extension piece 1321 that are formed as close as possible to the extent that they do not interfere with each other in the folding operation. The first extension piece 1311 and the second extension piece 1321 may prevent a pressing phenomenon due to the space generated between the hinge housing 470 and the display 430.

Figure 25A:
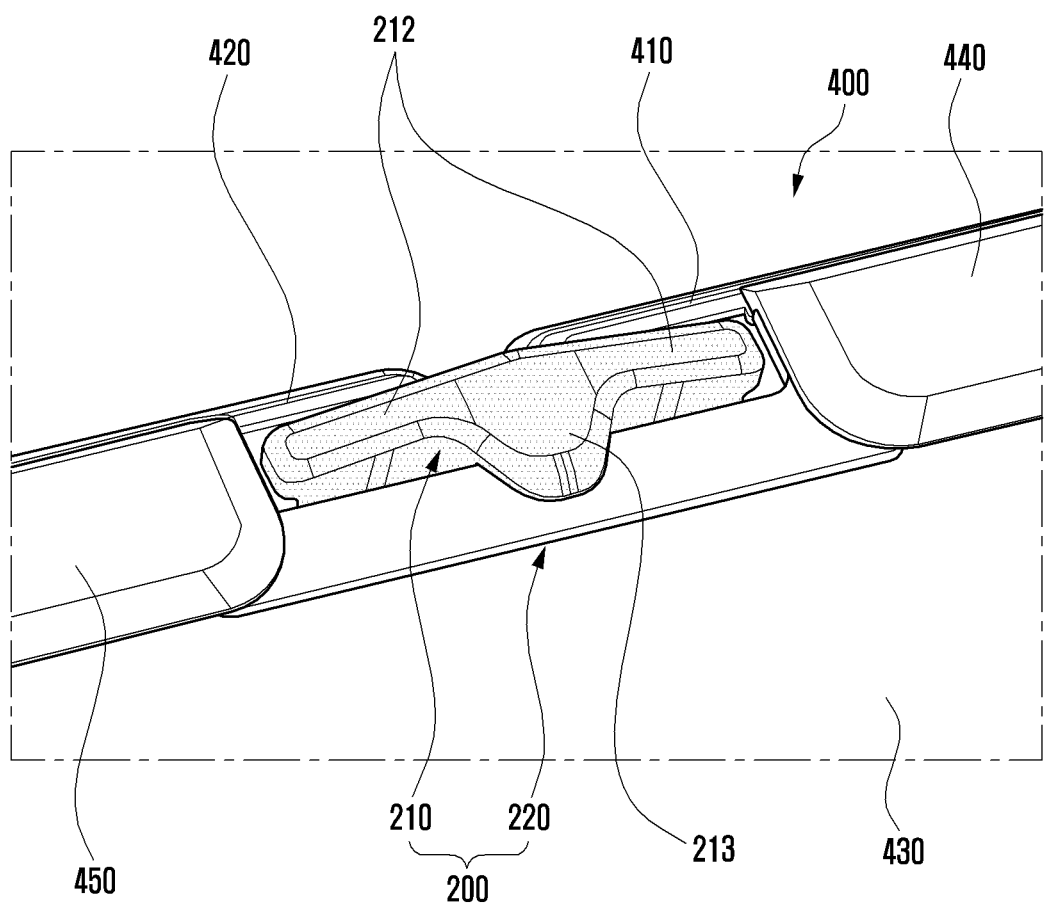
FIGS. 25A and 25B illustrate an electronic device including a protection structure according to an embodiment.
Figure 25B:
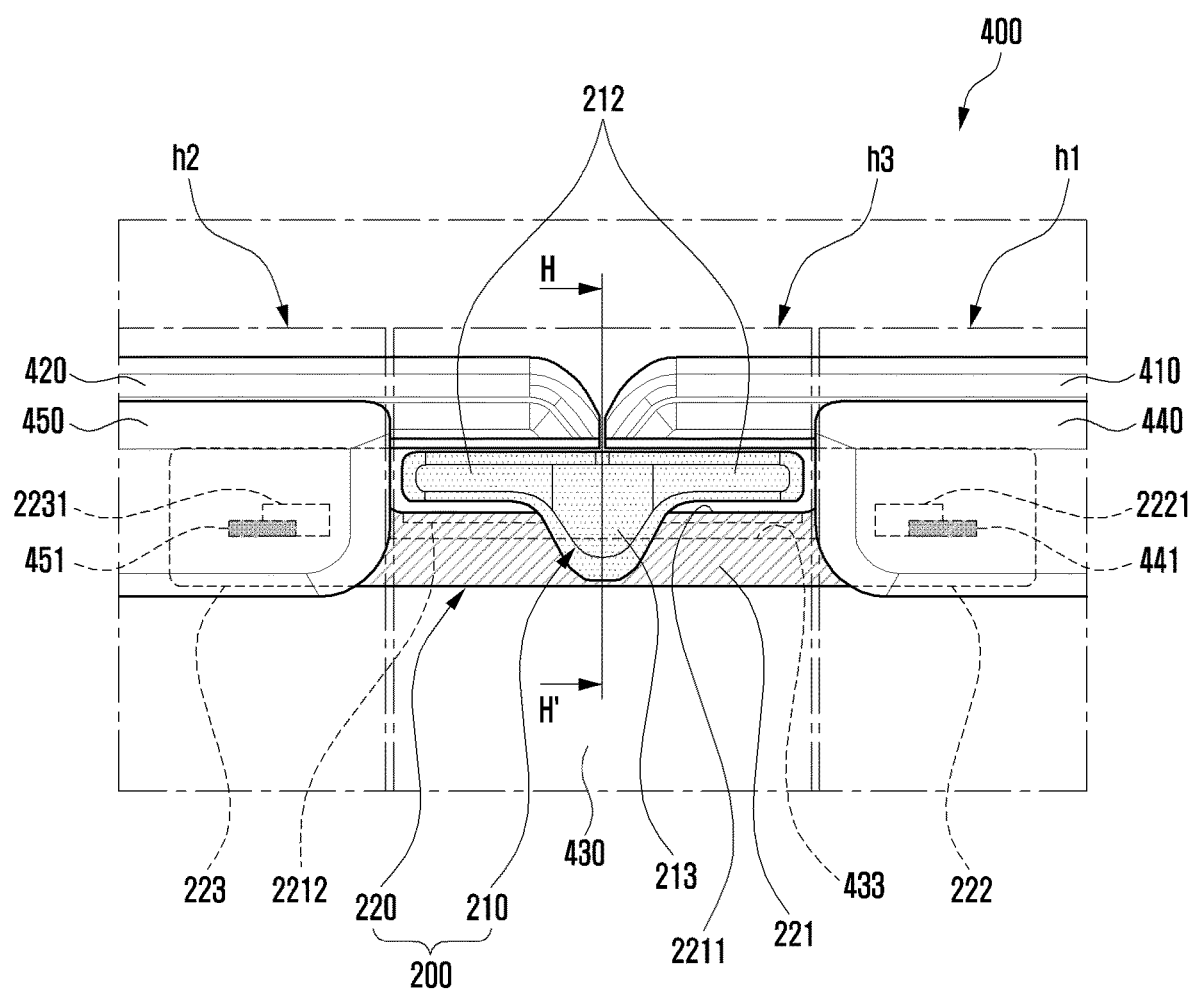

FIGS. 25A and 25B illustrate a partial view of an electronic device including a protection structure according to an embodiment.

Referring to FIGS. 25A and 25B, the electronic device 400 includes the first region h1 facing the first housing structure 410, the second region h2 facing the second housing structure 420, and the folding region h3 facing the hinge structure. The electronic device 400 includes, as a protection structure 200, a protective cap 210 disposed in the folding region h3, and a blocking member 220 disposed to be at least partially supported by the protective cap 210.

The protective cap 210 may have a configuration substantially the same as the protective cap 510 of FIG. 5A. The protective cap 210 includes, in the folding region h3, a protrusion 212 at least partially fixed to the hinge housing 470, and a support part 213 extending from the protrusion 212 toward the display 430 to support at least a portion of the blocking member 220. The width of the support part 213 may be fixed or may gradually decrease as it is closer to the display. Alternatively, the width of the support part 513 may gradually increase as it is closer to the display.

The blocking member 220 may be supported by at least a portion of the protective cap 210, cover the third periphery 433 on the display 430, and connect the first protection cover 440 and the second protection cover 450. Specifically, the blocking member 220 may connect the first protection cover 440 and the second protection cover 450 and may block the third periphery 433 of the display 430 exposed to the folding region h3 from being visible from the outside, thereby preventing the display 430 from being damaged by arbitrary manipulation of the third periphery 433. In addition, at least a portion of the protective cap 210 fills the space between the hinge housing and the display 430, thereby preventing deformation of the display 430 due to the pressing.

The blocking member 220 may be formed by laminating different materials. The blocking member 220 may be formed by attaching a first member having rigidity and a second member having flexibility or flexuosity together. The blocking member 220 may include a buffer rib 2212 at least partially bent downward, protecting the third periphery 433 of the display 430 from external impact.

The blocking member 220 includes, in a region corresponding to the folding region h3, a bendable part 221 disposed to at least partially cover the third periphery 433 of the display 430, a first extension part 222 extending between the first housing structure 410 and the first protection cover 440 from the bendable part 221, and a second extension part 223 extending between the second housing structure 420 and the second protection cover 450 from the bendable part 221. The bendable part 221 includes a seating portion 2211 for accommodating the protrusion 212 of the protective cap 210. The blocking member 220 may be disposed in such a manner that the protrusion 212 of the protective cap 210 is received in the seating portion 2211.

The electronic device 400 may further include a guide structure so as to alleviate the concentration of stress applied to the bendable part 221 of the blocking member 220 due to the folding operation of the first housing structure 410 and the second housing structure 420 and to provide smooth flexural characteristics without excessive stress on the display 430. The blocking member 220 may include a first guide hole 2221 formed at the first extension part 222 to receive a first guide protrusion 441 protruding from the inner surface of the first protection cover 440 toward the first housing structure 410, and a second guide hole 2231 formed at the second extension part 223 to receive a second guide protrusion 451 protruding from the inner surface of the second protection cover 450 toward the second housing structure 420. When the electronic device 400 is in a folding operation, the first extension part 222 and the second extension part 223 of the blocking member 220 can be moved under the guidance of the first guide protrusion 441 and the second guide protrusion 451 penetrating the first guide hole 2221 and the second guide hole 2231, respectively, alleviating the concentration of stress applied to the bendable part 221. For example, to prevent separation of the first extension part 222 and the second extension part 223 while folding or unfolding the electronic device 400, the first guide protrusion 441 and the second guide protrusion 451 may be formed to protrude up to the first housing structure 410 and the second housing structure 420, respectively.

Alternatively, the first guide protrusion 441 and the second guide protrusion 451 may be structurally coupled to the first housing structure 410 and the second housing structure 420, respectively, or the first guide protrusion 441 and the second guide protrusion 451 may be formed to have a locking shape (e.g., a hook shape) for preventing separation of the first extension part 222 and the second extension part 223 during the folding or unfolding of the electronic device 400.

Figure 25C:
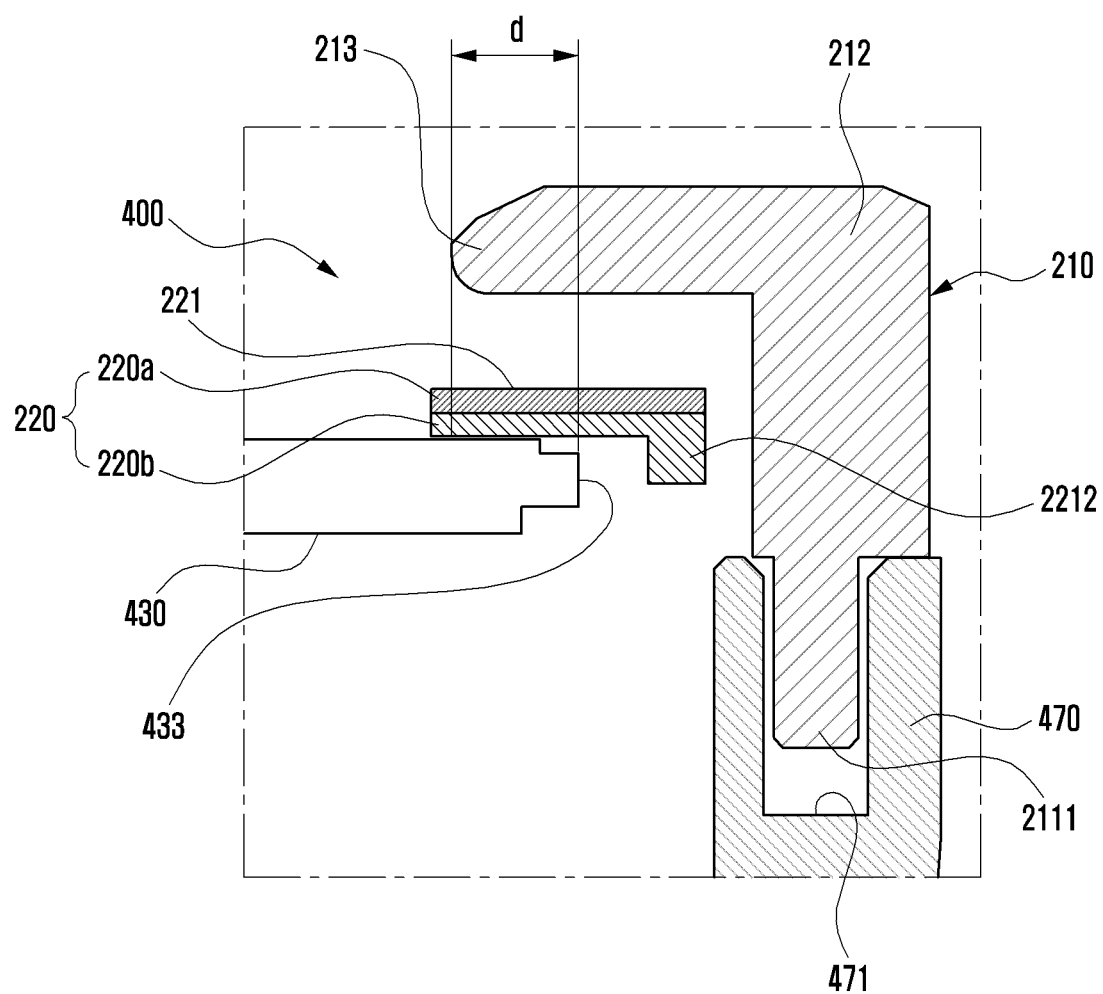
FIG. 25C illustrates a partial cross-sectional view of the electronic device in FIG. 25B taken along the line H-H' according to an embodiment.

FIG. 25C illustrates a partial cross-sectional view of the electronic device in FIG. 25B taken along the line H-H' according to an embodiment.

Referring to FIG. 25C, the protective cap 210 includes a seating protrusion 2111 protruding downward from the protrusion 212. When the protective cap 210 is disposed in the hinge housing 470, the protective cap 210 may be fixed by seating the at least one seating protrusion 2111 in the seating groove 471 formed at the hinge housing 470. For example, the seating protrusion 2111 of the protective cap 210 may be fixed to the seating groove 471 of the hinge housing 470 through at least one process including bonding, taping, or fusion.

The support part 213 of the protective cap 210 may at least partially overlap the third periphery 433 of the display 430 with a given overlapping amount "d" when the display 430 is viewed from above. At least a portion of the blocking member 220 may be disposed on the display 430 to cover the third periphery 433 of the display 430. The blocking member 200 may be disposed so that the first member 220*a* having relatively reinforced rigidity faces the protective cap 210 and the second member 220*b* having flexibility faces the display 430. The buffer rib 2212 may extend downward from the second member 220*b* to face the third periphery 433 of the display 430. Alternatively, the buffer rib 2212 may extend from the first member 220*a* of the blocking member 220.

Figure 26A:
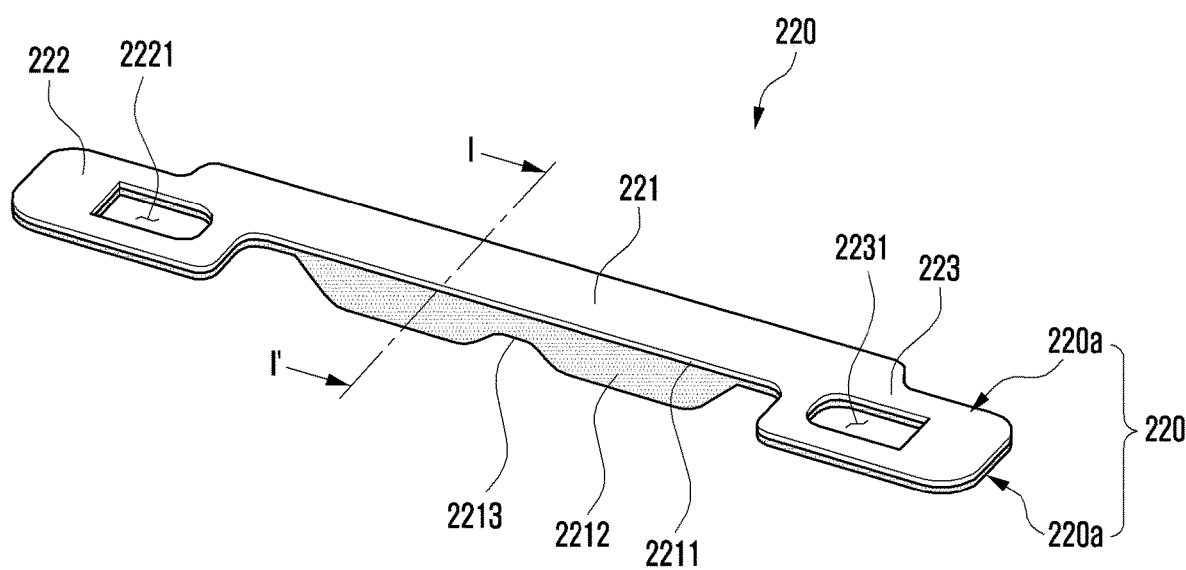
FIG. 26A illustrates a perspective view of a blocking member according to an embodiment.
Figure 26B:
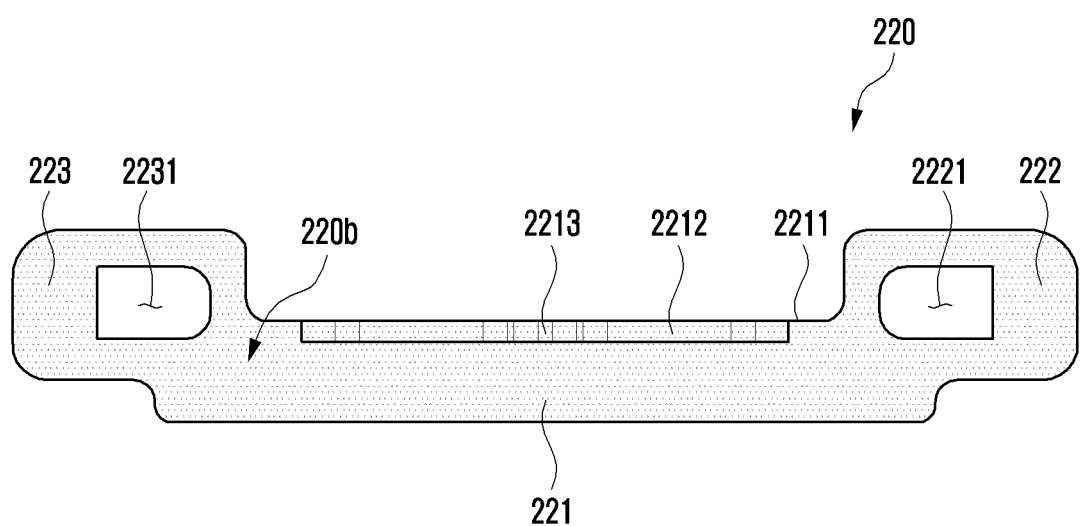
FIG. 26B illustrates a rear view of a blocking member according to an embodiment.
Figure 26C:
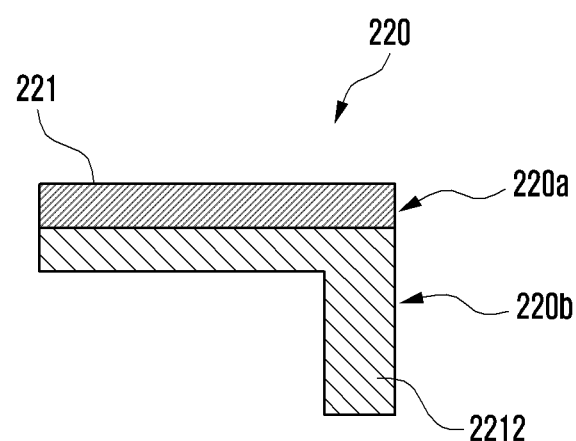
FIG. 26C illustrates a cross-sectional view of the blocking member in FIG. 26A taken along the line I-I' according to an embodiment.

FIG. 26A illustrates a perspective view of a blocking member according to an embodiment. FIG. 26B illustrates a rear view of a blocking member according to an embodiment. FIG. 26C illustrates a cross-sectional view of the blocking member in FIG. 26A taken along the line I-I' according to an embodiment.

Referring to FIGS. 26A to 26C, the blocking member 220 may be formed by laminating different materials. The blocking member 220 may be formed by attaching a first member 220*a* having rigidity and a second member 220*b* having flexibility together. The first member 220*a* may substantially face the protective cap in order to help prevent damage to the display, e.g., due to a user's fingernail. The second member 220*b* may include a buffer rib 2212 that is at least partially bent downwards, protecting the third periphery of the display from an external impact. The first member 220*a* may include PU, TPU, or PC. The second member 220*b* may include silicone, urethane, or rubber. The first member 220*a* and the second member 220*b* may be attached to each other through bonding, taping, or fusion. The blocking member 220 may be made of the same single material as the first member 220*a* or the second member 220*b*.

The buffer rib 2212, which is bent from the second member 220*b* and extended to face the third periphery 433 of the display 430, includes at least one flexure receiving groove 2213 at least partially formed to provide an excellent flexural property. When the electronic device 400 is in the folding operation, the blocking member 220 may help to provide enhanced flexuosity, thereby allowing the display 430 to be flexibly folded together.

Figure 27:
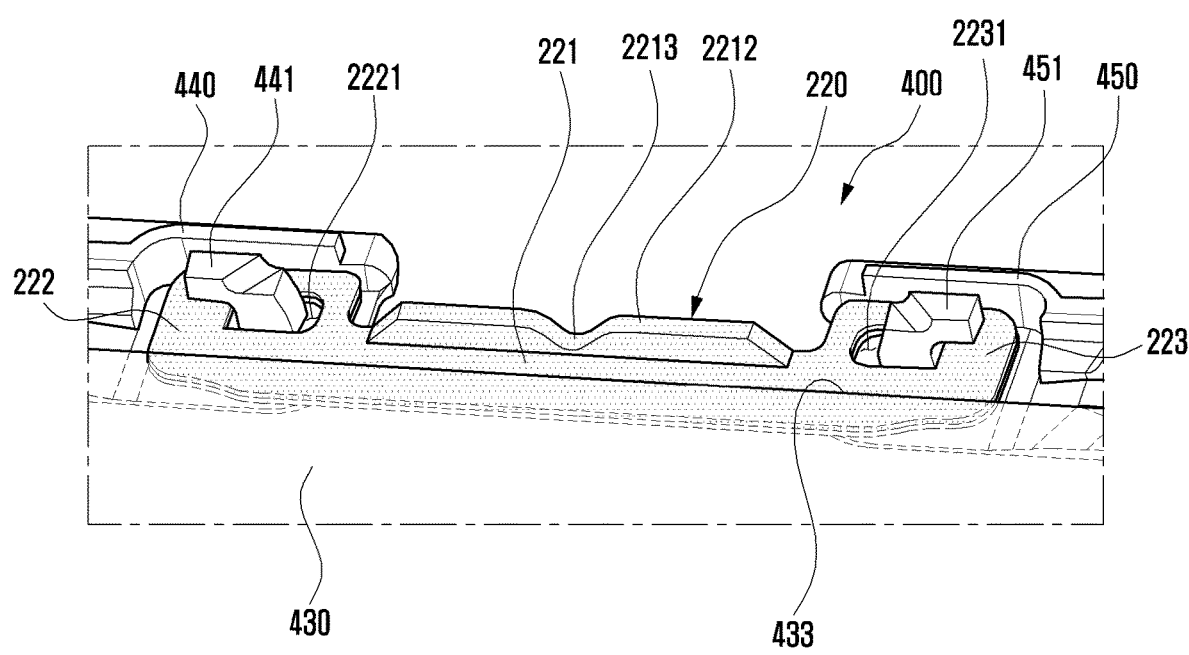
FIG. 27 illustrates a partial rear perspective view of a blocking member disposed on protection covers according to an embodiment.

FIG. 27 illustrates a partial rear perspective view of a blocking member disposed on protection covers according to an embodiment.

Referring to FIG. 27, the blocking member 220 is disposed so that the first guide protrusion 441 of the first protection cover 440 penetrates the first guide hole 2221 of the first extension part 222 and the second guide protrusion 451 of the second protection cover 450 penetrates the second guide hole 2231 of the second extension part 223. The guide structure in which the guide protrusions 441 and 451 are moved along the guide holes 2221 and 2231, respectively, during the folding and unfolding operation of the electronic device 400 may help to relieve stress concentrated on the blocking member 220. The first guide protrusion 441 projecting through the first guide hole 2221 and the second guide protrusion 451 projecting through the second guide hole 2223 may be in contact with or structurally coupled with the first housing structure 410 and the second housing structure 420, thereby preventing the blocking member 220 from being separated from the electronic device 400 during operation.

The blocking member 220 may overlap at least a portion of the third periphery 433 of the display 430, thereby preventing the third periphery 433 of the display 430 from being exposed to the outside of the electronic device 400. The blocking member 220 may help prevent damage of the third periphery 433 due to external impact through the elastic buffer rib 2212 extended to face the third periphery 433 of the display 430.

Figure 28A:
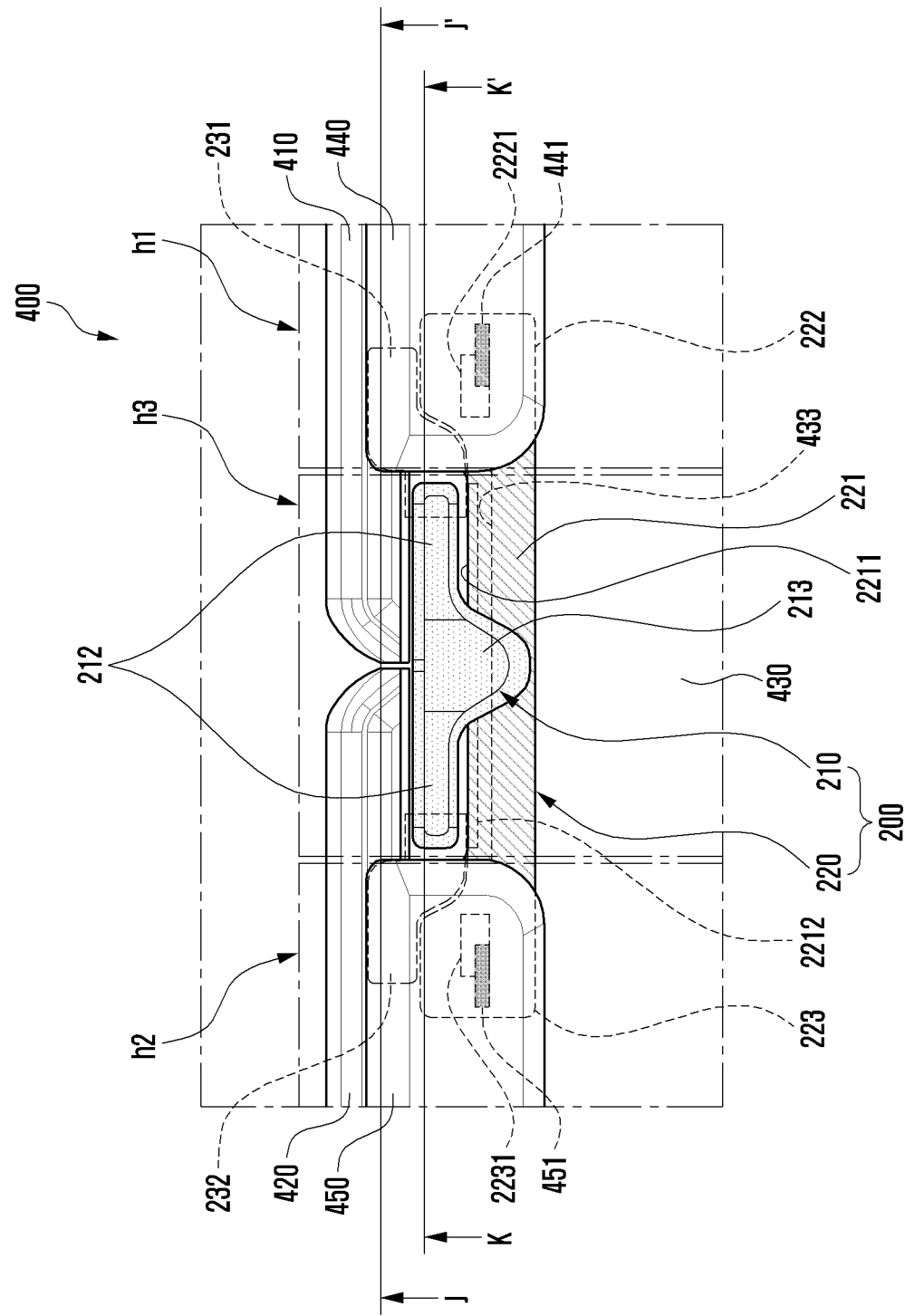
FIG. 28A illustrates a partial view of an electronic device including a protection structure according to an embodiment.
Figure 28B:
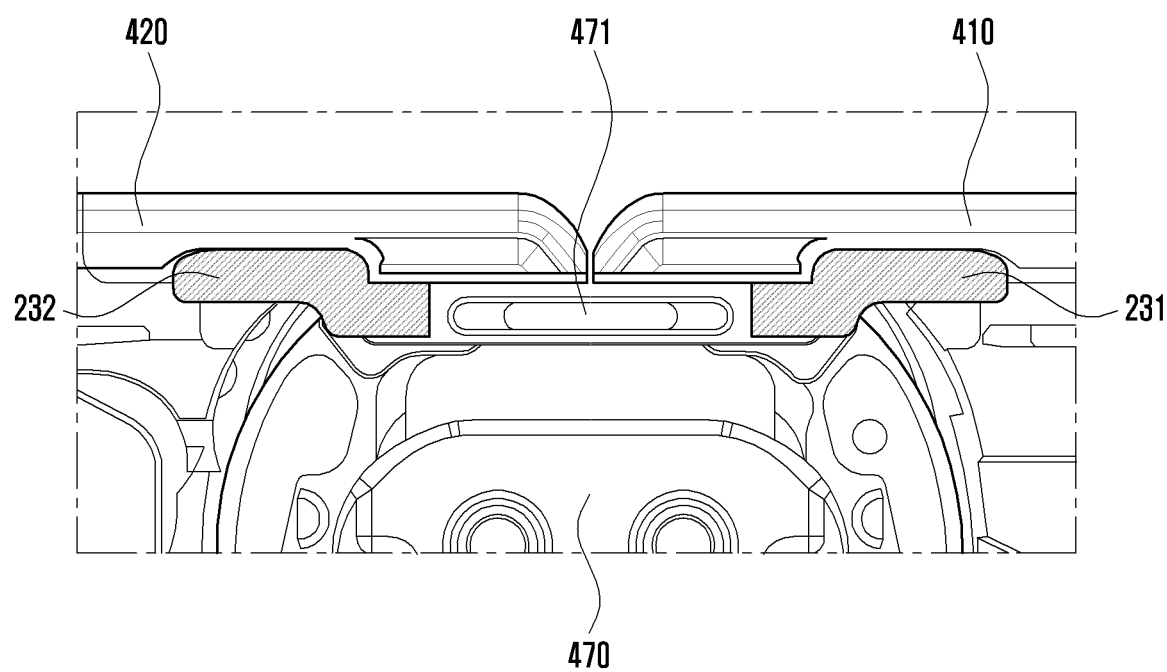
FIG. 28B illustrates a partial view of housing structures including auxiliary blocking members according to an embodiment.

FIG. 28A illustrates a partial view of an electronic device including a protection structure according to an embodiment. FIG. 28B illustrates a partial view of a housing structures and showing auxiliary blocking members according to an embodiment.

Figure 29A:
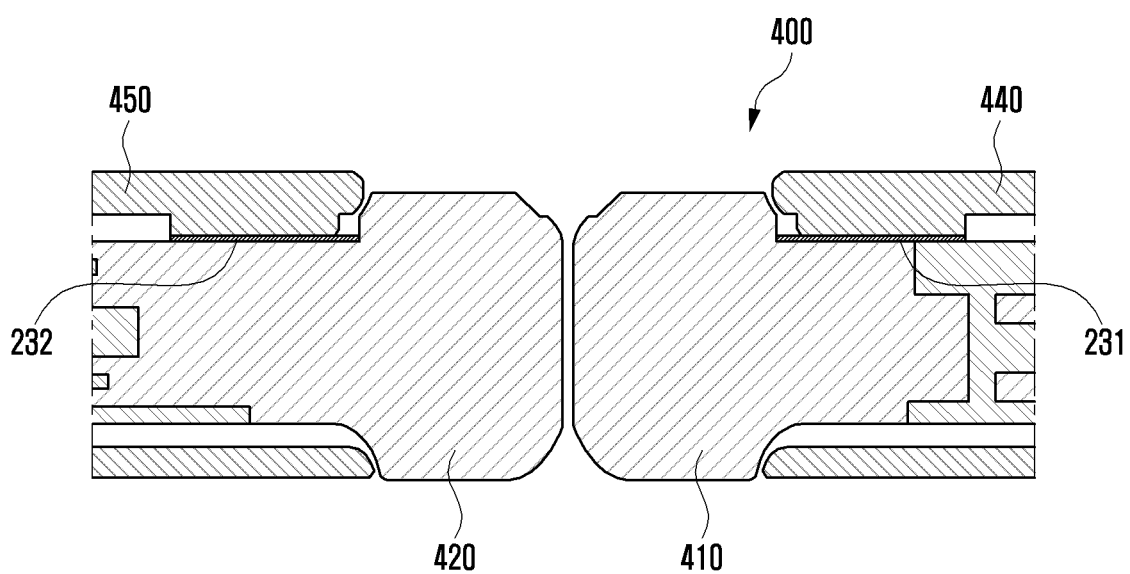
FIG. 29A illustrates a partial cross-sectional view of the electronic device in FIG. 28A taken along the line J-J' according to an embodiment.
Figure 29B:
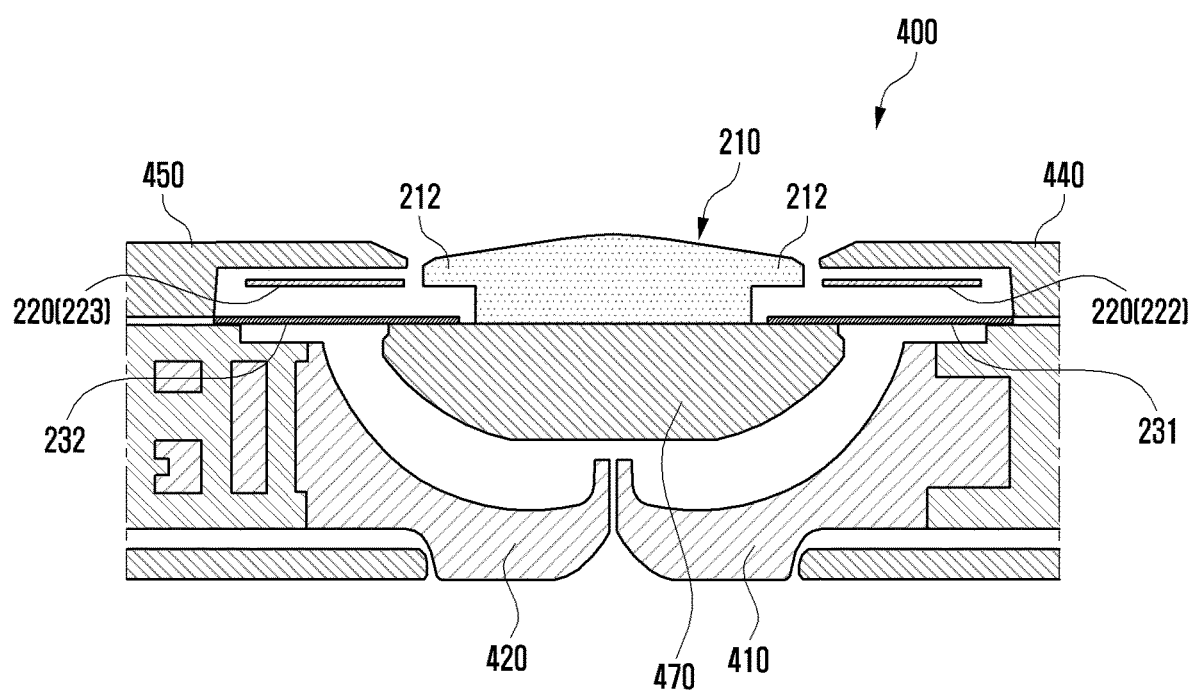
FIG. 29B illustrates a partial cross-sectional view of the electronic device in FIG. 28A taken along the line K-K' according to an embodiment.
Figure 29C:
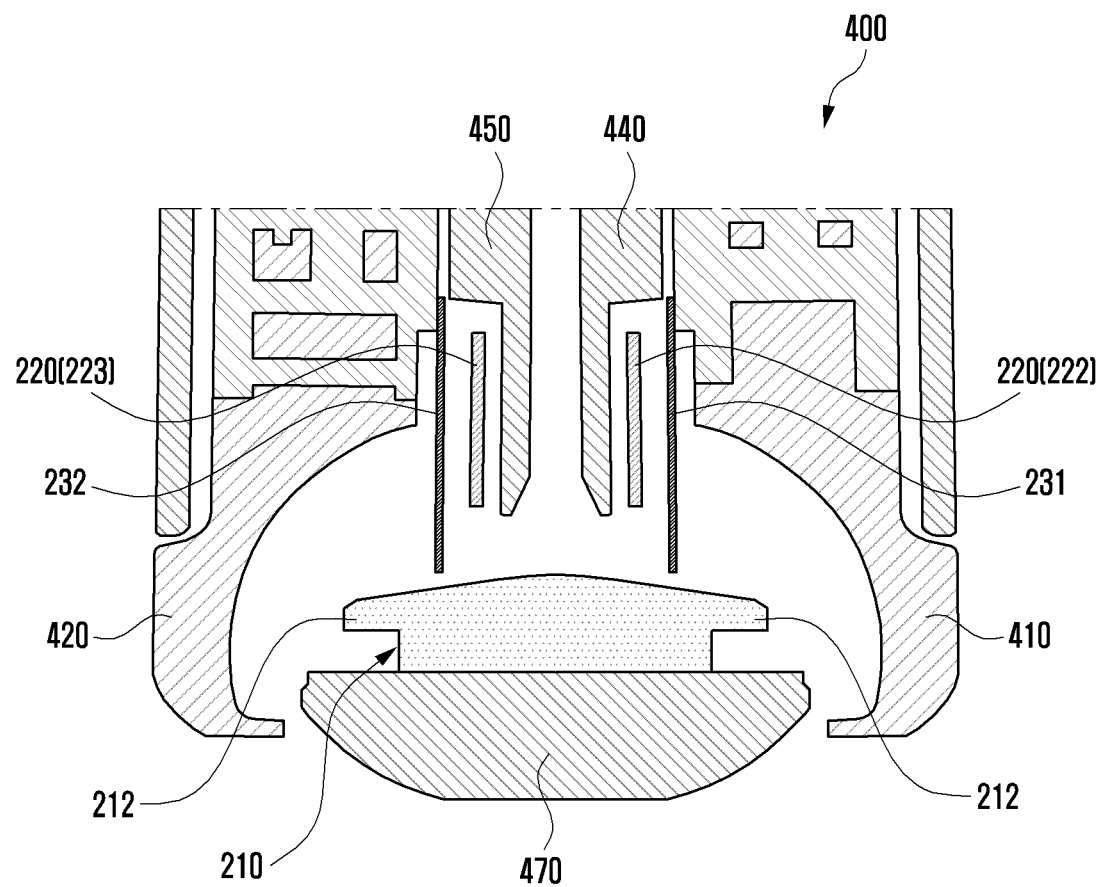
FIG. 29C illustrates a partial cross-sectional view of a folded state of the electronic device in FIG. 29B according to an embodiment.

FIG. 29A illustrates a partial cross-sectional view of the electronic device in FIG. 28A taken along the line J-J' according to an embodiment. FIG. 29B illustrates a partial cross-sectional view of the electronic device in FIG. 28A taken along the line K-K' according to an embodiment. FIG. 29C illustrates a partial cross-sectional view showing a folded state of an electronic device according to an embodiment.

In FIG. 28A, the same or similar reference numerals are given to substantially the same elements as those of the electronic device 400 of FIG. 25B, and duplicate descriptions may be omitted.

Referring to FIGS. 28A to 29C, the third periphery 433 of the display 430 of the electronic device 400 may be arranged in the folding region h3 to be protected by a blocking member 220 that is disposed on the third periphery 433, is in the form of a film, and has both ends connected to the first protection cover 440 and the second protection cover 450. For example, at least a portion of the blocking member 220 may be arranged in the folding region h3 so as to be at least partially supported by the support part 213 of the protective cap 210 disposed in the hinge housing.

The electronic device 400 further includes a pair of auxiliary blocking members 231 and 232 disposed between the protective cap 210 and the first protection cover 440 and between the protective cap 210 and the second protection cover 450, respectively. The pair of auxiliary blocking members 231 and 232 may block foreign substances from flowing into the electronic device 400 by shielding between the protrusion 212 of the protective cap 210 and the first protection cover 440 and shielding between the protrusion 212 of the protective cap 210 and the second protection cover 450. The pair of auxiliary blocking members 231 and 232 may be adjacent to the blocking member 220 without an overlap when the display 430 is viewed from above.

The pair of auxiliary blocking members 231 and 232 may include a first auxiliary blocking member 231 disposed to extend from between the first housing structure 410 and the first protection cover 440 in the first region h1 to at least a portion between the protrusion 212 of the protective cap 210 and the hinge housing 470 in the folding region h3. The pair of auxiliary blocking members 231 and 232 may include a second auxiliary blocking member 232 disposed to extend from between the second housing structure 420 and the second protection cover 450 in the second region h2 to at least a portion between the protrusion 212 of the protective cap 210 and the hinge housing 470 in the folding region h3. The pair of auxiliary blocking members 231 and 232 may at least partially overlap the protrusion 212 of the protective cap 210 when the display 430 is viewed from above.

The first auxiliary blocking member 231 may be attached to the first protection cover 440. The second auxiliary blocking member 232 may be attached to the second protection cover 450. The pair of auxiliary blocking members 231 and 232 may be disposed on the first housing structure 410, the hinge housing 470, and the second housing structure 420 before the display 430 is disposed. The pair of auxiliary blocking members 231 and 232 may be attached respectively to the protection covers 440 and 450 through taping, bonding, or fusion. Alternatively, the pair of auxiliary blocking members 231 and 232 may be attached to at least some of the housing structures 410 and 420. The pair of auxiliary blocking members 231 and 232 may be disposed such that one ends thereof are fixed respectively to the protection covers 440 and 450 and the other ends thereof ride over the protrusion 212 of the protective cap 210 according to the folding or unfolding of the electronic device 400. For example, the pair of auxiliary blocking members 231 and 232 may be made of a material such as PET and may be formed in a thin film form having elasticity.

Figure 30:
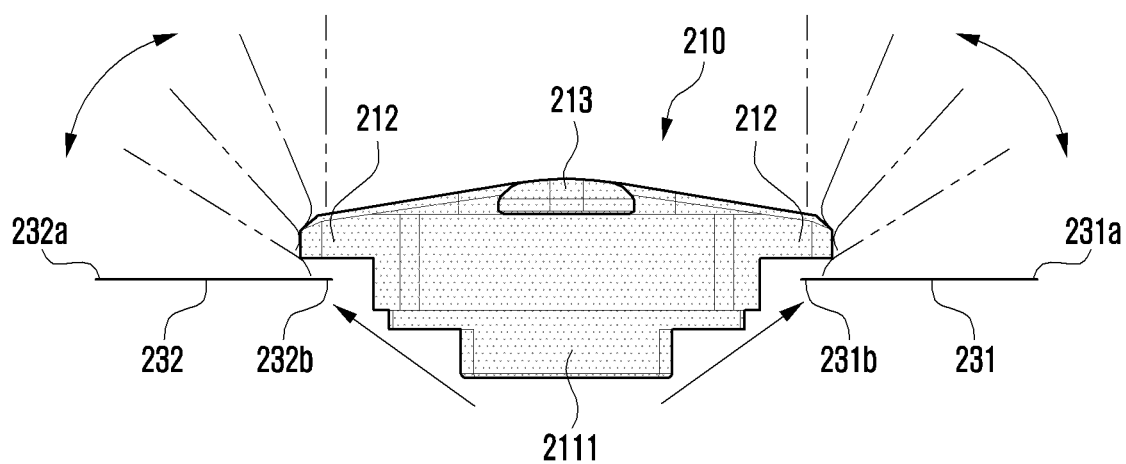
FIG. 30 illustrates an operational diagram of a contact configuration between a protective cap and auxiliary blocking members due to a folding operation of an electronic device according to an embodiment.

FIG. 30 illustrates a contact configuration between a protective cap and auxiliary blocking members 231 and 232 due to a folding operation of an electronic device according to an embodiment.

Referring to FIG. 30, the pair of auxiliary blocking members 231 and 232 have fixed ends 231a and 232a respectively fixed to the protection covers 440 and 450, and free ends 231b and 232b riding over the protrusion 212 of the protective cap 210 according to the folding or unfolding of the electronic device 400. When the electronic device is unfolded, the free ends 231b and 232b of the auxiliary blocking members 231 and 232 may be disposed under the protrusion 212 of the protective cap 210. While the electronic device is folded, the free ends 231b and 232b of the auxiliary blocking members 231 and 232 may be moved above the protrusion 212 after riding along the periphery of the protrusion 212 of the protective cap 210 with elastic deformation. The two ends of the protrusion 212 of the protective cap 210 may be formed to have a relatively thin thickness through a chamfering process in order for the free ends 231b and 232b of the auxiliary blocking members 231 and 232 to easily ride over the protrusion 212 through elastic deformation. In addition, the two ends of the protrusion 212 of the protective cap 210 may be formed in a bended curve in order for the free ends 231b and 232b of the auxiliary blocking members 231 and 232 to easily ride over the protrusion 212.

According to an embodiment, a foldable electronic device is provided, which includes a display protection structure that can protect the periphery of the display based on the hinge structure.

According to an embodiment, a foldable electronic device is provided, which includes a display protection structure that can prevent a malfunction of the display by compensating for the space between the display and the hinge structure in the hinge structure.

According to various embodiments, an electronic device (e.g., electronic device 400 in FIG. 4B) may include: a housing as a housing structure that includes: a hinge structure (e.g., hinge structure 464 in FIG. 4B) corresponding to a folding region (e.g., folding region h3 in FIG. 4B) and including a hinge housing (e.g., hinge housing 470 in FIG. 4A); a first housing structure (e.g., first housing structure 410 in FIG. 4B) corresponding to a first region (e.g., first region h1 in FIG. 4B), connected to the hinge structure, and including a first surface (e.g., first surface 411 in FIG. 4B), a second surface (e.g., second surface 412 in FIG. 4B) facing away from the first surface, and a first side member (e.g., first side member 413 in FIG. 4B) surrounding a first space between the first surface and the second surface; and a second housing structure (e.g., second housing structure 420 in FIG. 4B) corresponding to a second region (e.g., second region h2 in FIG. 4B), connected to the hinge structure, and including a third surface (e.g., third surface 421 in FIG. 4B), a fourth surface (e.g., fourth surface 422 in FIG. 4B) facing away from the third surface, and a second side member (e.g., second side member 423 in FIG. 4B) surrounding a second space between the third surface and the fourth surface, wherein the first housing structure and the second housing structure are arranged to be foldable about the hinge structure so that the first surface and the third surface face the same direction in an unfolded state and the second surface and the fourth surface face in opposite directions to each other in a folded state; a display (e.g., display 430 in FIG. 4B) disposed to traverse from at least a portion of the first surface to at least a portion of the third surface through the folding region; a first protection cover (e.g., first protection cover 440 in FIG. 4B) disposed on at least some of the periphery (e.g., first periphery 431 in FIG. 4B) of the display and along the periphery thereof in the first region; a second protection cover (e.g., second protection cover 450 in FIG. 4B) disposed on at least some of the periphery (e.g., second periphery 432 in FIG. 4B) of the display and along the periphery thereof in the second region; and at least one protection structure (e.g., protection structure 500 in FIG. 4A) arranged to protect the periphery (e.g., third periphery 433 and/or fourth periphery 434 in FIG. 4B) of the display in the folding region.

In various embodiments, the protection structure may include, in the folding region, a protective cap (e.g., protective cap 510 in FIG. 5B) disposed in the hinge housing, and a blocking member (e.g., blocking member 520 in FIG. 5B) supported by the protective cap and arranged to at least partially cover the periphery of the display.

In various embodiments, the protective cap may include, in the folding region, a base (e.g., base 511 in FIG. 5B) fixed to the hinge housing, a protrusion (e.g., protrusion 512 in FIG. 5B) projecting upward from the base and formed to have a first width (e.g., first width w1 in FIG. 5B) smaller than the base, and a support part (e.g., support part 513 in FIG. 5B) extending from the protrusion toward the display, supporting at least a portion of the blocking member on the upper surface of the blocking member, and having a second width (e.g., second width w2 in FIG. 5B) smaller than the first width. When the display is viewed from above, the support part may be disposed to at least partially overlap the display.

In various embodiments, the protrusion and the support part may be formed in an upward curved shape.

In various embodiments, the size of the second width of the support part may be determined based on the radius of curvature (e.g., radius of curvature R in FIG. 7) formed by the folded display when the electronic device is folded.

In various embodiments, the blocking member may include a bendable part (e.g., bendable part 521 in FIG. 5B) facing the folding region and covering the periphery, a first extension part (e.g., first extension part 522 in FIG. 5B) extending between the first protection cover and the first housing structure from one end of the bendable part, and a second extension part (e.g., second extension part 523 in FIG. 5B) extending between the second protection cover and the second housing structure from the other end of the bendable part. At least a portion of the bendable part may be disposed to be supported by the support part.

In various embodiments, the first extension part may include a first guide hole (e.g., first guide hole 5221 in FIG. 5B) to accommodate a first guide protrusion (e.g., first guide protrusion 441 in FIG. 5B) projecting from the inner surface of the first protection cover; the second extension part may include a second guide hole (e.g., second guide hole 5231 in FIG. 5B) to accommodate a second guide protrusion (e.g., second guide protrusion 451 in FIG. 5B) projecting from the inner surface of the second protection cover; and the first extension part and the second extension part may be guided along the first guide protrusion and the second guide protrusion as the electronic device is being folded or unfolded.

In various embodiments, the blocking member may further include a buffer rib extending from the bendable part toward the hinge housing to face the periphery of the display.

In various embodiments, the electronic device may further include a pair of auxiliary blocking members (e.g., auxiliary blocking members 231 and 232 in FIG. 28A) disposed respectively between the protective cap and the first protection cover and between the protective cap and the second protection cover, and the pair of auxiliary blocking members may be disposed to be adjacent to the blocking member when the display is viewed from above.

In various embodiments, the protection structure may include a blocking member. The blocking member may include, in the folding region, a bendable part disposed in the hinge housing to at least partially cover the periphery of the display, a first extension part extending from one end of the bendable part and disposed between the first protection cover and the first housing structure, and a second extension part extending from the other end of the bendable part and disposed between the second protection cover and the second housing structure. The bendable part may include a plurality of openings (e.g., openings 7141 in FIG. 11) formed at regular or irregular intervals.

In various embodiments, the flexural characteristics of the bendable part may be determined based on at least one of the size of openings, the shape of openings, the interval between openings, or the density of openings.

In various embodiments, the plurality of openings may be arranged to have the same or different lengths in the longitudinal direction of the bendable part or in the width direction perpendicular to the longitudinal direction.

In various embodiments, the electronic device may further include at least one support member (e.g., support member 610 in FIG. 10) disposed between the hinge housing and the bendable part to support the bendable part.

In various embodiments, the protection structure may include, in the folding region, as a protective cap (e.g., protective cap 810 in FIG. 13) disposed in the hinge housing, a fixing part (e.g., fixing part 811 in FIG. 13) disposed along the width direction of the folding region, and a support part (e.g., support part 812 in FIG. 13) extending from the fixing part toward the display. The support part may be extended to cover at least some of the periphery of the display.

In various embodiments, the size of the support part may be determined based on the radius of curvature (e.g., radius of curvature R in FIG. 15) formed by the folded display when the electronic device is folded.

In various embodiments, the protection structure may include a first blocking member extending between the first protection cover and the first housing structure to the folding region, and a second blocking member extending between the second protection cover and the second housing structure to the folding region. The first blocking member and the second blocking member may be arranged in the folding region to at least partially cover the periphery of the display.

In various embodiments, the electronic device may further include a protective cap disposed between the first blocking member and the second blocking member in the hinge housing of the folding region. The protective cap may include a support part that at least partially covers the periphery of the display.

In various embodiments, the first blocking member and the second blocking member may each include a film member made of a polymer material fixed to the first protection cover or the second protection cover.

In various embodiments, the protection structure may include a blocking member. The blocking member may include a bendable part disposed to at least partially cover the periphery of the display, a first fixing part extending from one end of the bendable part and fixed to the first protection cover, and a second fixing part extending from the other end of the bendable part and fixed to the second protection cover. The lines of the bendable part, the first protection cover, and the second protection cover covering the display may be arranged to coincide.

In various embodiments, the blocking member may be made of at least one of rubber, urethane, or silicone having elasticity, and may be fixed to the first protection cover and the second protection cover through insert injection.

Hereinabove, embodiments of the disclosure have been described with reference to the accompanying drawings. Specific terms or words used in the description should be construed in accordance with the spirit of the disclosure without limiting the subject matter thereof.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a hinge structure corresponding to a folding region of the electronic device;
a first housing structure connected to the hinge structure, and including a first surface, a second surface facing away from the first surface, and a first side member surrounding a first space between the first surface and the second surface;
a second housing structure connected to the hinge structure, and including a third surface, a fourth surface facing away from the third surface, and a second side member surrounding a second space between the third surface and the fourth surface, wherein the first housing structure and the second housing structure fold and unfold about the hinge structure, wherein the first surface and the third surface face a same direction in an unfolded state, and wherein the second surface and the fourth surface face opposite directions in a folded state;
a display that traverses at least a portion of the first surface and at least a portion of the third surface through the folding region;
a first protection cover disposed on a first periphery of the display corresponding to the first housing structure;
a second protection cover disposed on a second periphery of the display corresponding to the second housing structure; and
a protection structure disposed on a third periphery of the display in the folding region,
wherein at least a part of the protection structure at least partially overlaps the display when the display is viewed from above, and
wherein the protection structure comprises:
a protective cap disposed on the third periphery of the display; and
a blocking member disposed between the protective cap and the third periphery of the display.

2. The electronic device of claim 1, wherein the protective cap is disposed on the hinge structure in the folding region, and
wherein the blocking member is supported by the protective cap and arranged to at least partially cover the third periphery of the display.

3. The electronic device of claim 2, wherein the protective cap comprises:
a base that is fixed to the hinge structure in the folding region;
a protrusion that projects upward from the base and has a first width that is smaller than the base; and
a support part that extends from the protrusion toward the display, supports at least a portion of the blocking member on the upper surface of the blocking member, and has a second width that is smaller than the first width,
wherein the support part at least partially overlaps the display when the display is viewed from above.

4. The electronic device of claim 3, wherein the protrusion and the support part are formed in an upward curved shape.

5. The electronic device of claim 4, wherein the second width of the support part is determined based on a radius of curvature formed by the folded display when the electronic device is folded.

6. The electronic device of claim 3, wherein the blocking member comprises:

a bendable part that faces the folding region and covers the third periphery of the display;
a first extension part that extends between the first protection cover and the first housing structure from a first end of the bendable part; and
a second extension part that extends between the second protection cover and the second housing structure from a second end of the bendable part,
wherein at least a portion of the bendable part is supported by the support part.

7. The electronic device of claim 6, wherein the first extension part comprises a first guide hole that accommodates a first guide protrusion projecting from an inner surface of the first protection cover,
wherein the second extension part comprises a second guide hole that accommodates a second guide protrusion projecting from an inner surface of the second protection cover, and
wherein the first extension part and the second extension part are guided along the first guide protrusion and the second guide protrusion as the electronic device is being folded or unfolded.

8. The electronic device of claim 6, wherein the blocking member further comprises a buffer rib that extends from the bendable part toward the hinge housing to face the third periphery of the display.

9. The electronic device of claim 6, further comprising a pair of auxiliary blocking members disposed respectively between the protective cap and the first protection cover and between the protective cap and the second protection cover,
wherein the pair of auxiliary blocking members are disposed adjacent to the blocking member when the display is viewed from above.

10. The electronic device of claim 1, wherein the blocking member comprises:
a bendable part that is disposed in the hinge structure and at least partially covers the third periphery of the display in the folding region;
a first extension part that extends from a first end of the bendable part and that is disposed between the first protection cover and the first housing structure; and
a second extension part that extends from a second end of the bendable part and that is disposed between the second protection cover and the second housing structure, and
wherein the bendable part includes a plurality of openings formed at regular or irregular intervals.

11. The electronic device of claim 10, wherein flexural characteristics of the bendable part are determined based on at least one of a size of the plurality of openings, a shape of the plurality of openings, an interval between the plurality of openings, or a density of the plurality of openings.

12. The electronic device of claim 10, wherein the plurality of openings are arranged to have same or different lengths in a longitudinal direction of the bendable part or in a width direction perpendicular to the longitudinal direction.

13. The electronic device of claim 10, further comprising at least one support member disposed between the hinge structure and the bendable part,
wherein the at least one support member supports the bendable part.

14. The electronic device of claim 1, wherein the protective cap comprises:
a fixing part that is disposed along a width direction of the folding region; and
a support part that extends from the fixing part toward the display, and wherein the support part covers at least a portion of the third periphery of the display.

15. The electronic device of claim 14, wherein a size of the support part is determined based on a radius of curvature formed by a folded portion of the display, when the electronic device is folded.

16. The electronic device of claim 1, wherein the protection structure further comprises:
- a first blocking member that extends between the first protection cover and the first housing structure to the folding region; and
- a second blocking member that extends between the second protection cover and the second housing structure to the folding region, and
- wherein the first blocking member and the second blocking member at least partially cover the third periphery of the display in the folding region.

17. The electronic device of claim 16, wherein the protective cap is disposed between the first blocking member and the second blocking member in the hinge structure of the folding region,
wherein the protective cap includes a support part that at least partially covers the third periphery of the display.

18. The electronic device of claim 16, wherein the first blocking member and the second blocking member include film members fixed to the first protection cover and the second protection cover, respectively, and
wherein the film members are made of a polymer material.

19. The electronic device of claim 1, wherein
the blocking member comprises:
- a bendable part that at least partially covers the third periphery of the display;
- a first fixing part that extends from a first end of the bendable part and is fixed to the first protection cover; and
- a second fixing part that extends from a second end of the bendable part and is fixed to the second protection cover,
wherein the bendable part, the first protection cover, and the second protection cover covering the display are linearly arranged.

20. The electronic device of claim 19, wherein the blocking member is made of at least one of rubber, urethane, or silicone and is fixed to between the first protection cover and the second protection cover through insert injection.

* * * * *